United States Patent
Avgousti et al.

(10) Patent No.: US 11,864,555 B2
(45) Date of Patent: Jan. 9, 2024

(54) SOIL APPLICATION OF CROP PROTECTION AGENTS

(71) Applicants: PIONEER HI-BRED INTERNATIONAL, INC., Johnston, IA (US); CORTEVA AGRISCIENCE LLC, Indianapolis, IN (US)

(72) Inventors: Marios Avgousti, Kennett Square, PA (US); Robert Ray Burch, Exton, PA (US); John D Everard, Grimes, IA (US); Rajeev L Gorowara, Wilmington, DE (US); Gary Delmar Jaycox, West Chester, PA (US); Shane Francis Kendra, Aldan, PA (US); Jacy Cameron Macchia, Philadelphia, PA (US); Ning Wang, Wilmington, DE (US); Jihua Zhang, Garnet Valley, PA (US)

(73) Assignees: PIONEER HI-BRED INTERNATIONAL, INC., Johnston, IA (US); CORTEVA AGRISCIENCE LLC, Indianapolis, IN (US)

(*) Notice: Subject to any disclaimer, the term of this patent is extended or adjusted under 35 U.S.C. 154(b) by 294 days.

(21) Appl. No.: 16/756,741

(22) PCT Filed: Sep. 25, 2018

(86) PCT No.: PCT/US2018/052672
§ 371 (c)(1),
(2) Date: Apr. 16, 2020

(87) PCT Pub. No.: WO2019/067452
PCT Pub. Date: Apr. 4, 2019

(65) Prior Publication Data
US 2021/0186013 A1    Jun. 24, 2021

Related U.S. Application Data

(60) Provisional application No. 62/564,220, filed on Sep. 27, 2017.

(51) Int. Cl.
| | | |
|---|---|---|
| A01N 25/26 | (2006.01) | |
| A01N 59/26 | (2006.01) | |
| A01N 43/40 | (2006.01) | |
| A01N 37/52 | (2006.01) | |
| A01N 31/02 | (2006.01) | |
| A01N 33/06 | (2006.01) | |
| A01N 25/10 | (2006.01) | |
| A01N 25/34 | (2006.01) | |

(52) U.S. Cl.
CPC ............ *A01N 25/26* (2013.01); *A01N 25/10* (2013.01); *A01N 25/34* (2013.01); *A01N 31/02* (2013.01); *A01N 33/06* (2013.01); *A01N 37/52* (2013.01); *A01N 43/40* (2013.01); *A01N 59/26* (2013.01)

(58) Field of Classification Search
CPC ........ A01N 25/26; A01N 25/10; A01N 25/34; A01N 31/02; A01N 33/06; A01N 37/52; A01N 43/40; A01N 59/26
See application file for complete search history.

(56) References Cited

U.S. PATENT DOCUMENTS

| | | |
|---|---|---|
| 2,661,955 A | 12/1953 | Sherer |
| 3,060,873 A | 10/1962 | Powers |
| 4,280,419 A | 7/1981 | Fischer |
| 4,693,122 A | 9/1987 | Griffith |
| 4,779,765 A | 10/1988 | Neumeyer |
| 5,004,614 A | 4/1991 | Staniforth |
| 5,174,804 A | 12/1992 | Rehberg et al. |
| 5,176,734 A | 1/1993 | Fujita et al. |
| 5,466,274 A | 11/1995 | Hudson et al. |
| 5,645,624 A | 7/1997 | Naka et al. |
| 5,993,505 A | 11/1999 | Tijsma et al. |
| 6,139,597 A | 10/2000 | Tijsma et al. |
| 6,287,359 B1 | 9/2001 | Erhardt et al. |
| 6,336,949 B1 | 1/2002 | Patra et al. |
| 6,412,392 B1 | 7/2002 | Gunter et al. |
| 6,500,223 B1 | 12/2002 | Sakai et al. |
| 6,900,162 B2 | 5/2005 | Wertz et al. |
| 7,617,784 B2 | 11/2009 | Friggstad |
| 7,771,505 B2 | 8/2010 | Ogle et al. |
| 7,862,642 B2 | 1/2011 | Phillips |
| 8,163,672 B2 | 4/2012 | Birthisel |
| 8,322,293 B2 | 12/2012 | Wollenhaupt et al. |
| 8,336,469 B2 | 12/2012 | Preheim et al. |
| 8,371,240 B2 | 2/2013 | Wollenhaupt et al. |

(Continued)

FOREIGN PATENT DOCUMENTS

| | | |
|---|---|---|
| CA | 2921145 A1 | 2/2014 |
| CN | 1369562 A | 9/2002 |

(Continued)

OTHER PUBLICATIONS

Iowa State Soil: Tama Soil Series (accessed May 19, 2022 from https://www.extension.iastate.edu/soils/iowa-state-soil-tama-soil-series (Year: 2022).*
S.J. Swenson, D.A. Prischmann-Voldseth, F.R. Musser. "Corn Earworms (Lepidoptera: Noctuidae) as Pests of Soybean," J. Integ. Pest Mngmt. 4(2): 2013, 1-8. (Year: 2013).*
International Search Report and Written Opinioner for International Application PCT/US2018/052672, dated Jan. 16, 2019.

(Continued)

*Primary Examiner* — Michael P Cohen

(57) ABSTRACT

The disclosure relates to systems, compositions and methods for providing nutrients, root proliferants, crop protection agents and other crop inputs for a plant. The disclosure also relates to methods for increasing the uptake of a crop active compound into a growing plant.

14 Claims, 10 Drawing Sheets

(56) References Cited

U.S. PATENT DOCUMENTS

| | | |
|---|---|---|
| 8,651,033 B2 | 2/2014 | Wollenhaupt et al. |
| 8,741,022 B2 | 6/2014 | Ogle et al. |
| 9,029,636 B2 | 5/2015 | Wu et al. |
| 9,078,393 B1 | 7/2015 | Polizotto |
| 9,156,745 B2 | 10/2015 | Hargrove et al. |
| 9,266,787 B2 | 2/2016 | Pursell et al. |
| 2002/0094444 A1 | 7/2002 | Nakata et al. |
| 2004/0020254 A1 | 2/2004 | Wynnyk et al. |
| 2009/0165515 A1 | 7/2009 | Aoki et al. |
| 2011/0214466 A1 | 9/2011 | Yadav |
| 2012/0090366 A1 | 4/2012 | Pursell et al. |
| 2012/0111075 A1 | 5/2012 | Hargrove et al. |
| 2014/0179770 A1 | 6/2014 | Zhang et al. |
| 2014/0259906 A1 | 9/2014 | Shani et al. |
| 2014/0261115 A1 | 9/2014 | Kowalchuk et al. |
| 2015/0047402 A1 | 2/2015 | Walker et al. |
| 2015/0218059 A1 * | 8/2015 | Yadav .................. B05C 5/0254 118/314 |
| 2016/0023961 A1 | 1/2016 | Savinelli et al. |

FOREIGN PATENT DOCUMENTS

| | | |
|---|---|---|
| CN | 101244966 B | 6/2010 |
| CN | 101723752 A | 6/2010 |
| CN | 101492327 B | 12/2012 |
| CN | 102816010 B | 6/2014 |
| CN | 104291935 A | 1/2015 |
| CN | 204310973 | 5/2015 |
| EP | 0583160 B1 | 5/1997 |
| WO | 9217424 A1 | 10/1992 |
| WO | 03082003 A2 | 10/2003 |
| WO | 2011133765 A1 | 10/2011 |
| WO | 2015/048867 A1 | 4/2015 |
| WO | 2016/007948 A1 | 1/2016 |
| WO | 2016/099919 A1 | 6/2016 |
| WO | WO-2016099919 A1 * | 6/2016 ............. A01N 25/12 |
| WO | 2017/165482 A1 | 9/2017 |

OTHER PUBLICATIONS

Chien, S. H., et al.: "Recent developments of fertilizer production and use to improve nutrient efficiency and minimize environmental impacts", Advances in Agronomy, Dec. 31, 2009 (Dec. 31, 2009), vol. 102, pp. 267-322.

Maharjan, et al, "Polymer-Coated Urea Improved Corn Response Compared to Urea-Ammonium-Nitrate when applied on a Coarse-Textured Soil", Agronomy, Soils & Environmental Quality, (2016) vol. 108 (2) 509-518.

Scher, "Controlled-Release Delivery Systems for Pesticides, Marcel Dekker, Inc."(1999) p. 55-85, p. 89-136, p. 137-172, p. 173-193.

International Search Report and Written Opinion for International Application No. PCT/US17/23524, dated Aug. 23, 2017.

* cited by examiner

SOIL APPLICATION OF CROP PROTECTION AGENTS

FIELD

The disclosure relates to systems, compositions and methods for providing crop protection agents for a plant.

BACKGROUND

Pressure from pests and disease causing agents can require multiple applications of pesticides and other crop protection actives such as insecticides, fungicides and nematicides. Late season pest pressure is generally difficult to control effectively in large fields where the entry of the application equipment within the field may injure growing plants and may require multiple passes for effective control and often not economical.

There is a need to improve the delivery of pesticides and other crop protection materials to crops such that the appropriate amount of such crop inputs are available at the appropriate stage of a crop's development and pest pressure. Providing overall lower rate of crop protection agents to achieve similar or better protection from pests is desirable.

SUMMARY

An agricultural composition comprising a biodegradable polymer, a crop protection agent, a root proliferant, and optionally an inert ingredient, wherein the crop protection agent and the root proliferant are substantially dispersed in a matrix, the matrix encapsulated by a polymer layer such that the agricultural composition has an overall water permeability of about 1 to about 2000 g/m2/day at 25 degrees Celsius; (b) the root proliferant comprises phosphate in a weight % of about 1-70%; and (c) the agricultural composition has a mass of about 0.01 g to about 0.750 g and a length to diameter aspect ratio of about 0.5-2.0.

An agricultural composition comprising a biodegradable binder, a crop protection agent, a root proliferant, and optionally an inert ingredient, wherein the crop protection agent and the root proliferant are substantially dispersed in a matrix comprising the binder such that the root proliferant exhibits low to moderate solubility in soil or the crop protection agent is applied on the surface of a core structure comprising the root proliferant; (b) the root proliferant selected from the group consisting of phosphate, ammonium, nitrate and a combination thereof, in a weight % of about 1-95%; and (c) the agricultural composition has a mass of about 0.0100 g to about 5.000 g and a length to diameter aspect ratio of about 0.5-2.0.

An agricultural composition comprising a polysaccharide binder, a crop protection agent, a root proliferant, an optional inert ingredient and a biodegradable polymer layer, wherein (a) the crop protection agent and the root proliferant are substantially dispersed in a matrix comprising the polysaccharide binder, wherein the matrix is substantially encapusulated by the biodegradable polymer layer such that the agricultural composition has an overall water permeability of about 1 to about 2000 g/m2/day at 25 degrees Celsius; (b) the root proliferant comprises phosphate in a weight % of about 1-50%; and (c) the agricultural composition has a mass of about 0.01 g to about 0.750 g and a length to diameter ratio of about 0.5-2.0.

An agricultural composition comprising a biodegradable polymer, a crop protection agent, a root proliferant, and optionally an inert ingredient, wherein (a) the root proliferant selected from the group consisting of phosphate, ammonium, nitrate and a combination thereof, in a weight % of about 1-95%, is substantially dispersed in a central core; (b) the biodegradeable polymer layer substantially encapsulates the central core; (c) the crop protection agent is coated on the surface of the polymer layer; and (d) the agricultural composition has a mass of about 0.0100 g to about 5.000 g and a length to diameter aspect ratio of about 0.5-2.0.

In an embodiment, the phosphate is calcium phosphate or ammonium magnesium phosphate. In an embodiment, the agricultural composition further includes a macro or micro nutrient selected from the group consisting of N, K, Mg, Zn, $NH_3$, Mn, Fe, Cu and a combination thereof at a concentration that is effective to induce root growth of a crop plant.

In an embodiment, the polymer is a biodegradable aliphatic polyester. In an embodiment, the polymer is poly(butylene succinate adipate) (PBSA). In an embodiment, the polymer is polylactic acid comprising a weight averaged molecular weight of about 20 kDa to about 150 kDa.

A method of producing an agricultural composition comprising a biodegradable polymer, a crop protection agent, a root proliferant, and optionally an inert ingredient, the method comprising performing an extrusion process such that the crop protection agent, the root proliferant are sufficiently mixed with the biodegradable polymer component such that the crop protection agent and the root proliferant are substantially dispersed in a matrix comprising the polymer, wherein the agricultural composition has an overall water permeability of about 1 to about 2000 $g/m^2$/day at 25 degrees Celsius.

A method of increasing uptake of a crop protection agent in a crop plant, the method comprising providing an agricultural composition comprising a biodegradable polymer, a crop protection agent, a root proliferant, and optionally an inert ingredient, wherein the agricultural composition is placed at a distance that is effective to promote root proliferation of the crop plant; and thereby increasing the uptake of the crop protection agent when compared to a control plant not exposed to the agricultural composition. In an embodiment, the root proliferant is low to moderately soluble phosphate.

An agricultural composition comprising a binder, a crop protection agent, a root proliferant, an optional inert ingredient, wherein (a) the crop protection agent and the root proliferant are substantially dispersed in a matrix comprising the polysaccharide binder, wherein the root proliferant and the crop active agent are present in a ratio of about 1:100 to about 100:1; wherein the crop active is a (b) the root proliferant comprises a low to moderate solubility phosphate in a weight % of about 1-50%; and (c) the agricultural composition has a mass of about 0.01 g to about 0.750 g and a length to diameter ratio of about 0.5-2.0.

An agricultural composition includes a root proliferant core; and a layer of a polymer surrounding the fertilizer core; wherein the agricultural composition has a water permeability of about 1 to about 2000 g/m2/day at 25 degrees Celsius; and wherein the fertilizer composition is between about 6 and 14 mm in diameter.

In an embodiment, the agricultural composition has an aspect ratio of between about 1 and 3. In an embodiment, the agricultural composition is in the form of a sphere. In an embodiment, the agricultural composition is in a non-spherical form. In an embodiment, the agricultural composition is in the form of a cylinder. In an embodiment, the cylinder comprises either flat or rounded ends. In an embodiment, the agricultural composition is in the form of a briquette. In an embodiment, the agricultural composition is in the form of a mono-dispersed composition, e.g., a sphere.

In an embodiment, the agricultural composition is configured to flow through a seed planter. In an embodiment, the seed planter moves at a speed about 5-15 mph and the agricultural composition is planted at a density of about 10,000 to about 300,000/acre, wherein each of the agricultural composition comprises about 100-500, 500, 600, 700 mg of root proliferant and a pesticidally effective amount of one or more crop protection agents.

In an embodiment, the polymer layer is a biodegradable aliphatic polyester. In an embodiment, the polyester is polylactic acid comprising a weight averaged molecular weight of about 20 kDa to about 150 kDa. In an embodiment, the polymer layer is about 0.3 mil to about 10.0 mil thick. In an embodiment, the polymer layer constitutes about 0.5% or 2% to no more than about 10% of the total weight (or amount) of the agricultural composition. In an embodiment, the polymer is polyurethane.

In an embodiment, the agricultural composition has a hardness parameter between about 50N to about 500N. In an embodiment, the hardness parameter is about 100N.

In an embodiment, the polymer layer comprises a thickness of about 0.3 mil to about 10.0 mil; and applying force such that the polymer layer substantially wraps the root proliferant core and the polymer layer is substantially in contact with the core.

In an embodiment, heat is applied to the polymer layer to substantially wrap the agricultural composition. In an embodiment, the polymer layer has a water permeability of 10 to 500 g/m2/day at 25 degrees Celsius and wherein the agricultural composition is configured to be placed in a field at a predetermined distance from a row crop seed whereby the agricultural composition delivers an effective amount of root proliferant during the growth stage of the row crop. In an embodiment, the agricultural core comprises about 0.1 to 0.8 grams of phosphate.

In an embodiment, the crop is selected from the group consisting of maize, soybean, wheat, rice, sorghum, cotton, millet and barley.

In an embodiment, the fertilizer composition a nutrient selected from the group consisting of nitrogen, phosphorus, potassium and a combination thereof. In an embodiment, the nitrogen source includes urea, the phosphorus source includes for example, ammonium phosphate, superphosphate, and rock phosphate; and the potassium source includes potash.

In an embodiment, the agricultural composition is provided at planting of the crop seed or prior to planting the crop seed. In an embodiment, the soil is classified as a soil type that has a lower water holding capacity.

In an embodiment, the crop protection composition is selected from the group consisting of an insecticide, a fungicide, a nematicide and a combination thereof. In an embodiment, the crop protection composition is selected from the group consisting of an anthranilic diamide insecticide, a neonicotinoid insecticide and a combination thereof. In an embodiment, the neonicotinoid insecticide is released into the soil such that an effective amount of the insecticide is present in the soil when the target pest is present in the field during the later developmental stages of the crop. In an embodiment, the anthranilic diamide insecticide is released into the soil such that an effective amount of about 5-60 g/hectare is present in the soil after about 20-100 days from providing the agricultural composition in the field.

In an embodiment, the field is characterized by the presence of one or more late season pests that target corn or soybeans. In an embodiment, the mid-late season pest is corn root worm, corn ear worm, and/or fall army worm.

In an embodiment, the crop protection composition is selected from the group consisting of, thiamethoxam, clothianidin, imidacloprid, thiodicarb, carbaryl, chlorantraniliprole, cyantraniliprole, methiocarb, thiram, azoxystrobin, paclobutrazol, acibenzolar-S-methyl, chlorothalonil, mandipropamid, thiabendazole, chlorothalonil, triadimenol, cyprodinil, penconazole, boscalid, bixafen, fluopyram, fenpropidin, fluxapyroxad, penflufen, fluoxastrobin, kresoxim-methyl, benthiavalicarb, benthiavalicarb-isopropyl, dimethomorph, flusulfamide, methyl thiophanate, triticonazole, flutriafol, thiram, carboxin, carbendazim and a combination thereof.

In an embodiment, the crop is maize and the yield increase in the field is about 5% to about 50% compared to a control field wherein a control fertilizer composition comprising a normal release profile of nitrogen is applied, wherein both the fertilizer composition and the control fertilizer composition comprise substantially the same total nitrogen content at planting. Suitable yield increase compared to an appropriate control includes for example, at least about 3%, 4%, 5%, 6%, 7%, 8%, 9%, 10%, 15%, 20% and 30%.

In an embodiment, the crop is maize and the crop seed is planted at a planting density of about 15,000 to about 70,000 plants per acre at a row spacing of about 15 inches to about 40 inches.

In an embodiment, the crop protection composition comprises an effective amount of a pesticide that results in a reduced seed germination or reduced seedling stand or reduced crop response if the effective amount of the pesticide is applied as a seed treatment to the crop seed.

In an embodiment, the crop protection composition comprises an effective amount of a pesticide that results in a reduced seed germination or reduced seedling stand if the effective amount of the pesticide is applied as an in furrow application to the soil.

A method of providing a plurality of extended release agricultural beads to a crop field comprising a plurality of crop seeds, the method includes providing the agricultural bead at a depth of about $\frac{1}{3}^{rd}$ inch, 0.5 inch, and 1 inch to about 10 inches into the crop field; at a distance of about 1 inch to about 15 inches from the crop seeds; and wherein the agricultural bead comprises a biodegradable polymer layer and a fertilizer composition such that a nitrogen release profile of about 70-90 cumulative % of nitrogen between about 50-120 days into soil after planting the crop seeds is achieved and wherein the number of the agricultural beads is not substantially greater than the number of crop seeds in the field. Suitable planting depths for the agricultural composition include for example 0.5, 1, 2, 3, 4, 5, 6, 7, 8, 9, 10, 11, and 12 inches from the surface soil. In an embodiment, agricultural compositions disclosed herein are broadcast applied either alone or in a blend with other surface applied components such as soil such that when the agricultural composition is in the field, they are partially covered by soil.

In an embodiment, the agricultural bead further comprises a crop protection composition, wherein the crop protection composition is released into the soil such that about 90 cumulative % of one or more active ingredients in the crop protection composition is available to the crop during about 50-150 days after planting the crop seed.

A method of fertilizing a crop, the method includes providing a plurality of extended release agricultural bead to a crop field comprising a plurality of crop seeds during planting, the method comprising providing the agricultural bead: at a depth of about 2 inches to about 10 inches into the crop field; at a distance of about 1 inch to about 15 inches from the crop seeds, wherein the agricultural bead comprises a biodegradable polymer layer and a fertilizer composition such that a nitrogen release profile of about 70-90 cumulative % of nitrogen between about 50-120 days into soil after planting the crop seeds is achieved and wherein the number of the agricultural beads is not substantially greater than the number of crop seeds in the field; and providing a normal release fertilizer composition at the time of planting or sufficiently prior to planting.

An agricultural composition comprising a blend of extended release fertilizer composition comprising a biodegradable polymer layer and a normal release fertilizer composition, wherein the extended release fertilizer composition releases nitrogen at a release rate of about 70-90 cumulative % of nitrogen between about 50-120 days into soil after planting, wherein the biodegradable polymer layer encapsulates the fertilizer composition that is configured to be planted in the soil sufficiently adjacent to a crop seed. In an embodiment, the blend comprises about one tenth to about two-thirds extended release fertilizer composition. Suitable blending ranges include for example, extended release: normal release fertilizer in the ratio of 1:10, 1:9, 1:8, 1:7, 1:6; 1:5, 1:4, 1:3, 1:2 and 1:1. Depending on the amount of fertilizer component present in each tablet or bead, the blending ratio can be modified for example from 1:20 to about 1:1. In an embodiment, the blend comprises about one third extended release fertilizer composition. In an embodiment, the biodegradable polymer layer is selected from the group consisting of polylactic acid, poly butylene adipate succinate, polyvinyl acetate, polyvinyl alcohol, polycaprolactone, alginate, xanthan gum and a combination thereof. In an embodiment, the composition is planted in furrow. In an embodiment, the composition is planted sub-surface.

In an embodiment, the polymer containing agricultural composition for example, PLA-coated urea tablet or PLA or PBSA extruded beads containing crop protection agents may include additional filler component such as starch or another biodegradable component to modify the release profiles or to reduce the manufacturing cost of the extended release compositions.

An agricultural composition comprising a fertilizer core comprising from about 0.01 to about 0.5 grams of phosphate or potash; and a polymer layer surrounding the fertilizer core; wherein the polymer layer has a water permeability of about 1 to about 2000 g/m2/day at 25 degrees Celsius and wherein the fertilizer composition is configured to be placed in a field at a predetermined distance from a row crop seed whereby the fertilizer composition delivers an effective amount of nitrogen during the reproductive growth stage of the row crop. In an embodiment, the fertilizer composition is between about 6 and 14 mm in diameter.

A method of increasing yield of a crop plant, the method includes providing an extended release agricultural composition to a field comprising a plurality of crop plants, wherein the crop plant expresses an agronomic trait and wherein the extended release composition comprises a polymer layer that has a water permeability of about 1 to about 2000 g/m2/day at 25 degrees Celsius; and wherein the extended release composition is between about 6 and 14 mm in diameter; growing the crop plant in a crop growing environment and thereby increasing the yield of the crop plant. In an embodiment, the agronomic trait is a nitrogen use efficiency trait. In an embodiment, the agronomic trait is an insect resistance trait. In an embodiment, the agronomic trait is expressed by a recombinant DNA construct. In an embodiment, the agronomic trait is a drought tolerance trait. In an embodiment, the agronomic trait is engineered through a genomic modification of the endogenous DNA. In an embodiment, the agronomic trait is a disease resistance trait. In an embodiment, the insect resistance trait is due to the expression of a component selected from the group consisting of Bt gene, short interfering RNA molecule targeted to a pest, heterologous non-Bt insecticidal protein, and a combination thereof. In an embodiment, the crop plant is selected from the group consisting of maize, soybean, rice, wheat, sorghum, cotton, canola, alfalfa and sugarcane.

An agricultural system includes a plurality of extended release agricultural compositions comprising a polymer layer that has a water permeability of 10 to 500 g/m2/day at 25 degrees Celsius; wherein each of the extended release composition is between about 6 and 14 mm in diameter; a planting equipment configured to place the extended release agricultural compositions at a sufficient depth in a soil surface of a crop field; and a plurality of crop seeds, wherein the crop seeds are planted at a sufficient distance from the placement of the agricultural compositions and wherein the crop seeds are planted immediately before or after the placement of the agricultural compositions.

In an embodiment, the extended release composition comprises a fertilizer composition. In an embodiment, the extended release composition comprises a crop protection active ingredient. In an embodiment, the crop seeds are maize.

In an embodiment, the planting equipment is a seed planter. In an embodiment, the planting equipment plants both the agricultural compositions and the crop seeds in a single pass across the field. In an embodiment, the planting equipment alternates between placing the agricultural composition and planting the crop seeds. In an embodiment, the planting equipment is a pneumatic disc planter. In an embodiment, the planting equipment delivers the agricultural composition that comprises a fertilizer component and a crop protection active ingredient. In an embodiment, the planting equipment delivers the agricultural composition that comprises a fertilizer component and a crop protection active ingredient simultaneously.

A method of increasing yield of a crop plant, the method includes broadcast spreading an extended release agricultural composition to a field comprising a plurality of crop plants, wherein the extended release composition comprises a polymer layer that has a water permeability of 10 to 500 g/m2/day at 25 degrees Celsius; and wherein the extended release composition is between about 6 and 14 mm in diameter; and growing the crop plant in a crop growing environment and thereby increasing the yield of the crop plant. In an embodiment, the agricultural composition comprises about 0.1 to 0.8 grams of nitrogen and the polymer layer is about 8-250 microns thick.

In an embodiment, specifications for core materials include: round cores "Spheres"; target mass—535 mg+/−25 mg (average); diameter—9.3 mm+/−0.5 mm (within +/−0.3 mm); sphericity (consistency in shape, so that the diameter measured from arbitrary points is consistent within the bead). One way to describe sphericity is as follows: any quarter-sphere generated by 3 high points on the sphere surface, from the same sphere centerpoint, must have radii to low points within 0.1 mm of the quarter-sphere. Another way to describe this specification would be to say a 0.22" (5.5 mm) diameter ring (or 2D circle) placed anywhere on the sphere to be in full contact of the sphere surface with the max gap being under 0.1 mm (0.004"); surface roughness of about—<24 micro-inches; hardness—>200 N (hardness as measured using a Sotax HT1 (Westborough, Mass.), consistent with method USP 1217).

In an embodiment, specifications for tablet cores include for example: free flowing granules for tablet production; sieve mesh oversize (>18 mesh, 1.00 mm); obtaining the <18 mesh fraction and removing the fines via an air classifier or sieve such that about 80% to 90% of the product granules are between 18 and 60 mesh (1.0-0.25 mm). Urea granules can be blended well with other granules having a median size between 0.50 and 0.70 mm, and with >80% of the other granules being between 18 and 60 mesh (1.0-0.25 mm). Tablets—⅜" diam, extra deep cup shape, 535 mg; Tablet mass target=535 mg, +/−25 mg; Tablet diameter & shape—9.55+/−0.10 mm, preferred is extra deep cup shape, consistent with ⅜" punch and die (Table 10, Tableting Specification Manual, 7th edition (American Pharmaceutical Association, 2005). Thickness—7.45 mm+/−0.10 mm (thickness may be changed to ensure the average mass is consistent); hardness—>200 N.

DETAILED DESCRIPTION

Figure 1:
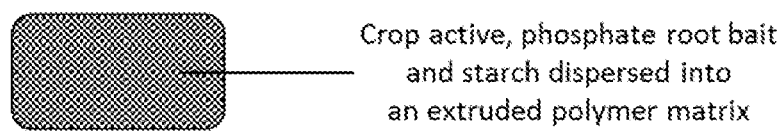
FIG. 1 is an illustration for an extended release composition formed by melt extrusion consisting of a mixture of a crop protection agent, phosphate root bait, starch and extrudable, biodegradable polymer (prototypes 1 and 2).
Figure 2:
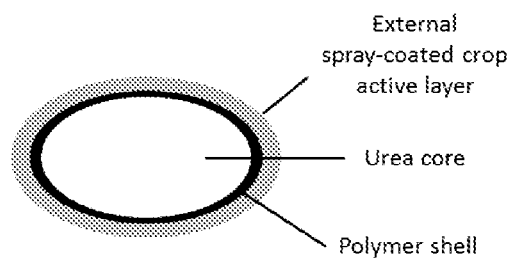
FIG. 2 is a schematic illustration (for prototypes #3 and #4) that depicts an extended release composition consisting of a urea nutrient core surrounded by a polymer shell with a spray-coated crop protection agent located on the outside.
Figure 3:
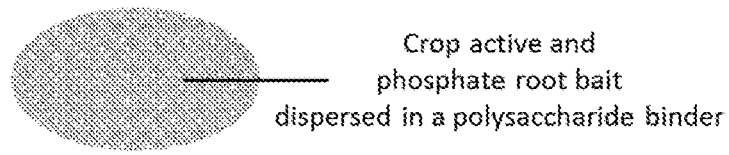
FIG. 3 is a schematic illustration (for prototypes #5 and #6) that depicts an extended release composition formed by compacting a mixture of a crop protection agent, phosphate root bait and a polysaccharide binder into a tablet or bead form.
Figure 4:
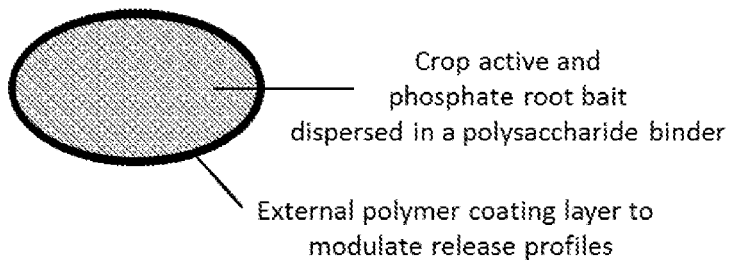
FIG. 4 is a schematic illustration (alternate prototype) that depicts an extended release composition formed by compacting a mixture of a crop protection agent, phosphate root bait and a polysaccharide binder into a tablet or bead form surrounded by an external biodegradable polymer layer.
Figure 5:
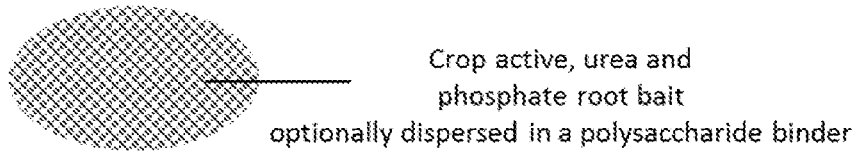
FIG. 5 is a schematic illustration (alternate prototype) that depicts an extended release composition formed by compacting a mixture of a crop protection agent, urea nutrient, phosphate root bait and a polysaccharide binder into a tablet or bead form.
Figure 6:
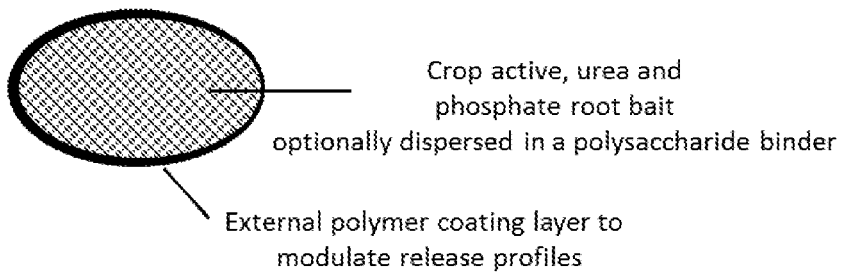
FIG. 6 is a schematic illustration (alternate prototype) that depicts an extended release composition formed by compacting a mixture of a crop protection agent, urea nutrient, phosphate root bait and a polysaccharide binder into a tablet or bead form surrounded by a biodegradable polymer layer.
Figure 7:
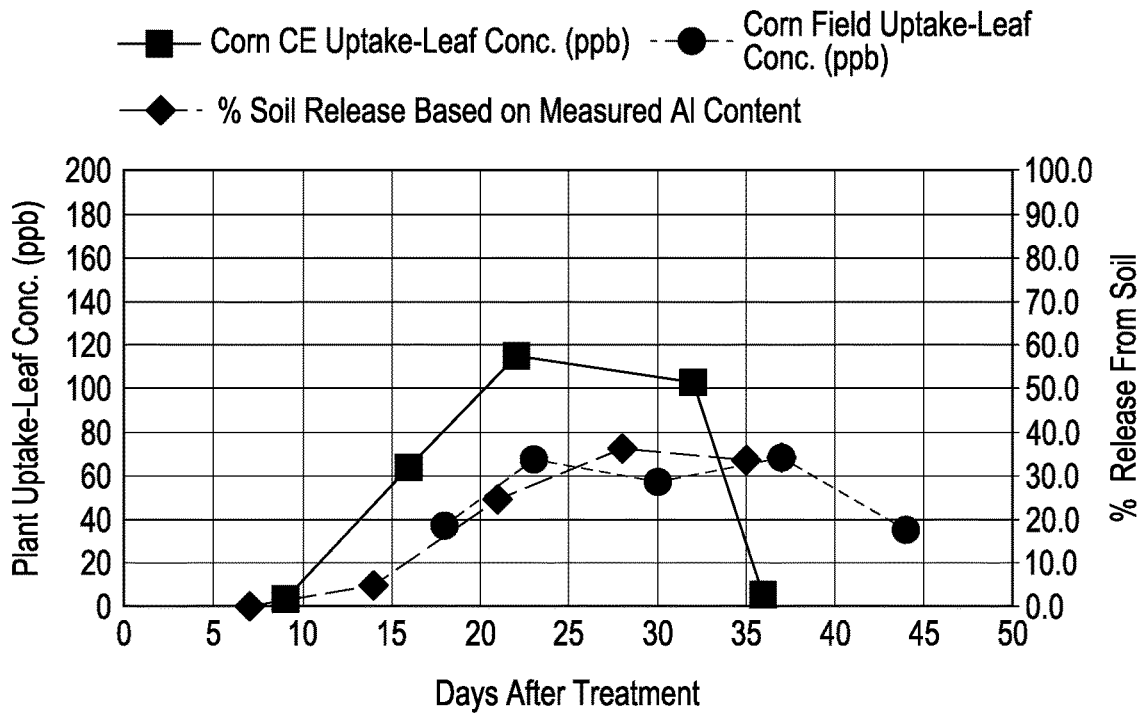
FIG. 7 shows the time dependent release of the crop protection agent HGW from Prototype #1 into soil and the corresponding uptake of HGW into corn plants grown in controlled environment and Location 1 field settings.
Figure 8:
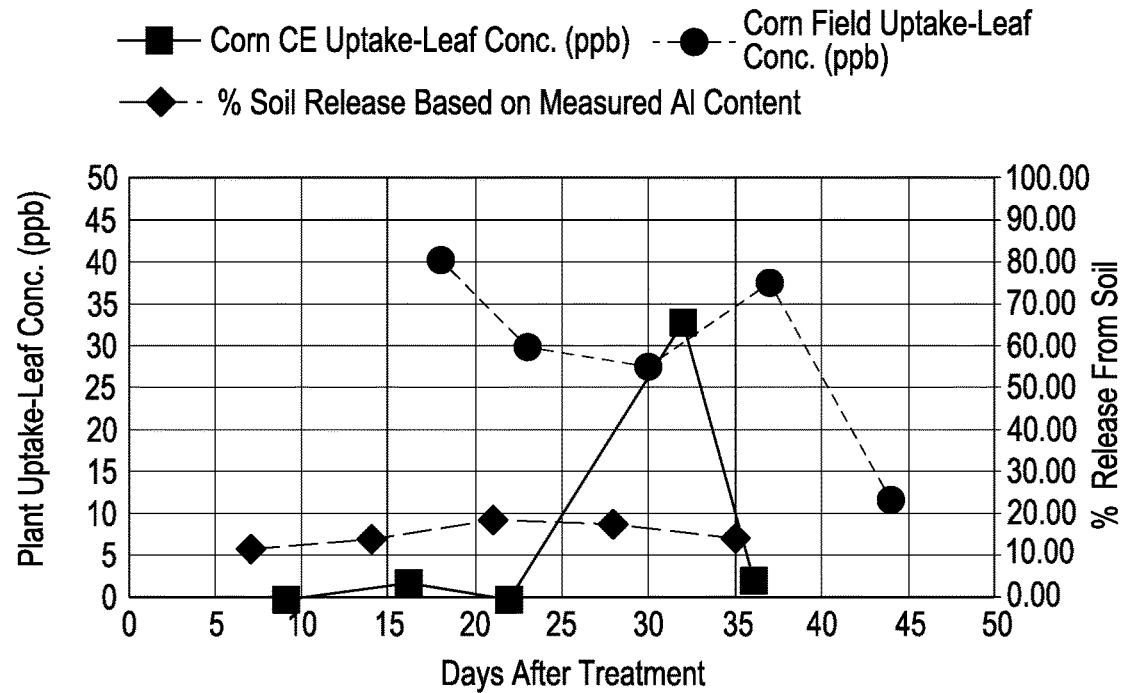
FIG. 8 shows the time dependent release of the crop protection agent HGW from Prototype #3 into soil and the corresponding uptake of HGW into corn plants grown in controlled environment and Location 1 field settings.
Figure 9:
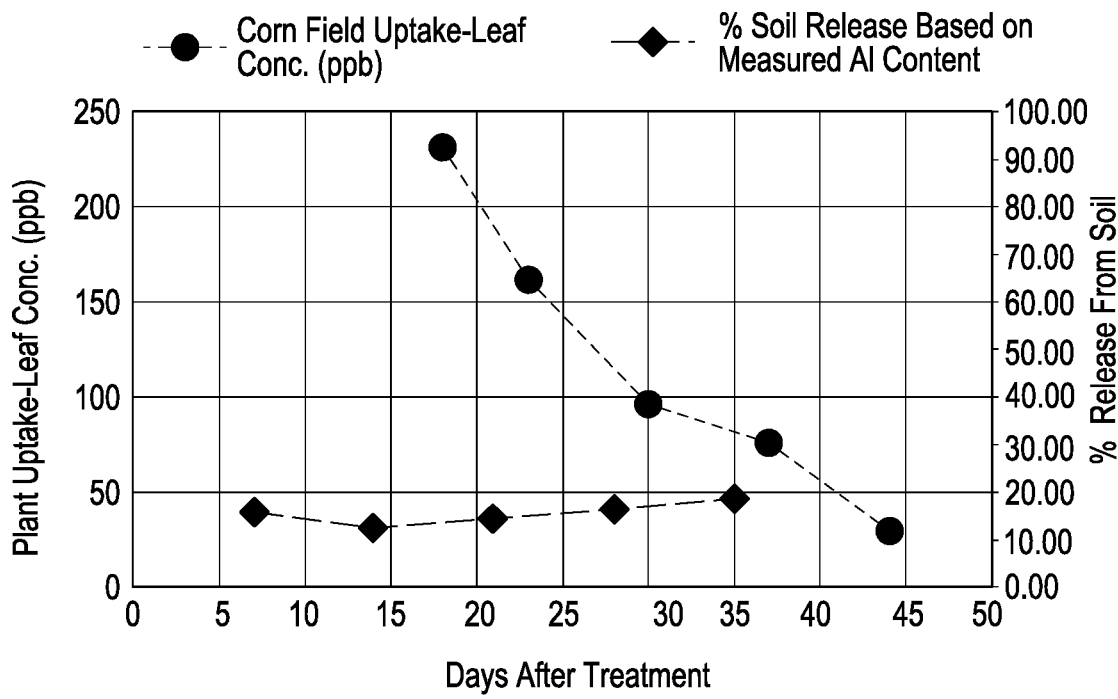
FIG. 9 shows the time dependent release of the crop protection agent HGW from Prototype #5 into soil and the corresponding uptake of HGW into corn plants grown in the field in Location 1.
Figure 10:
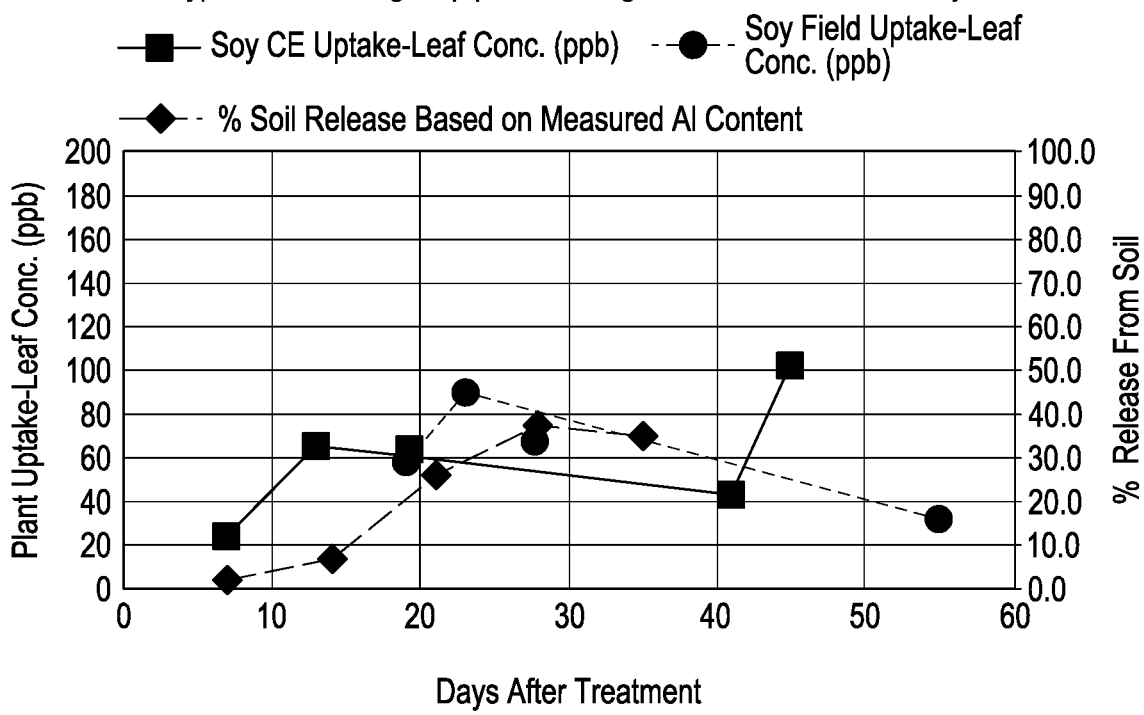
FIG. 10 shows the time dependent release of the crop protection agent HGW from Prototype #1 into soil and the corresponding uptake of HGW into soybean plants grown in controlled environment and Location 1 field settings.
Figure 11:
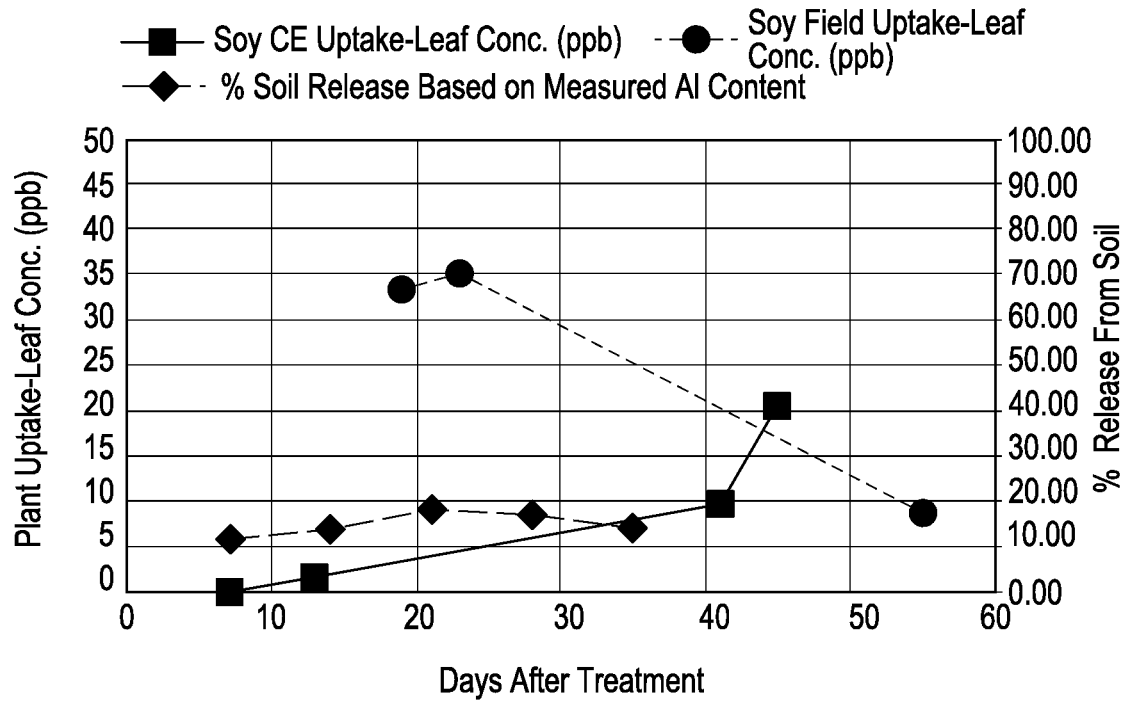
FIG. 11 shows the time dependent release of the crop protection agent HGW from Prototype #3 into soil and the corresponding uptake of HGW into soybean plants grown in controlled environment and Location 1 field settings.
Figure 12:
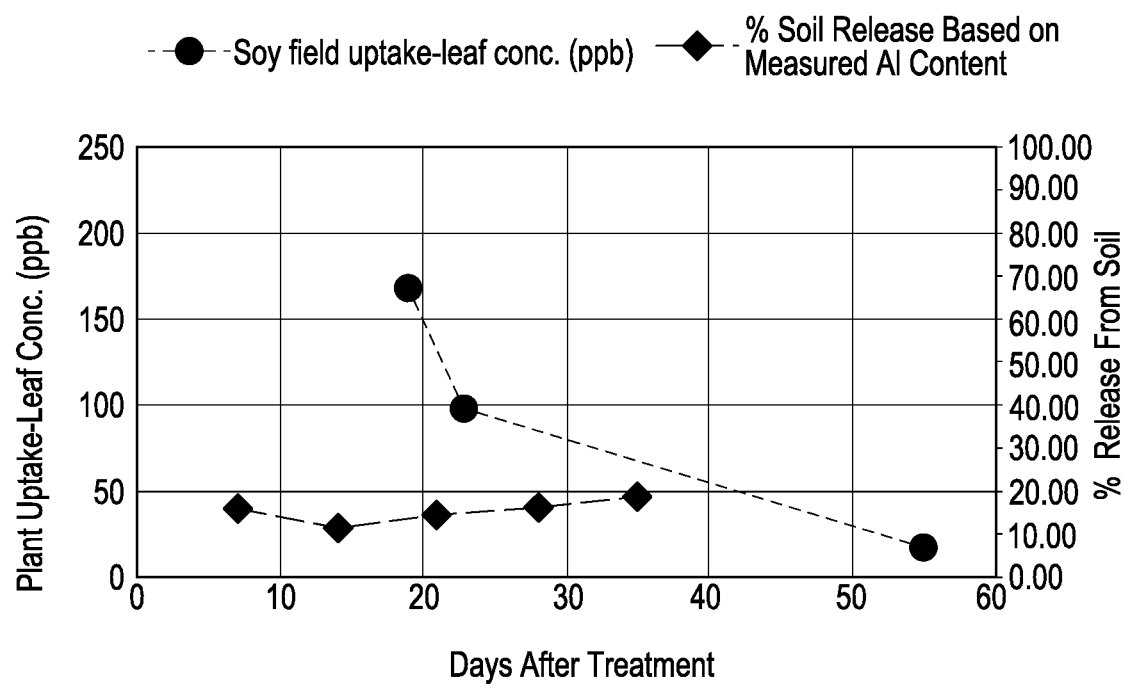
FIG. 12 shows the time dependent release of the crop protection agent HGW from Prototype #5 into soil and the corresponding uptake of HGW into soybean plants grown in the field in Location 1.
Figure 13:
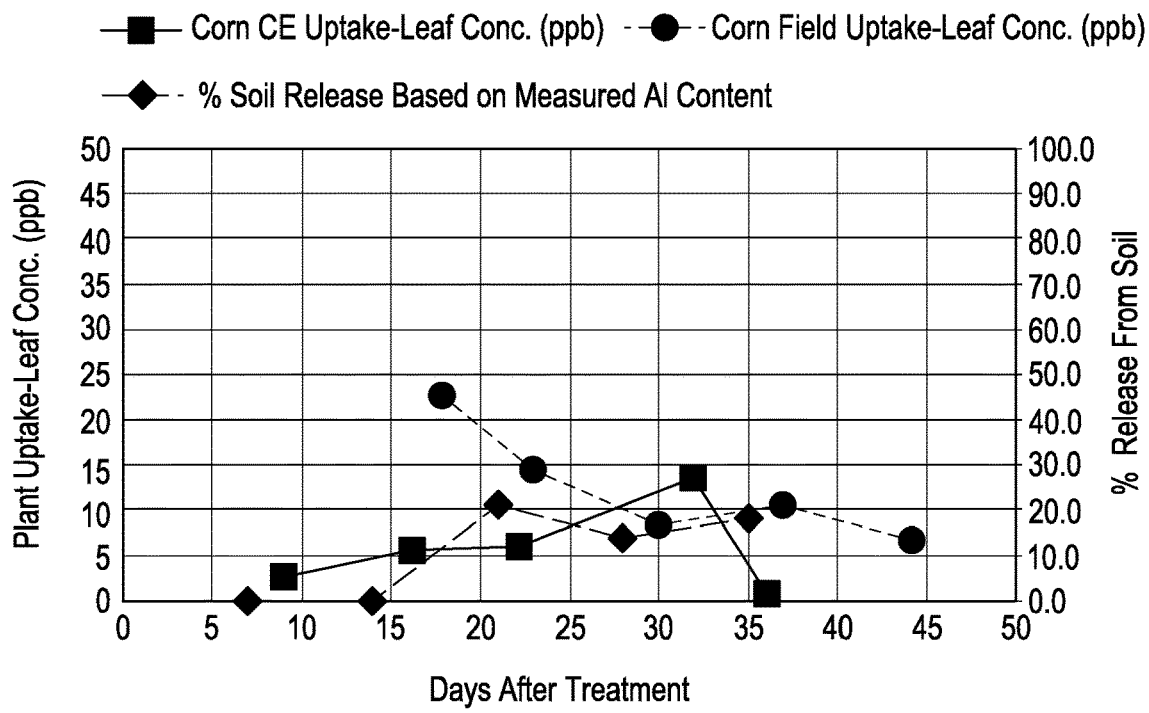
FIG. 13 shows the time dependent release of the crop protection agent E2Y from Prototype #2 into soil and the corresponding uptake of E2Y into corn plants grown in controlled environment and Location 1 field settings.
Figure 14:
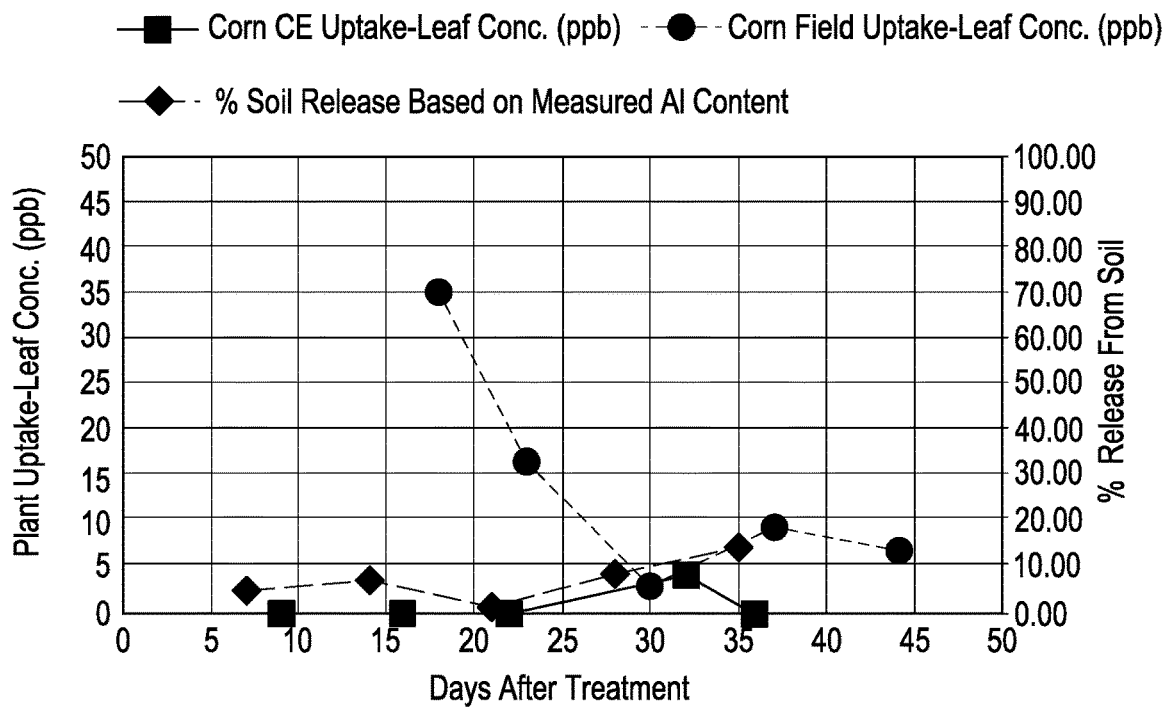
FIG. 14 shows the time dependent release of the crop protection agent E2Y from Prototype #4 into soil and the corresponding uptake of E2Y into corn plants grown in controlled environment and Location 1 field settings.
Figure 15:
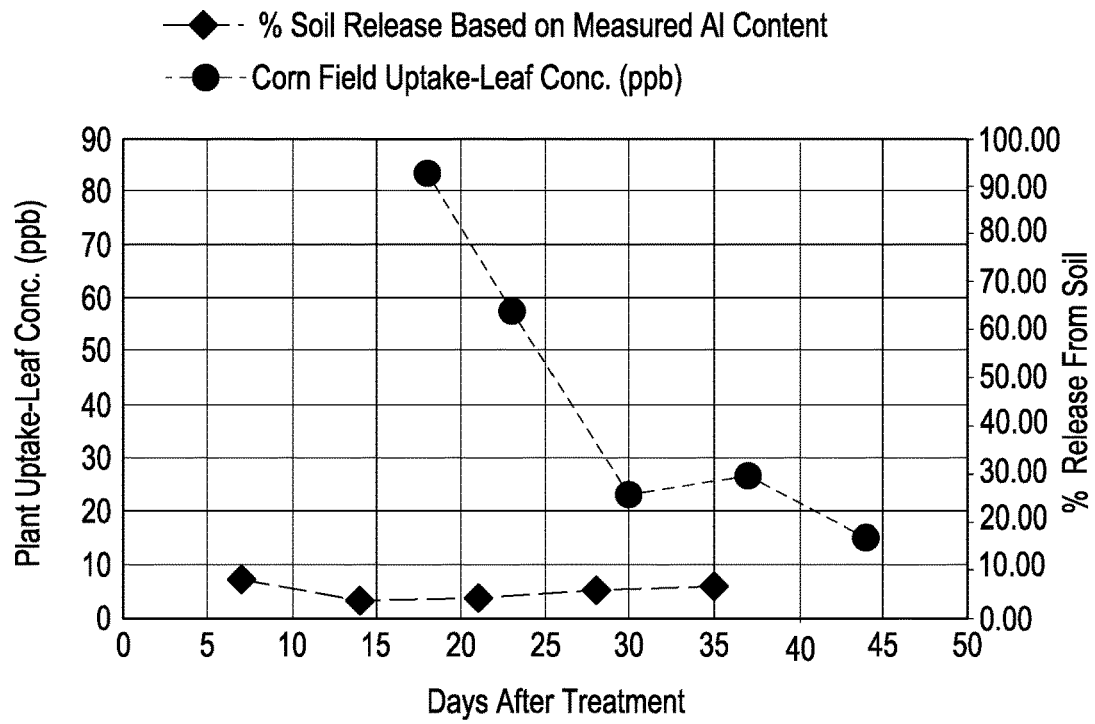
FIG. 15 shows the time dependent release of the crop protection agent E2Y from Prototype #6 into soil and the corresponding uptake of E2Y into corn plants grown in the field in Location 1.
Figure 16:
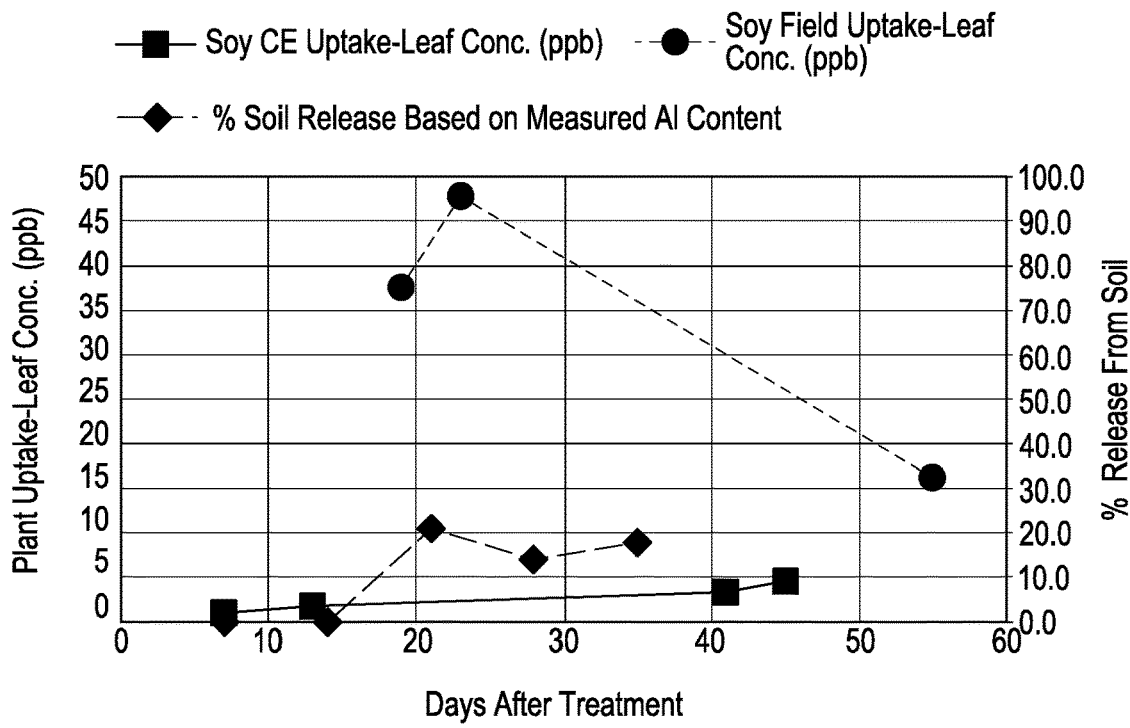
FIG. 16 shows the time dependent release of the crop protection agent E2Y from Prototype #2 into soil and the corresponding uptake of E2Y into soybean plants grown in controlled environment and Location 1 field settings.
Figure 17:
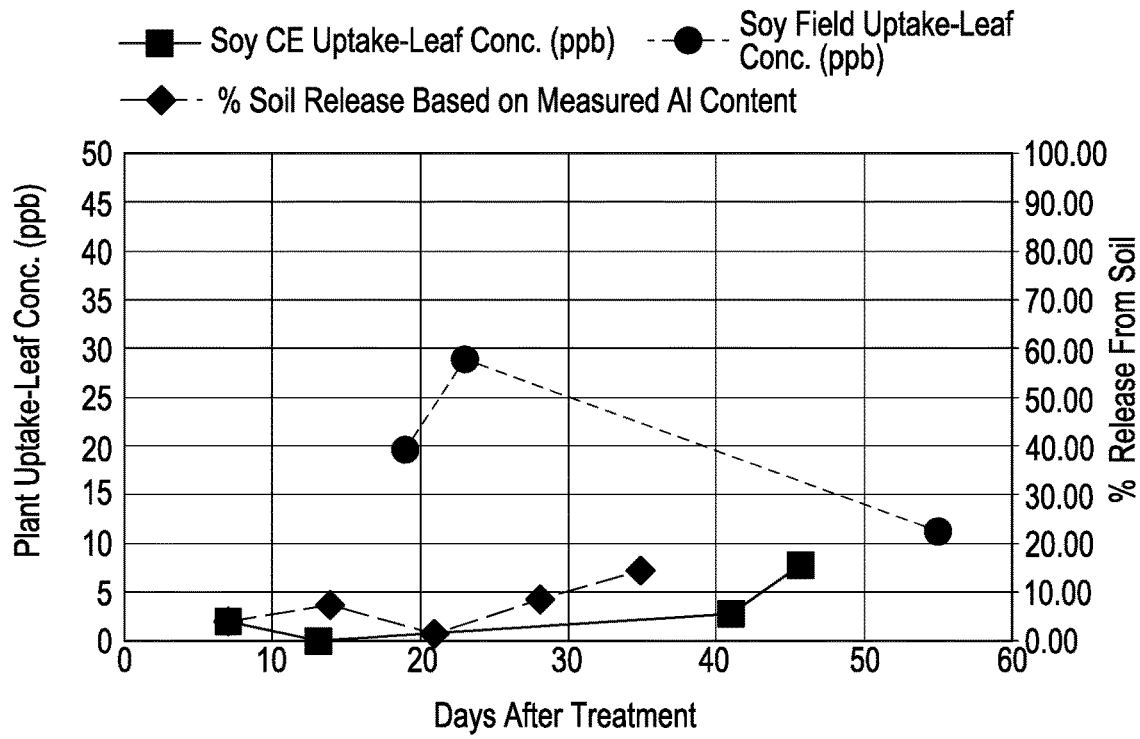
FIG. 17 shows the time dependent release of the crop protection agent E2Y from Prototype #4 into soil and the corresponding uptake of E2Y into soybean plants grown in controlled environment and Location 1 field settings.
Figure 18:
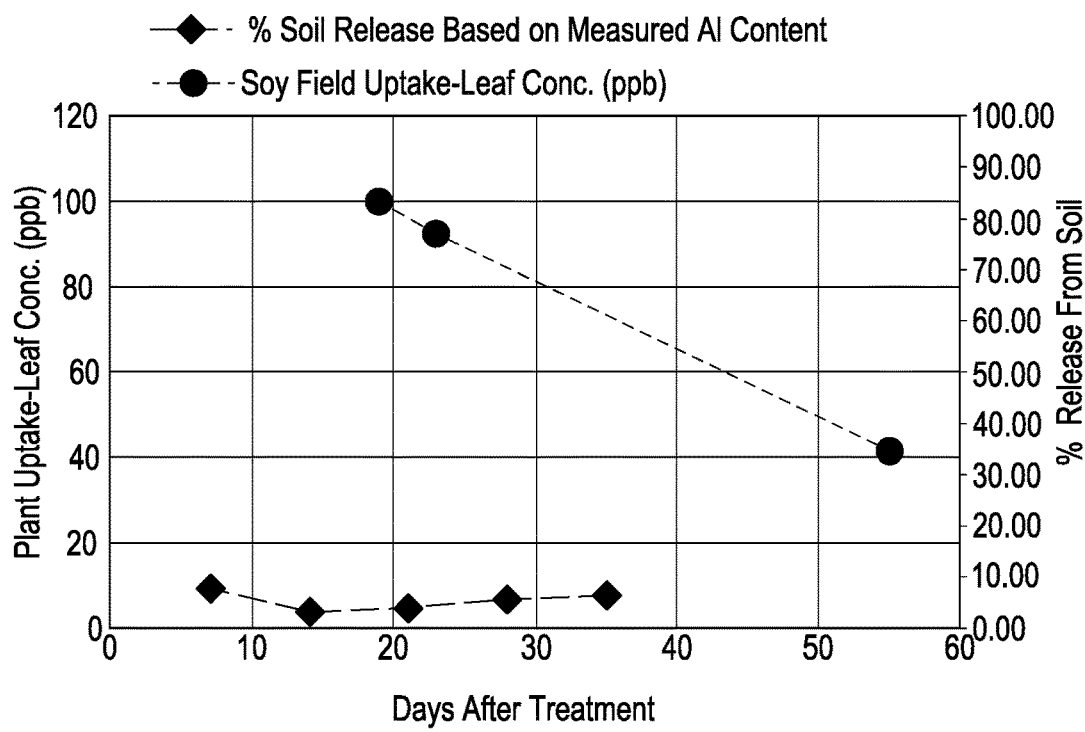
FIG. 18 shows the time dependent release of the crop protection agent E2Y from Prototype #6 into soil and the corresponding uptake of E2Y into soybean plants grown in the field in Location 1.

An agricultural composition that includes a biodegradable polymer, a crop protection agent, a root proliferant, and optionally an inert ingredient is disclosed, wherein the crop protection agent and the root proliferant are substantially dispersed in a matrix, and in an embodiment, the matrix encapsulated by a polymer layer such that the agricultural composition has an overall water permeability of about 1 to about 2000 g/m2/day at 25 degrees Celsius; (b) the root proliferant comprises phosphate in a weight % of about 1-70%; and (c) the agricultural composition has a mass of about 0.01 g to about 5.00 g and a length to diameter aspect ratio of about 0.5-2.0. In embodiment, the root proliferant and the crop protection agent are not surrounded by a polymer layer but the composition includes a binder or one or more components that reduce the rapid diffusion of the root proliferant and/or the crop protection agent.

Suitable weight % ranges for the root proliferant include for example 1-5, 10, 15, 20, 25, 30, 35, 40, 50, 60, 70, 80, 90, 95 or 99%. Suitable weight ranges for the crop protection agent include for example, 0.01, 0.05, 0.10, 0.20, 0.25, 0.50, 0.75, 1.0, 2.0, 3.0, 4.0, 5.0% or such higher or lower percentages that may be needed depending on the nature of the crop protection agent. For example, efficacy, water solubility, bioavailability in the soil, stability, movement within the plant, degradation rate and other factors of the crop protection agent, the weight % in a particular composition may change.

An agricultural composition includes a biodegradable binder, a crop protection agent, a root proliferant, and optionally an inert ingredient, wherein the crop protection agent and the root proliferant are substantially dispersed in a matrix comprising the binder such that the root proliferant exhibits low to moderate solubility in soil or the crop protection agent is applied on the surface of a core structure comprising the root proliferant; (b) the root proliferant selected from the group consisting of phosphate, ammonium, nitrate and a combination thereof, in a weight % of about 1-95%; and (c) the agricultural composition has a mass of about 0.0100 g to about 5.000 g and a length to diameter aspect ratio of about 0.5-2.0. Other suitable mass of the agicultural composition include from example, 0.05, 0.25, 0.5, 1.0, 1.5, 2.0, 3.0, 4.0, 5.0 or higher.

An agricultural composition comprising a polysaccharide binder, a crop protection agent, a root proliferant, an optional inert ingredient and a biodegradable polymer layer, wherein (a) the crop protection agent and the root proliferant are substantially dispersed in a matrix comprising the polysaccharide binder, wherein the matrix is substantially encapusulated by the biodegradable polymer layer such that the agricultural composition has an overall water permeability of about 1 to about 2000 g/m2/day at 25 degrees Celsius; (b) the root proliferant comprises phosphate in a weight % of about 1-50%; and (c) the agricultural composition has a mass of about 0.01 g to about 0.750 g and a length to diameter ratio of about 0.5-2.0. Suitable weight % ranges for phosphate root proliferant include for example 1-5, 10, 15, 20, 25, 30, 35, 40, 50, 60, 70, 80, 90, 95 or 99%.

An agricultural composition comprising a biodegradable polymer, a crop protection agent, a root proliferant, and optionally an inert ingredient, wherein (a) the root proliferant selected from the group consisting of phosphate, ammonium, nitrate and a combination thereof, in a weight % of about 1-95%, is substantially dispersed in a central core; (b) the biodegradeable polymer layer substantially encapsulates the central core; (c) the crop protection agent is coated on the surface of the polymer layer; and (d) the agricultural composition has a mass of about 0.0100 g to about 5.000 g and a length to diameter aspect ratio of about 0.5-2.0.

In an embodiment, the phosphate is calcium phosphate or ammonium magnesium phosphate. In an embodiment, the agricultural composition further includes a macro or micro nutrient selected from the group consisting of N, K, Mg, Zn, $NH_3$, Mn, Fe, Cu and a combination thereof at a concentration that is effective to induce root growth of a crop plant.

In an embodiment, the polymer is a biodegradable aliphatic polyester. In an embodiment, the polymer is poly (butylene succinate adipate) (PBSA) or polyurethane (PU). In an embodiment, the polymer is polylactic acid comprising a weight averaged molecular weight of about 20 kDa to about 150 kDa.

A method of producing an agricultural composition comprising a biodegradable polymer, a crop protection agent, a root proliferant, and optionally an inert ingredient, the method comprising performing an extrusion process such that the crop protection agent, the root proliferant are sufficiently mixed with the biodegradable polymer component such that the crop protection agent and the root proliferant are substantially dispersed in a matrix comprising the polymer, wherein the agricultural composition has an overall water permeability of about 1 to about 2000 g/m$^2$/day at 25 degrees Celsius.

A method of increasing uptake of a crop protection agent in a crop plant, the method comprising providing an agricultural composition comprising a biodegradable polymer, a crop protection agent, a root proliferant, and optionally an inert ingredient, wherein the agricultural composition is placed at a distance that is effective to promote root proliferation of the crop plant; and thereby increasing the uptake of the crop protection agent when compared to a control plant not exposed to the agricultural composition. In an embodiment, the root proliferant is low to moderately soluble phosphate.

An agricultural composition comprising a binder, a crop protection agent, a root proliferant, an optional inert ingredient, wherein (a) the crop protection agent and the root proliferant are substantially dispersed in a matrix comprising the polysaccharide binder, wherein the root proliferant and the crop active agent are present in a ratio of about 1000:1 to about 10:1; (b) the root proliferant comprises a low to moderate solubility phosphate in a weight % of about 1-50%; and (c) the agricultural composition has a mass of about 0.01 g to about 5.00 g and a length to diameter ratio of about 0.5-2.0. Suitable ratio for the root proliferant: crop protection agent include for example 5000:1; 4000:1; 3000:1; 2500:1; 2000:1; 1500:1; 1000:1; 900:1; 800:1; 700:1; 600:1; 500:1; 400:1; 300:1; 250:1; 200:1; 150:1; 100:1; to about 10:1.

In an embodiment, the polymer layer is about 0.3 mil to about 10.0 mil thick, with suitable sub-ranges such as 0.5-1; 1-2; 2-3; 3-4; 4-5; 5-6; 6-7; 7-8; 8-9; and 9-10 mil thickness are envisioned by this disclosure. In an embodiment, the polymer layer constitutes about 0.5% to no more than about 10% of the total weight of the composition. In an embodiment, the polymer constitutes about 5% to no more than about 90% of the total weight of the composition. In an embodiment, the inert constitutes about 1% to about 50% of the total weight of the composition In an embodiment, the agricultural composition is in a non-spherical form, a sphere, a bead, a cylinder, a tablet or a briquette. In an embodiment, the root proliferant and the crop protection agent are mono-dispersed. In an embodiment, the composition is configured to flow through a seed planter or applied by a broadcast spreader. In an embodiment, the seed planter moves at a speed about 5-15 mph and the agricultural composition is planted at a density of about 10,000 to about 300,000/acre.

In an embodiment, the agricultural composition has a release profile of about 10-50% cumulative release of the crop protection agent in a crop growing field by about 40 days after planting. In an embodiment, the agricultural composition has a release profile of about 60-90% cumulative release of the crop protection agent in a maize growing field by about 60-90 days after planting.

A method of producing an agricultural composition comprising a biodegradable polymer, a crop protection agent, a root proliferant, and optionally an inert ingredient, the method comprising performing an extrusion process such that the crop protection agent, the root proliferant are sufficiently mixed with the biodegradable polymer component such that the crop protection agent and the root proliferant are substantially dispersed in a matrix comprising the polymer, wherein the agricultural composition has an overall water permeability of about 1 to about 2000 g/m2/day at 25 degrees Celsius.

In an embodiment, the extrusion process is hot melt extrusion. In an embodiment, the the agricultural composition comprises a filler. In an embodiment, the filler is hydrophilic. In an embodiment, the filler is starch or a polysaccharide or a combination thereof. In an embodiment, the polymer component comprises about 50% to about 90% by weight of the agricultural composition.

A method of increasing uptake of a crop protection agent in a crop plant, the method comprising providing an agricultural composition comprising a biodegradable polymer, a crop protection agent, a root proliferant, and optionally an inert ingredient, wherein the agricultural composition is placed at a distance that is effective to promote root proliferation of the crop plant; and thereby increasing the uptake of the crop protection agent when compared to a control plant not exposed to the agricultural composition. In an embodiment, the agricultural composition may be preferentially placed within about 1-12 inches from the position or location of the seed and about 1-6 inches deep.

In an embodiment, the root proliferant is low to moderately soluble phosphate. In an embodiment, the root proliferant comprises a water solubility range of about 0.0.01 g/L to about 25.00 g/L; 0.05 g/L to about 10.00 g/L; about 0.08 g/L to about 10.0 g/L; about 0.10 g/L to about 2.00 g/L; about 0.15 g/L to about 5.00 g/L; 0.20 g/L to about 0.50 g/L; about 0.25 g/L to about 1.0 g/L.

In an embodiment, the root proliferant is selected from the group consisting of dicalcium phosphate dehydrate, ammonium phosphate, magnesium ammonium phosphate, and a combination thereof. Other suitable root proliferants include for example, biological elicitor molecules, microbial organisms, microbially derived products, LCOs, synthetic root proliferant compounds, and other components that are developed to stimulate root proliferation.

In an embodiment, the crop protection agent is selected from the group consisting of an insecticide, a fungicide, a nematicide, a herbicide and a combination thereof.

In an embodiment, the uptake of the crop protection agent is at least about 10% to about 90% higher when compared to a control plant not exposed to the agricultural composition, but wherein the control plant is exposed to a seed applied composition that includes at least substantially the same amount of the crop protection agent present in the agricultural composition. In an embodiment, the uptake is measured at about 14-48 days of planting. In an embodiment, the uptake efficiency of a plant (e.g., maize, soy, cotton, rice, wheat, barley, sorghum) increases by up to 10%, 20%, 30%, 40%, 50%, 60%, 70%, 80%, 90%, 100%, 150%, and 200% compared to a control plant that has been exposed to at least the same amount of the active ingredient present in the crop protection agent as the agricultural composition disclosed herein, but by a different mode of delivery—including for example, as a seed applied component, as a foliar spray, or an in furrow/drench application.

In an embodiment, the uptake of the crop protection agent is at least about 0% to about 50% higher when compared to a control plant not exposed to the agricultural composition, but wherein the control plant is exposed to a seed applied composition that includes at least about 10-50% more crop protection agent as compared to the agricultural composition or contains substantially the same amount of the crop protection agent present in the agricultural composition.

In an embodiment, the crop protection agent concentration as measured in the leaf of a crop plant is about 10% to about 200% higher than a control plant with the crop protection agent applied as a seed treatment at the label rate when measured for example, at about 40 days after planting.

A method of increasing yield of a crop in a field, the method comprising providing an agricultural composition during planting of the crop seed in the field, wherein the agricultural composition comprises a root proliferant component, wherein the root proliferant releases about 70-90 cumulative % of phosphate between about 30-90 days into soil after planting the crop seed and comprises about 0.002 to about 2.0 grams of phosphate; and a crop protection agent, wherein the crop protection agent is released into soil such that about 70-90 cumulative % of the crop protection agent is available to the crop during about 20-100 days after planting the crop seed; wherein the agricultural composition comprises a biodegradable polymer layer having a water permeability of about 1 to about 2000 g/m2/day at 25 degrees Celsius and thereby increasing the yield of the crop.

The use of numerical values in the various ranges specified in this application, unless expressly indicated otherwise, are stated as approximations as though the minimum and maximum values within the stated ranges were both preceded by the word "about". In this manner, slight variations above and below the stated ranges can be used to achieve substantially the same results as values within the ranges. Also, the disclosure of these ranges is intended as a continuous range including each and every value between the minimum and maximum values.

Substantially free generally refers to absence of one or more components such that the detectable amount of such components are below a certain level where such low level presence does not alter the desirable characteristics of a compositions. For example, substantially free can mean the presence of a component less than 0.01%, 0.1%, 1%, 2%, 3%, 4%, 5%, or up to 10% of the total composition by weight. Substantially free can also include that a component is below the detectable limit threshold. For example, the term "substantially free of polyurethane" means that polyurethane is present only in trace quantity or at a low level that does not alter the desirable characteristics of a composition, such as, for example PLA.

An agricultural composition includes a root proliferant core comprising from about 0.1 to 0.8 grams of the root proliferant; and a polymer layer surrounding the core; wherein the polymer layer has a water permeability of about 1 to about 2000 g/m2/day at 25 degrees Celsius and wherein the composition is configured to be placed in a field at a predetermined distance from a row crop seed whereby the fertilizer composition delivers an effective amount of nitrogen during the reproductive growth stage of the row crop. Other suitable ranges of water permeability for the polymer layer include for example, about 10 to about 500; 100-200, 50-500, 100-500; 200-500; 300-600; 500-1000; 50-100; 100-1000 g/m2/day at 25 degrees Celsius.

Water solubility is measured in mg/L, the weight of e.g., pesticide (in milligrams) that will dissolve in one liter of water (L).

Low water solubility: less than 10 mg/L or 10 ppm
Moderate water solubility: 10-1,000 mg/L or 10-1,000 ppml
High water solubility: more than 1,000 mg/L or 1,000 ppml
Ronald Ney, "Fate and Transport of Organic Chemicals in the Environment" (1995); p. 10.

An agricultural composition includes a root proliferant core; and a layer of a polymer surrounding the core; and a crop protection agent associated with the polymer or the root proliferant core, wherein the agricultural composition has a water permeability of about 1 to about 2000 g/m2/day at 25 degrees Celsius; and wherein the composition is between about 6 and 14 mm in diameter. Other suitable diameter ranges for the composition include for example, about 8-12 mm; 7-10 mm; 8-14 mm; 7-14 mm; 6-10 mm; 9-13 mm; 5-15 mm and 10-15 mm.

In an embodiment, the agricultural composition has an aspect ratio of between about 1 and 3. In an embodiment, the agricultural composition is in the form of a sphere. In an embodiment, the agricultural composition is in a non-spherical form. In an embodiment, the agricultural composition is in the form of a cylinder. In an embodiment, the cylinder comprises either flat or rounded ends. In an embodiment, the agricultural composition is in the form of a briquette. In an embodiment, the agricultural composition is in the form of a mono-dispersed sphere.

In an embodiment, the agricultural composition is configured to flow through a seed planter. In an embodiment, the seed planter moves at a speed about 2-20 or 5-15 mph and the agricultural composition is planted at a density of about 10,000 to about 300,000/acre, wherein each of the agricultural composition comprises about 100, 200, 300, 400, 500, 600, 700, 800, 900, 1000, 1100, and 1200 mg of root proliferant. Suitable ranges of a root proliferant, for example in the form of calcium phosphate dihydrate, include for example, up to 200, 300, 400, 500, 600, 700, 800, 900, 1000 and 1500 mg per bead or tablet disclosed herein.

In an embodiment, the polymer layer is a biodegradable aliphatic polyester. In an embodiment, the polyester is polylactic acid comprising a weight averaged molecular weight of about 20 kDa to about 150 kDa. In an embodiment, the polymer layer is about 0.3 mil to about 10.0 mil thick. In an embodiment, other thicknesses include for example, 0.2-5; 0.5-2.0; 1.0-5.0; 0.4-4; 0.5; 0.6; 0.7; 0.8; 0.9; 1.0; 1.5; 2.0; 2.5; 3.0; 3.5; 4.0; 4.5; 5; 5.5; 6.0; 6.5; 7.0; 7.5; 8.0; 8.5; 9.0; 9.5; and 10.0 mil. In an embodiment, the polymer layer constitutes about 0.5% or 2% to no more than about 10% of the total weight (or amount) of the fertilizer composition. Suitable weight % include for example, 0.2, 0.4. 0.5, 0.6, 0.7, 0.8, 1.0, 1.5, 2, 2.5, 3, 3.5, 4, 4.5, 5, 5.5, 6, 6.5, 7, 7.5, 8, 8.5, 9, 9.5 and 10.

In an embodiment, the agricultural composition is in a shape as designated as 'round convex' tablets, made using tooling for "standard cup depth" or "extra deep cup depth," as defined in table 10 of the Tableting Specification Manual, 7th edition, page 71, American Pharmacists Association, Washington D.C., 2006 (TSM-7). Table 10 of the Tableting Specification Manual describes punch tip diameters ranging from about 3.175 mm for a standard cup depth of 0.432 mm or an extra-deep cup depth of 0.762 mm to about 25.4 mm for a standard cup depth of 1.854 mm or an extra-deep cup depth of 4.851 mm. Based on the description and guidance provided herein, one of ordinary skill in the art can choose an appropriate size and shape for the agricultural compositions described herein.

In an embodiment, the agricultural composition has a release profile of about 15-25% cumulative phosphate release in a crop growing field by about 40 days after planting. In an embodiment, the cumulative phosphate release is about 60-90% in a maize growing field by about 30-90 days after planting. In an embodiment, suitable cumulative phosphate release includes about 40-70%; 50-80%; 40-90%; 50-90%; 70-90%; 80-90%; 60-80%; 60-95% and 50-100% within about 20-150 days of planting. Other suitable cumulative % N release includes about 30, 35, 40, 45, 50, 55, 60, 65, 70, 75, 80, 85, 90, 95, and 100.

Depending on the crop (e.g., annual or perennial) the % phosphate released and the timing of such release can be determined based on the disclosure herein and the various release profiles of the compositions disclosed. Suitable timing ranges include for example, of about 20, 30, 40, 50, 60, 70, 80, 90, 100, 110, 120, 130, 140, 150, 160, 170, 180, 190, and 200 days for annual crops and longer duration for perennial crops in the range of up to about 30, 90, 120, 150, 180, 210, 240, 270, and 300 days.

In an embodiment, the agricultural composition has a hardness parameter between about 50N to about 150N. In an embodiment, the hardness parameter is about 100N. Suitable hardness parameter includes for example up to 200N, 250N, 300N, 350N, 400N and 500N; 100-300N, 50-500N, 200-300N, 250-500N, and any range within 50-500N.

A method of producing an extended-release agricultural composition, the method includes providing a root proliferant core having a size aspect ratio of between about 1 and 3; placing the root proliferant core in a polymer layer film, wherein the polymer layer comprises a thickness of about 0.4 mil to about 10.0 mil; and applying force such that the polymer layer substantially wraps the core and the polymer layer is substantially in contact with the core.

In an embodiment, the heat is applied to the polymer layer to substantially wrap the fertilizer composition. In an embodiment, the polymer layer has a water permeability of 10 to 500 g/m2/day at 25 degrees Celsius and wherein the agricultural composition is configured to be placed in a field at a predetermined distance from a row crop seed whereby the fertilizer composition delivers an effective amount of the root proliferant and the crop protection agent during the actove growth stage of the row crop or during the development stage that is most susceptible to a pest.

A method of increasing yield of a crop in a field, the method includes providing an agricultural composition during planting of the crop seed or prior to planting or after planting, in the field, wherein the agricultural composition comprises a root proliferant and one or more crop protection agents, wherein the root proliferant composition releases about 70-90 cumulative % of root proliferant (e.g., phosphate) between about 30-90 days into soil after planting the crop seed; and a crop protection agent composition, wherein the crop protection composition is released into the soil such that about 70-90 cumulative % of one or more active ingredients in the crop protection composition is available to the crop during about 20-100 days after planting the crop seed; wherein the agricultural composition comprises a biodegradable polymer layer and thereby increasing the yield. In an embodiment, suitable cumulative crop protection active ingredient release includes about 40-70%; 50-80%; 40-90%; 50-90%; 70-90%; 80-90%; 60-80%; 60-95% and 50-100% of the total active ingredient present in the composition within about 20-150 days of planting. Other suitable cumulative % crop protection active ingredient release includes 30, 35, 40, 45, 50, 55, 60, 65, 70, 75, 80, 85, 90, 95, and 100. The mid to late season pests for a particular crop depends on the nature of the crop, the location and the appearance of the pest pressure. For example, mid/late season pests may appear during the reproductive stage of a plant.

In an embodiment, the crop is selected from the group consisting of maize, soybean, wheat, rice, sorghum, millet and barley. In an embodiment, the fertilizer composition a nutrient selected from the group consisting of nitrogen, phosphorus, potassium and a combination thereof. In an embodiment, the agricultural composition is provided at planting of the crop seed or prior to planting the crop seed. In an embodiment, the soil is classified as a soil type that has a lower water holding capacity.

In an embodiment, the crop protection composition is selected from the group consisting of an insecticide, a fungicide, a nematicide and a combination thereof.

In an embodiment, the crop protection composition is selected from the group consisting of an anthranilic diamide insecticide, a neonicotinoid insecticide and a combination thereof. In an embodiment, the neonicotinoid insecticide is released into the soil such that an effective amount of the insecticide is present in the soil when the target pest is present in the field during the later developmental stages of the crop. In an embodiment, the anthranilic diamide insecticide is released into the soil such that an effective amount of about 5-60 g/hectare is present in the soil after about 20-100 days from providing the agricultural composition in the field.

In an embodiment, the field is characterized by the presence of one or more late season pests that target corn or soybeans. In an embodiment, the mid-late season pest is corn root worm, corn ear worm, and/or fall army worm.

In an embodiment, the crop protection composition is selected from the group consisting of, thiamethoxam, clothianidin, imidacloprid, thiodicarb, carbaryl, chlorantraniliprole, cyantraniliprole, methiocarb, thiram, azoxystrobin, paclobutrazol, acibenzolar-S-methyl, chlorothalonil, mandipropamid, thiabendazole, chlorothalonil, triadimenol, cyprodinil, penconazole, boscalid, bixafen, fluopyram, fenpropidin, fluxapyroxad, penflufen, fluoxastrobin, kresoximmethyl, benthiavalicarb, benthiavalicarb-isopropyl, dimethomorph, flusulfamide, methyl thiophanate, triticonazole, flutriafol, thiram, carboxin, carbendazim and a combination thereof.

In an embodiment, the crop is maize and the yield increase in the field is about 10% to about 50% compared to a control field wherein a control fertilizer composition comprising a normal release profile of nitrogen is applied, wherein both the fertilizer composition and the control fertilizer composition comprise substantially the same total nitrogen content at planting.

In an embodiment, the crop is maize and the crop seed is planted at a planting density of about 15,000 to about 70,000 plants per acre at a row spacing of about 15 inches to about 40 inches. Suitable planting densities include for example, about 10,000; 15,000; 20,000; 25,000; 30,000; 35,000; 40,000; 45,000; 50,000; 55,000; 60,000; 65,000; 70,000 and 75,000.

In an embodiment, the crop protection composition comprises an effective amount of a pesticide that results in a reduced seed germination or reduced seedling stand or reduced crop response if the effective amount of the pesticide is applied as a seed treatment to the crop seed.

In an embodiment, the crop protection composition comprises an effective amount of a pesticide that results in a reduced seed germination or reduced seedling stand if the effective amount of the pesticide is applied as an in furrow application to the soil.

A method of providing a plurality of extended release agricultural beads to a crop field comprising a plurality of crop seeds, the method includes providing the agricultural bead at a depth of about 1 inch to about 10 inches into the crop field; at a distance of about 1 inch to about 15 inches from the crop seeds; and wherein the agricultural bead comprises a biodegradable polymer layer and a fertilizer composition such that a nitrogen release profile of about 70-90 cumulative % of nitrogen between about 50-120 days into soil after planting the crop seeds is achieved and wherein the number of the agricultural beads is not substantially greater than the number of crop seeds in the field. In an embodiment, suitable planting depths for the beads include for example, 0.5, 1, 2, 3, 4, 5, 6, 7, 8, 9, 10, 11, and 12 inches from the top of soil surface and about 0.5, 1, 2, 3, 4, 5, 6, 7, 8, 9, 10, 11, and 12 inches distal from where the crop seed is placed.

In an embodiment, the agricultural bead further comprises a crop protection composition, wherein the crop protection composition is released into the soil such that about 90 cumulative % of one or more active ingredients in the crop protection composition is available to the crop during about 50-150 days after planting the crop seed.

A method of fertilizing a crop, the method includes providing a plurality of extended release agricultural bead to a crop field comprising a plurality of crop seeds during planting, the method comprising providing the agricultural bead: at a depth of about 2 inches to about 10 inches into the crop field; at a distance of about 1 inch to about 15 inches from the crop seeds, wherein the agricultural bead comprises a biodegradable polymer layer and a fertilizer composition such that a nitrogen release profile of about 70-90 cumulative % of nitrogen between about 50-120 days into soil after planting the crop seeds is achieved and wherein the number of the agricultural beads is not substantially greater than the number of crop seeds in the field; and providing a normal release fertilizer composition at the time of planting or sufficiently prior to planting.

An agricultural composition comprising a blend of extended release fertilizer composition comprising a biodegradable polymer layer and a normal release fertilizer composition, wherein the extended release fertilizer composition releases nitrogen at a release rate of about 70-90 cumulative % of nitrogen between about 50-120 days into soil after planting, wherein the biodegradable polymer layer encapsulates the fertilizer composition that is configured to be planted in the soil sufficiently adjacent to a crop seed. In an embodiment, the blend comprises about one fourth to about two-thirds extended release fertilizer composition. In an embodiment, the blend comprises about one third extended release fertilizer composition. In an embodiment, the biodegradable polymer layer is selected from the group consisting of polylactic acid, poly butylene adipate succinate, polyvinyl acetate, polyvinyl alcohol, polycaprolactone, alginate, xanthan gum and a combination thereof. In an embodiment, the composition is planted in furrow. In an embodiment, the composition is planted sub-surface.

A fertilizer composition comprising a fertilizer core comprising from about 0.01 to about 0.5 grams of phosphate or potash; and a polymer layer surrounding the fertilizer core; wherein the polymer layer has a water permeability of about 1 to about 2000 g/m2/day at 25 degrees Celsius and wherein the fertilizer composition is configured to be placed in a field at a predetermined distance from a row crop seed whereby the fertilizer composition delivers an effective amount of nitrogen during the reproductive growth stage of the row crop. In an embodiment, the fertilizer composition is between about 6 and 14 mm in diameter.

A method of increasing yield of a crop plant, the method includes providing an extended release agricultural composition to a field comprising a plurality of crop plants, wherein the crop plant expresses an agronomic trait and wherein the extended release composition comprises a polymer layer that has a water permeability of about 1 to about 2000 g/m2/day at 25 degrees Celsius; and wherein the extended release composition is between about 6 and 14 mm in diameter; growing the crop plant in a crop growing environment and thereby increasing the yield of the crop plant. In an embodiment, the agronomic trait is a nitrogen use efficiency trait. In an embodiment, the agronomic trait is an insect resistance trait. In an embodiment, the agronomic trait is expressed by a recombinant DNA construct. In an embodiment, the agronomic trait is a drought tolerance trait. In an embodiment, the agronomic trait is engineered through a genomic modification of the endogenous DNA. In an embodiment, the agronomic trait is a disease resistance trait. In an embodiment, the insect resistance trait is due to expression of a component selected from the group consisting of Bt gene, short interfering RNA molecule targeted to a pest, heterologous non-Bt insecticidal protein, and a combination thereof. In an embodiment, the crop plant is selected from the group consisting of maize, soybean, rice, wheat, sorghum, cotton, canola, alfalfa and sugarcane.

An agricultural system includes a plurality of extended release agricultural compositions comprising a polymer layer that has a water permeability of 10 to 500 g/m2/day at 25 degrees Celsius; wherein each of the extended release composition is between about 6 and 14 mm in diameter; a planting equipment configured to place the extended release agricultural compositions at a sufficient depth in a soil surface of a crop field; and a plurality of crop seeds, wherein the crop seeds are planted at a sufficient distance from the placement of the agricultural compositions and wherein the crop seeds are planted immediately before or after the placement of the agricultural compositions.

In an embodiment, the extended release composition comprises a fertilizer composition. In an embodiment, the extended release composition comprises a crop protection active ingredient. In an embodiment, the crop seeds are maize.

In an embodiment, the planting equipment is a seed planter. In an embodiment, the planting equipment plants both the agricultural compositions and the crop seeds in a single pass across the field. In an embodiment, the planting equipment alternates between placing the agricultural composition and planting the crop seeds. In an embodiment, the planting equipment is a pneumatic disc planter. In an embodiment, the planting equipment delivers the agricultural composition that comprises a root proliferant component and a crop protection active ingredient. In an embodiment, the planting equipment delivers the agricultural composition that comprises a root proliferant component and a crop protection active ingredient simultaneously.

A method of increasing yield of a crop plant, the method includes broadcast spreading an extended release agricultural composition to a field comprising a plurality of crop plants, wherein the extended release composition comprises a polymer layer that has a water permeability of 10 to 500 g/m2/day at 25 degrees Celsius; and wherein the extended release composition is between about 2 and 14 mm in diameter; and growing the crop plant in a crop growing environment and thereby increasing the yield of the crop plant. In an embodiment, the agricultural composition comprises about 0.1 to 0.8 grams of nitrogen and the polymer layer is about 10-250 microns thick.

A method of providing a plurality of extended release agricultural beads to a crop field comprising a plurality of crop seeds, the method comprising providing the agricultural bead at a depth of about 0.5 inch to about 10 inches into the crop field; at a distance of about 1 inch to about 15 inches adjacent to the crop seeds; and wherein the agricultural bead comprises (i) a root proliferant composition such that about 70-90 cumulative % of the root proliferant is released between about 50-120 days into soil after planting the crop seeds and (ii) one or more crop protection agents substantially mixed or in close association with the root proliferant and wherein about 50-90 cumulative % of the crop protection agent is released between about 40-150 days into soil after planting the crop seeds. Suitable depths include for example, 0 inches (i.e., the surface), 0.3. 0.6, 1.0, 1.5 2, 3, 4, 5, 6, 7, 8, 9, 10, 12, and 15 inches from the top surface of the soil.

In an embodiment, the agricultural tablet, or core further comprises a biodegradable polymer layer is selected from the group consisting of polylactic acid (PLA), poly butylene adipate succinate (PBSA), polyvinyl acetate, polyvinyl alcohol, polycaprolactone, alginate, xanthan gum, polyurethane and a combination thereof. In an embodiment, the agricultural composition is planted in furrow. In an embodiment, the agricultural composition is between about 4 and 14 mm in diameter.

In an embodiment, the insect resistance trait is due to the expression of a component selected from the group consisting of Bt gene, short interfering RNA molecule targeted to a pest, heterologous non-Bt insecticidal protein, and a combination thereof. In an embodiment, the crop plant is selected from the group consisting of maize, soybean, rice, wheat, sorghum, cotton, canola, alfalfa and sugarcane The term "pesticide" refers to any chemical classified as a pesticide or active ingredient (a.i.) by an appropriate regulatory authority; for example, in the United States by the Environmental Protection Agency (EPA). Generally, a pesticide is a chemical which, when applied in a pesticidally sufficient amount to a susceptible plant, pest and/or microorganism and/or to the locus thereof, kills, inhibits or alters the growth of the plant, pest and/or microorganism.

As used herein, the term "propagule" means a seed. The term "regenerable plant part" means a part of a plant other than a seed from which a whole plant may be grown or regenerated when the plant part is placed in horticultural or agricultural growing media such as, for example, moistened soil, peat moss, sand, vermiculite, perlite, rock wool, fiberglass, coconut husk fiber, tree fern fiber, or a completely liquid medium such as water. The term "geotropic propagule" means a seed or a regenerable plant part obtained from the portion of a plant ordinarily disposed below the surface of the growing medium. Geotropic regenerable plant parts include viable divisions of rhizomes, tubers, bulbs and corms which retain meristematic tissue, such as an eye. Regenerable plant parts such as cut or separated stems and leaves derived from the foliage of a plant are not geotropic and thus are not considered geotropic propagules. As referred to in the present disclosure, unless otherwise indicated, the term "seed" specifically refers to an unsprouted seed or seeds. The term "foliage" refers to parts of a plant exposed above ground. Therefore, foliage includes leaves, stems, branches, flowers, fruits and/or buds. The phrase "resultant plant" refers to a plant that has been grown or regenerated from a propagule that has been placed in growing media.

The term "root proliferant" generally refers to one or more specific components including chemical, biological components that promote growth of roots or increase in root mass close to or within the vicinity of the root proliferant. The root proliferant may also include a component released from a beneficial microbe. The root proliferant improves root growth as measured by a variety of parameters including rate of root growth, root density, root biomass, presence of root hairs, root tip elongation, root branch angles and commonly associated root characteristics. For example, the root proliferant causes the roots to branch in response to availability of localized increased concentrations of the root proliferating agent. One of the results includes a significant increase in the root mass and a greater density of highly permeable root tips in the vicinity of the root proliferant and, as a consequence, a substantial increase in the plant's ability to absorb low solubility crop protection agents that are co-located or in close proximity to the root proliferant. Nutrients such as phosphate are suitable root proliferant agents. Other plant nutrients such as potassium and micronutrients (or a combination) are also included with the root proliferants to further enhance the nutritional status of the plant. Biological compounds and synthetic chemical compounds are also suitable to act as specific root proliferating agents.

The term "rhizosphere" refers to the area of soil that is directly influenced by plant roots and microorganisms in the soil surrounding the roots. The area of soil surrounding the roots is generally considered to be about 1 millimeter (mm) wide but has no distinct edge.

As used herein the term "encapsulation" or "encapsulated" generally refers to a composition that includes a distributed active component within or surrounded by a polymer matrix.

The term "extended release" or "sustained release" or "delayed release" or "controlled release", used interchangeably herein, generally refers to a formulated composition, such as for example, a tablet, a capsule, or a bead, whose active ingredients such as nutrients, urea, crop protection agents are discharged more slowly into the surrounding zone due to the presence of one or more polymer components which restrict diffusion compared to compositions that do not contain such polymer components.

The term "biodegradable" in the context of a polymer generally refers to polymers that are break down after its intended purpose (such as, release of nutrients and/or crop protection agents) to result in natural byproducts such as gases ($CO_2$, $N_2$), water, biomass, and inorganic salts, in the intended environmental surrounding, such as, soil. In certain aspects, it may be desirable to use a biodegradable polymer such that it breaks down in the soil during a growing season or within 2-4 growing seasons. Further, a generally accepted protocols for determining biodegradability of polymer compositions such as for example, ASTM standard D6868-11 or historical version D6868-03 (Standard Specification for Labeling of End Items that Incorporate Plastics and Polymers as Coatings or Additives).

As used herein the phrase "biologically effective amount" refers to that amount of a substance required to produce a desired effect on a plant, on an insect, or a plant pest. Effective amounts of the substance depend on several factors, including the treatment method, plant species, pest species, propagating material type and environmental conditions. For example, a biologically effective amount of an insecticide would be the amount of the insecticide that protects a plant from damage. This does not mean that the protected plant suffers no damage from the pest, but that the damage is at such a level as to allow the plant to provide an acceptable yield of a crop.

The term "crop protection agent" or "crop protection active ingredient" generally refers to one or more components that target pests and/or weeds. Crop protect agents include for example, insecticide, fungicide, nematicide, herbicide, safener and can be chemical or biological (e.g., microbes, polypeptides, nucleic acids) or a combination thereof.

Micronutrients include for example, boron, zinc, manganese, iron, copper, molybdenum, chloride and others that can be included as part of the extended delivery agricultural compositions disclosed herein. The term "Log Kow" is a relative indicator of the tendency of an organic compound to adsorb to soil. For various agriculturally important pesticides, these values are generally provided by the manufacturer or are known in the art.

"Water solubility" is the solubility of a compound in water, typically measured at 25° C. As with the Log Kow value, these values for various pesticides are typically provided by the manufacturer and are known in the art.

The transitional phrase "consisting essentially of" as used in the context of a particular component or a plurality of components, a step or steps enumerated in a method, generally means those specified components or steps and those that do not materially affect the basic and novel characteristic(s) of the claimed components or steps of a method. For example, an agricultural composition comprising a polymer layer consisting essentially of polylactic acid (PLA) may include other components including polymer components that, when present at such levels that do not materially alter the basic characteristics of PLA for which PLA is being used.

Polylactic acid (PLA) can be amorphous or semi-crystalline form or in the form of poly-L-lactide. For example, a suitable grade of PLA used in a film wrapping or extrusion have a higher melting point for example around 150-170° C., tensile strength of 15 kpsi (MD) or 21 kpsi (TD). Suitable PLA polymer includes commercially available polymer made of a grade of semi-crystalline polylactic acid containing ~2% of D-isomer units with a number averaged molecular weight of 72 KDa; of a grade of amorphous polylactic acid containing 8-10% of D-isomer units with a number averaged molecular weight of 48 KDa; and of a grade of amorphous polylactic acid containing 8-10% of D-isomer units with a number averaged molecular weight of 118 KDa.

The disclosed method comprises or consists essentially of the steps of:
A) providing an agricultural composition; and
B) placing the agricultural composition and a propagule in a growing media such as soil, wherein the agricultural composition and the propagule are placed distal to each other; and wherein the agricultural composition comprises:
i) a bead comprising a nutrient material and a pesticide; wherein the pesticide in the bead has a log Kow in the range of from 1.2 to 3.0 and a water solubility at 25° C. in the range of from 0.5 to 150 milligrams/liter (mg/L). The agricultural composition can be placed distal to the propagule. The term "co-located" means that the agricultural composition and the propagule are placed into the growing media at any time within a growing season. In some embodiments, the propagule and the agricultural composition can be co-located at the time of planting, within one week of planting, within one month of planting, at the time of flowering or prior to or during pest pressure. Distal means that the distance between the propagule and the agricultural composition is in the range of from 0.1 centimeter (cm) to 100 centimeters. In certain embodiments, the distance between the propagule and the agricultural composition is in the range of from 0.5 cm to 50 cm. In still further embodiments, the distance between the propagule and the agricultural composition is in the range of from 1 cm to 25 cm. In the case of co-located beads, more than one bead may be co-located with each propagule. The distance between the beads and the propagule can be the average distance between each bead and the propagule. In some embodiments, the agricultural composition can be placed in the growing medium as a cluster of beads co-located with a propagule. The term "cluster of beads" means that multiple beads are placed together so that the average distance between each of the beads of the cluster is less than the distance between the center of mass of the cluster and the propagule. In other embodiments, the agricultural composition can be banded or placed in a row that runs approximately parallel to a row of propagules. In some embodiments, for example, in those cases utilizing mechanized agricultural processes, the planting device for placing propagules in growing media can be equipped to co-locate the agricultural composition as one or more beads at a point that is distal to the propagule either just before the propagule is delivered to the growing media or just after.

The nitrogen source can be, for example, urea, oxamide, melamine, dicyanodiamide, urea formaldehyde ammonium nitrate, ammonium magnesium nitrate, potassium nitrate or a combination thereof. The phosphorous source can be, for example, ammonium magnesium phosphate, ammonium metaphosphate, bone meal, brucite, calcined phosphate, calcium metaphosphate, calcium phosphate, calcium polyphosphate, diamido phosphate, calcium magnesium phosphate, phosphate rock, potassium phosphate, magnesium phosphate, monocalcium diammonium pyrophosphate, oxamidine phosphate, phosphate urea, potassium polyphosphate or a combination thereof.

The granular fertilizer core used in the present invention may be any conventional granular fertilizer, which contains fertilizer ingredients such as nitrogen, phosphorous, potassium, silicon, magnesium, calcium, manganese, boron, iron and so on, for supplying nutrients to cultivating crops. Typical examples thereof include nitrogen fertilizer such as urea, ammonium nitrate, ammonium magnesium nitrate, ammonium chloride, ammonium sulfate, ammonium phosphate, sodium nitrate, calcium nitrate, potassium nitrate, lime nitrogen, urea-form (UF), crotonylidene diurea (CDU), isobutylidene diurea (IBDU), guanylurea (GU); phosphate fertilizer such as calcium superphosphate, conc. superphosphate, fused phosphate, humic acid phosphorus fertilizer, calcined phosphate, calcined conc. phosphate, magnesium superphosphate, ammonium polyphosphate, potassium metaphosphate, calcium metaphosphate, magnesium phosphate, ammonium sulfate phosphate, ammonium potassium nitrate phosphate and ammonium chloride phosphate; potash fertilizer such as potassium chloride, potassium sulfate, potassium sodium sulfate, potassium sulfate magnesia, potassium bicarbonate and potassium phosphate; silicate fertilizer such as calcium silicate; magnesium fertilizer such as magnesium sulfate and magnesium chloride; calcium fertilizer such as calcium oxide, calcium hydroxide and calcium carbonate; manganese fertilizer such as manganese sulfate, manganese sulfate magnesia and manganese slag; boron fertilizer such as boric acid and borates; and iron fertilizer such as slag.

For example, "grams of nitrogen" generally means the amount of nitrogen present by weight in a fertilizer composition. For example, urea is 47% by weight N. Therefore, for example, 0.1 to 0.8 grams of N corresponds to about 0.21 to 1.7 grams of urea.

In some embodiments, the bead can be a homogeneous or heterogeneous mixture of one or more of root proliferant components and a crop protection agent such as a pesticide. As an example of a heterogeneous mixture, the bead can be a core composition comprising a core of the root proliferant material and a shell comprising the pesticide. The shell can further comprise a polymer or a filled polymer. In addition to the root proliferant and the pesticide material, the agricultural composition can include inert agents, for example if needed to conform to a desirable shape and/or volume. In some embodiments, the polymer is, for example, polylactic acid, polyvinyl acetate, polyvinyl alcohol, co-polymers of polyvinyl acetate and polyvinyl alcohol, alginate, xanthan gum or a combination thereof. The pesticide can be applied directly to the root proliferant core, the polymer coated fertilizer core or, in other embodiments, can be formulated with a film-forming polymer. Filled polymers are a blend of polymers with one or more fillers. The fillers can be any of those known in the art, for example, starch, minerals, pigments, clays, plasticizers, stabilizers, the pesticide or a combination thereof. As an example of a homogeneous mixture, the fertilizer material and the pesticide can be thoroughly mixed and then compacted into beads comprising both the root proliferant and the pesticide.

The beads can be co-located with the propagule (such as for example, a seed) prior to planting the propagule, at the same time as the propagule is planted or shortly after or shortly before the propagule is planted. In some embodiments, especially in large scale commercial farming applications, the propagule and the bead can be co-located during the propagule planting operation or broad-cast spread at, or prior to planting. The beads can be of a variety of sizes, and for example, they are configured to flow through a planter and can range from about 3 mm to about 15 mm in diameter. The number of beads co-located with the propagule will depend on the amount of the pesticide required to provide the desired protective effect on the growing plant throughout its life. In some embodiments, one bead can be co-located with each propagule, while in other embodiments, one bead may provide nutrients and pesticides for more than one propagule.

The release timing can be determined, for example, by the soil type, soil pH, by type/blend of polymers used for the polymeric pouch, fillers used, by the thickness of the film, by the film uniformity, or by a combination of these or other factors. In some embodiments, the film thickness can be in the range of from 0.3, 0.4 to about 0.6, 0.7 mil. One mil (one thousandth of an inch) roughly equals 25.4 µm. In certain embodiments, the film thickness can be in the range of from about 5 micrometers to about 200 micrometers.

Pesticides can also be used as the agricultural composition or as a component of the agricultural composition. In some embodiments, the pesticide can be an insecticide, fungicide, nematicide, herbicide or a combination thereof. In further embodiments, the pesticide can be an insecticide, a fungicide or a combination thereof. Certain herbicides are also included in order to control obligate hemiparasites of roots, for example, some species in the genera Orobanche and Striga which require a living host for germination and initial development. In some embodiments, a combination of two or more pesticides can be used. For example, both a fungicide and an insecticide can be present. In other embodiments, two different insecticides can be present, with or without the use of a fungicide. In other embodiments, the pesticide can be a systemic pesticide. Suitable herbicides that control weeds can also be included with the agricultural compositions disclosed herein so long as the crops or plants of interest are tolerant to such herbicides. For example, systemically active herbicides can be pre-mized with the tablets that include nutrient and another crop protection agent such as a pesticide.

Suitable pesticides can include insecticides, for example, anthranilic diamides, N-oxides, or salts thereof, neonicotinoids, carbamates, diamides, spinosyns, phenylpyrazoles, sulfoxaflor or a combination thereof. In other embodiments, the insecticide can include, for example, thiodicarb, carbaryl, chlorantraniliprole, cyantraniliprole, methiocarb, thiram, or a combination thereof. The pesticide can have a Log Kow in the range of from any value between 1.2 and 3.0. In other embodiments, the log Kow can be any value in the range of from 1.22 to 2.9 such as from 1.25 to 2.9 or from 1.35 to 2.86. The water solubility of the pesticide at 25° C. can be between 0.5 and 150 mg/L, including any value or sub-range in between, such as 0.55 to 140 mg/L and 0.6 to 120 mg/L.

The disclosed method comprises or consists essentially of the steps of:

A) providing an agricultural composition; and

B) placing the agricultural composition and a propagule in a growing media, wherein the agricultural composition and the propagule are placed distal to each other; and wherein the agricultural composition comprises:

ii) a bead comprising a root proliferant material and a pesticide; or iii) a sachet, comprising a sealed polymeric pouch, a root proliferant material and a pesticide;

wherein the pesticide in the bead or the sachet has a log Kow in the range of from 1.2 to 3.0 and a water solubility at 25° C. in the range of from 0.5 to 150 milligrams/liter (mg/L). The agricultural composition can be placed distal to the propagule. The term "co-located" means that the agricultural composition and the propagule are placed into the growing media at any time within a growing season. In some embodiments, the propagule and the agricultural composition can be co-located at the time of planting, within one week of planting, within one month of planting, at the time of flowering or prior to or during pest pressure. Distal means that the distance between the propagule and the agricultural composition is in the range of from 0.1 centimeter (cm) to 100 centimeters. In certain embodiments, the distance between the propagule and the agricultural composition is in the range of from 0.5 cm to 50 cm. In still further embodiments, the distance between the propagule and the agricultural composition is in the range of from 1 cm to 25 cm. In the case of co-located beads, more than one bead may be co-located with each propagule. The distance between the beads and the propagule can be the average distance between each bead and the propagule. In some embodiments, the agricultural composition can be placed in the growing medium as a cluster of beads co-located with a propagule. The term "cluster of beads" means that multiple beads are placed together so that the average distance between each of the beads of the cluster is less than the distance between the center of mass of the cluster and the propagule. In other embodiments, the agricultural composition can be banded or placed in a row that runs approximately parallel to a row of propagules. In the case of a sachet, the distance is the approximate center of mass of the sachet to the propagule. In some embodiments, for example, in those cases utilizing mechanized agricultural processes, the planting device for placing propagules in growing media can be equipped to co-locate the agricultural composition as one or more beads or one or more sachets at a point that is distal to the propagule either just before the propagule is delivered to the growing media or just after.

The root proliferant can be a compound or a composition, for example, one or more of the commercially available slow release compositions having at least a nitrogen source. In some embodiments, the root proliferant can be compositions comprising a nitrogen source and a phosphorous source. In still further embodiments, the root proliferant can be one or more nitrate, ammonium and/or phosphate compounds. One particular root proliferant is Osmocote® 14-14-14 (hereinafter "OC"), which provides particles having both a nitrogen and a phosphorous source. The nitrogen source can be, for example, urea, oxamide, melamine, dicyanodiamide, urea formaldehyde or a combination thereof. The phosphorous source can be, for example, ammonium magnesium phosphate, ammonium metaphosphate, bone meal, brucite, calcined phosphate, calcium metaphosphate, calcium phosphate, calcium polyphosphate, diamido phosphate, calcium magnesium phosphate, phosphate rock, potassium phosphate, magnesium phosphate, monocalcium diammonium pyrophosphate, oxamidine phosphate, phosphate urea, potassium polyphosphate or a combination thereof. In still further embodiments, the root proliferant can be struvite, ammonium magnesium phosphate, calcium phosphate or a combination thereof.

In some embodiments, the bead can be a homogeneous or heterogeneous mixture of the root proliferant and the pesticide. As an example of a heterogeneous mixture, the bead can be a core/shell composition comprising a core of the root proliferant and a shell comprising the pesticide. The shell can further comprise a polymer or a filled polymer. Film-forming polymers are well-known in the agricultural art, for example, polymers and compositions known for the seed coating art and any of the seed coating polymers or seed coating compositions can be used. In some embodiments, the polymer is, for example, polylactic acid, polyvinyl acetate, polyvinyl alcohol, co-polymers of polyvinyl acetate and polyvinyl alcohol, alginate, xanthan gum or a combination thereof. The pesticide can be applied directly to the root proliferant core, the polymer coated root proliferant core or, in other embodiments, can be formulated with a film-forming polymer. Filled polymers are a blend of polymers with one or more fillers. The fillers can be any of those known in the art, for example, pigments, clays, plasticizers, stabilizers, the pesticide or a combination thereof. As an example of a homogeneous mixture, the root proliferant material and the pesticide can be thoroughly mixed and then compacted into beads comprising both the root proliferant and the pesticide.

The beads can be co-located with the propagule prior to planting the propagule, at the same time as the propagule is planted or after the propagule is planted. In some embodiments, especially in large scale commercial farming applications, the propagule and the bead can be co-located during the propagule planting operation. The beads can be a variety of sizes, from 100 microns to several centimeters in diameter. The number of beads co-located with the propagule will depend on the amount of the pesticide required to provide the desired protective effect on the growing plant throughout its life. In some embodiments, one bead can be co-located with the propagule, while in other embodiments, multiple beads may be included per propagule. The bead form can be a compacted particle, a granule, prill, film coated particle(s) film coated structure.

The release of the root proliferant material and the pesticide can be timed to coincide with the needs of the plant, an expected appearance of a pest or other factors. The release timing can be determined, for example, by the soil type, soil pH, by type/blend of polymers used for the polymeric pouch, fillers used, by the thickness of the film, by the film uniformity, or by a combination of these or other factors. In some embodiments, the film thickness can be in the range of from 2.5 micrometers to 150 micrometers. In other embodiments, the film thickness can be in the range of from 6 micrometers to 100 micrometers.

The anthranilic diamide class of insecticides contains a very large number of active ingredients and any of those can be used. Two specific examples of anthranilic diamides include chlorantraniliprole and cyantraniliprole.

In certain embodiments, the pesticides can be other known anthranilic diamide insecticides, for example, those described in U.S. Pat. No. 8,324,390, US 2010/0048640, WO 2007/006670, WO 2013/024009, WO 2013/024010, WO 2013/024004, WO 2013/024170 or WO 2013/024003. Specific embodiments from U.S. Pat. No. 8,324,390 can include any of those compounds disclosed as examples 1 through 544. Specific embodiments from US 2010/0048640 can include any of those compounds disclosed in Tables 1 through 68 or compounds represented by Chemical Formula 44 through 118. Each of the references to the above patents and applications are hereby incorporated by reference.

Nematicides can also be included as a pesticide. Suitable examples can include, for example, avermectin nematicides, carbamate nematicides, and organophosphorous nematicides, benomyl, benclothiaz, and a combination thereof. Nematicides also include nematicidally active biological organisms such as a bacteria or fungus. For example, *Bacillus firmus, Bacillus cereus, Bacillus* spp, *Pasteuria* spp, *Pochonia chlamydosporia, Pochonia* spp, and *Streptomyces* spp. A suitable nematicide is abamectin.

Fungicides can also be included. Suitable fungicides can include, for example, strobilurin fungicides, azole fungicides, conazole fungicides, triazole fungicides, amide fungicides, benzothiadiazole fungicides or a combination thereof. In other embodiments, the fungicides can include, azoxystrobin, metominostrobin, orysastrobin, paclobutrazol, acibenzolar-S-methyl, chlorothalonil, mandipromamid, thiabendazole, chlorothalonil, triadimenol, cyprodinil, penconazole, boscalid, bixafen, fluopyram, fenpropidin, fluxapyroxad, penflufen, fluoxastrobin, benthiavalicarb, benthiavalicarb-isopropyl, dimethomorph, flusulfamide, methyl thiophanate, triticonazole, flutriafol, thiram, carboxin, carbendazim or a combination thereof.

In some embodiments, the agricultural composition can also comprise one or more of a plant growth regulator. Suitable plant growth regulators can include, for example, potassium azide, 2-amino-4-chloro-6-methyl pyrimidine, N-(3,5-diclhorophenyl) succinimide, 3-amino-1,2,4-triazole, 2-chloro-6-(trichloromethyl)pyridine, sulfathiazole, dicyandiamide, thiourea, guanylthiourea or a combination thereof.

The agricultural composition can also comprise one or more Nod factors. As used herein, a "Nod factor" is a signaling molecule, typically produced by bacteria, for example, one or more of the Rhizobiaceae family, by means of which symbiotic bacteria capable of infecting plants and inducing the formation of root nodules are signaled. The bacteria infecting the roots produce nitrogen for the plants, while the plants carry away oxygen which would inhibit nitrogenase activity. Nod factors are known in the art and typically comprise compounds known as lipochitooligosaccharides (LCOs). These LCOs have an acylated chitin backbone of 3 to 5 N-acetylated glucosamine rings with one of the terminal glucosamine rings acylated by a fatty acid, for example, an unsaturated or polyunsaturated fatty acid.

The propagule can be any known propagule. In some embodiments, the propagule is a seed wherein the seed is a seed of wheat, durum wheat, barley, oat, rye, corn, sorghum, rice, wild rice, cotton, flax, sunflower, soybean, garden bean, lima bean, broad bean, garden pea, peanut, alfalfa, beet, garden lettuce, rapeseed, cole crop, turnip, leaf mustard, black mustard, tomato, potato, pepper, eggplant, tobacco, cucumber, muskmelon, watermelon, squash, carrot, *zinnia*, cosmos, *chrysanthemum*, sweet scabious, dragon, *gerbera*, babys-breath, statice, blazing star, lisianthus, yarrow, marigold, pansy, *impatiens, petunia*, geranium and *coleus*. Of note are seeds of cotton, corn, soybean and rice. Propagating materials co-planted with the beads in accordance to this disclosure also include rhizomes, tubers, bulbs or corms, or viable divisions thereof. Suitable rhizomes, tubers, bulbs and corms, or viable divisions thereof include those of potato, sweet potato, yam, garden onion, tulip, *gladiolus*, lily, *narcissus*, dahlia, iris, *crocus*, anemone, hyacinth, grape-hyacinth, freesia, ornamental onion, wood-sorrel, squill, cyclamen, glory-of-the-snow, striped squill, calla lily, *gloxinia* and tuberous *begonia*. Also suitable are rhizomes, tubers, bulbs and corms, or viable division thereof of potato, sweet potato, garden onion, tulip, daffodil, *crocus* and hyacinth. Propagating materials contacted with the beads of this disclosure also include stems and leaf cuttings. In some embodiments, the agricultural composition can be applied to an already growing plant, for example, a tree or a shrub, for example, an orchard tree, providing both nutrients and pesticides to the plant.

EXAMPLES

Examples 1-6 describe the preparation of six bead or tablet prototypes that contain the crop protection agents HGW (Cyantraniliprole) or E2Y (Chlorantraniliprole). The relevant properties of these prototypes are summarized in Table 1.

Example 1

Preparation of Extruded Bead Prototype #1
Containing the Crop Protection Agent HGW This prototype was prepared using a hot melt extrusion process and subsequent pelletization to the required weight. The mixing of all ingredients was performed using co-rotating, intermeshing, twin-screw extruder technology. Two K-Tron loss-in-weight feeders were used to feed ingredients: PBSA pellets, starch, calcium phosphate dibasic and HGW. These three powder ingredients were bag shaken together for one minute before they were loaded into feeder. Barrel set point temperatures on the extruder were set anywhere between 90-130 degrees Centigrade, starting cooler at the entrance (to avoid feeding and sticking issues) and progressively increasing the temperature towards the exit of the extruder. The screw RPM was set at 500. Total feed rates through the extruder were 12 lbs/hr. Actual temperature of the extrudate was 135 degrees C. The melt temperature of the material exiting the die is kept below 140 degrees C. to avoid thermal degradation of the crop active ingredient and PBSA. Vacuum was pulled on barrel #8 to remove gases and deliver material downstream free of voids. Material exiting the extruder is directed through a die, which is attached to the last barrel. The die geometry included a single 8 mm diameter hole. Pressure generated by the extruder forces the material to flow through the die and form strands. Nominal size of the nearly cylindrical cut pellets was 8×5 mm.

TABLE 1

Brief description of bead or tablet prototypes that were prepared as described in Examples 1-6 that were employed in soil-release, controlled environment (CE) and Location 1 field trials

| Prototype # | Description | Shape and average size (millimeters) | Average Mass (grams) | Crop Protection Agent | Crop Protective Agent Loading (wt %) |
|---|---|---|---|---|---|
| 1 | Extruded bead with 49.4 wt % PBSA/10 wt % calcium phosphate/ 40 wt % starch | Cylindrical pellet 8 (diameter) 5 (thickness) | 0.274 | HGW | 0.610 |
| 2 | Extruded bead with 49.7 wt % PBSA/10 wt % calcium phosphate/ 40 wt % starch | Cylindrical pellet 8 (diameter) 5 (thickness) | 0.250 | E2Y | 0.311 |
| 3 | PLA coated urea tablet with HGW crop active coated on the outside | Tablet 9.7 (diameter) 7.8 (thickness) | 0.580 | HGW | 0.348 |
| 4 | PLA coated urea tablet with E2Y crop active coated on the outside | Tablet 9.7 (diameter) 7.8 (thickness) | 0.561 | E2Y | 0.153 |
| 5 | Tablet formed from crystal green, maltrin and HGW mixture | Tablet 6.5 (diameter) 5.3 (thickness) | 0.227 | HGW | 0.642 |
| 6 | Tablet formed from crystal green, maltrin and E2Y mixture | Tablet 6.5 (diameter) 5.3 (thickness) | 0.222 | E2Y | 0.316 |

E2Y refers to chlorantraniliprole and HGW refers to cyantraniliprole.

Example 2

Preparation of Extruded Bead Prototype #2 Containing the Crop Protection Agent E2Y Prototype #2 was prepared using the exact same procedure as Prototype #1 except the crop active in this case was E2Y. Additionally, E2Y was used at a higher loading than HGW in Example #1, as shown in Table #1. This was achieved by removing some of the PBSA to account for the added crop protection agent in the final formulation.

Example 3

Preparation of Tablet Prototype #3 Containing the Crop Protection Agent HGW

Tablets were prepared by milling urea granules (Kirby Agri, Lancaster, Pa.) and ammonium magnesium phosphate-hexahydrate granules (Crystal Green™, Ostara Nutrient Recovery Technologies Inc, Vancouver, BC.), less than 18 mesh, and blending in a 9:1 ratio and made into tablets using a motor driven single-stage tablet press (TDP-30, tabletpress.net, Athens, Ohio). Tablets were spray coated initially with polymer solutions of 10 wt % polylactide (PLA) in Methyl Ethyl Ketone (MEK), containing 40 mg D&C Green No. 6 Dye (Pylam Products, Tempe, Ariz.) per kg solution. Tablets were initially coated using a perforated pan. 400 grams of polymer solution were sprayed onto 1000 grams of tablets, to produce coated tablets with 4.0 wt % polymer relative to the core tablet. Crop Protection agent was applied to PLA coated tablets using a second coating suspension. 60.0 grams insecticide treatment containing HGW, a flowable suspension containing 50 wt % of the crop protection agent HGW (also known as HGW86 or Cyantraniliprole) was mixed with 40.0 grams of Flo Rite® 1197 Plantability Polymer (BASF, Research Triangle Park, N.C.). 11.5 grams of Mixed seed treatment suspension was applied to 1042 grams of coated tablets using a Hege 11 laboratory seed treater (WINTERSTEIGER Inc., Salt Lake City, Utah). Prototypes had nominal mass of 580±5 mg, 9.72±0.02 mm diameter, and 7.86±0.03 mm thickness.

Example 4

Preparation of Tablet Prototype #4 Containing the Crop Protection Agent E2Y

PLA coated tablets were prepared in the same manner as in Example 3. Crop Protection agent was applied to the PLA coated tablet using a second coating suspension. 35.2 grams chlorantraniliprole insecticide treatment, a flowable suspension containing 50 wt % crop protection agent E2Y (also known as E2Y45 or Chlorantraniliprole) was mixed with 26.0 grams of a plantability polymer. 6.1 grams of Mixed treatment suspension was applied to 1042 grams of coated tablets using a laboratory seed treater.

Example 5

Preparation of Crystal Green Tablet Prototype #5 Containing the Crop Protection Agent HGW Crop protection agent was mixed with milled ammonium magnesium phosphate-hexahydrate granules (Ostara Nutrient Recovery Technologies Inc, Vancouver, BC.) less than 18 mesh at different concentrations and using different techniques. The powders were assayed using HPLC-MS, and then blended with binders to deliver the target amounts of active ingredient per bead.

One method for mixing granules and crop protection actives employed a batch mixer. 175 grams cyantraniliprole, a flowable suspension containing 50 wt % of the crop protection agent HGW (also known as HGW86 or Cyantraniliprole) was mixed with 175 grams of deionionized water and 0.087 grams Pylakor Gojiberry Red Dye (Pylam Products, Tempe, Ariz.). 1500 grams of milled granules were charged to the batch mixer, and mixed slow speed. Diluted suspensions were screened through a 60 mesh sieve prior to use, and added through an atomizing nozzle at a rate of 3 grams per minute, for 2 minutes or 20 minutes depending on the target concentration (0.1 wt %, 1.0 wt %). Post spray, the batch was mixed for 10 minutes with hot air passing through the mixing to dry the samples.

A continuous method used to prepare the mixture milled granule and crop protection active utilized an injector mixer apparatus, with a 1" diameter mixing chamber. Small amounts of a diluted suspension as described above are introduced in via a pipe within another concentric pipe through which a high pressure gas is introduced which thereby provides a zone of turbulence into which the milled granules in larger amounts are introduced, and this mixture of gas and materials are transported through a treatment chamber to produce a uniform mixture. In this example, samples were produced by feeding 2 g/min dilute suspension onto 500 g/minute (0.1 wt % active) for 4 minutes, and 8 g/min dilute suspension onto 200 g/minute (1.0 wt % active) for 4 minutes. Air at 60 psig, 60° C. was used as the high pressure gas.

Granules produced by both methods (Table 2) were assayed prior to making a powder blend in a batch v-cone blender. Magnesium stearate NF (KIC Chemicals, New Paltz, N.Y.) and Corn Syrup Solids (Maltrin® M200, Grain Processing Corporation, Muscatine, Iowa) were added to improve tablet formation.

TABLE 2

Granule properties for the production of bead prototype #5.

| Granule ID | Active Mixing Method | Target Conc | Assay Conc. | Grams for blending |
|---|---|---|---|---|
| SB_EIR-082316-3 | Batch | 0.1 wt % | 0.192% | 50.0 |
| SB_EIR-082316-4 | Batch | 1.0 wt % | 1.52% | 183.4 |
| SB_ITC_08182016-4 | Continuous | 0.1 wt % | 0.196% | 50.0 |
| SB_ITC_08182016-6 | Continuous | 1.0 wt % | 1.38% | 376.8 |
| Corn Syrup Solids | | | | 325.0 |
| magnesium stearate NF | | | | 2.44 |
| | | | 0.82% | 977.44 |

The powder blend was made into tablets using a motor driven single-stage tablet press. Tablet punches had a standard curvature cup depth, consistent with Table 14, Tableting Specification Manual, 7th edition (American Pharmaceutical Association, 2005). Tablet hardness and dimensions were measured using a Sotax HT1 (Westborough, Mass.), consistent with method USP 1217. Typical 6.5 mm diameter tablets had an average mass 242±30 mg, thickness 5.3±0.5 mm and hardness 90 N±30 N.

Example 6

Preparation of Crystal Green Tablet Prototype #6 Containing the Crop Protection Agent E2Y Granules (Table 3) were mixed with crop protection actives in a manner similar to given in Example 5, except that the active ingredient was prepared from chlorantraniliprole insecticide treatment, a flowable suspension containing 50 wt % of the crop protection agent E2Y, mixed with an equal amount of deonized water, and colored with 250 ppm of FD&C Blue #2 dye.

TABLE 3

Granule properties for the production of bead prototype #6.

| Granule ID | Active Mixing Method | Target Conc | Assay Conc. | Grams for blending |
|---|---|---|---|---|
| SB_EIR_090916-3 | Batch | 0.1 wt % | 0.0851% | 133.6 |
| SB_EIR_090916-4 | Batch | 1.0 wt % | 1.049% | 127.6 |
| SB_ITC_08192016-1 | Continuous | 0.1 wt % | 0.0973% | 133.6 |
| SB_ITC_08192016-2 | Continuous | 1.0 wt % | 0.946% | 255.2 |
| Corn Syrup Solids | | | | 325.0 |
| magnesium stearate NF | | | | 2.44 |
| Total | | | 0.41% | 977.44 |

The powder blend was made into tablets in a similar manner as in Example 5. Typical 6.5 mm diameter tablets had an average mass 253±10 mg, thickness 5.4±0.3 mm and hardness 130 N±20 N.

Examples 7-11 pertain to bead and tablet prototypes #1-#6 listed in Table 1 and detail static soil release profiles and plant uptake behaviors of HGW and E2Y for both corn and soybean plants as assayed in controlled environment and Location 1 field settings.

Example 7

Determination of Static Soil Release Profiles for Bead and Tablet Prototypes Containing the Crop Protection Agents HGW and E2Y This example demonstrates that for the for the six bead and tablet prototypes listed in Table 1, the crop protection agents HGW and E2Y were gradually released into the soil over a five-week period of time.

For the six prototypes that are listed in Table 1 and described in Examples 1-6, five-week time-release profiles for the crop protection agents HGW and E2Y were determined in static soil samples that were devoid of growing plants. Prior to setting up these experiments, the water content of the soil used for this procedure was measured. Once the water content was determined it was adjusted to 27 wt % water, which is field capacity loading, prior to planting the bead prototypes. Next, for each prototype, a five-week static soil study was set up by loading three jars with soil for each measured time point. The amount of soil used, typically 100-500 grams, depended upon the water solubility of the crop protection agent to be screened. Bead or tablet prototypes were then planted in the soil and the jars were covered with a tape to impede water evaporation. The soil release experiments were sampled weekly over a five-week time-period. For each designated time-point, sampling involved gently removing the beads or tablets from the soil. Then the soil was transferred to a glass bottle and extracted with acetonitrile to remove any of the crop protection agent that had been released into the soil. The bottles were then vortexed, sonicated, and placed on a shaker table for three days to ensure that all the crop protection agent had been fully extracted. After three days, a sample was taken from each bottle, filtered into 0.2 micron PTFE HPLC filtration vials and then analyzed on a HPLC operating with (or without) a coupled mass spectrometer to determine the concentration of crop protection agent that had been released into the soil. Actual concentration values were determined with the aid of separate HPLC calibration curves for HGW and E2Y that were created with the same HPLC instrument employed for this assay. These sampling procedures were repeated over the five-week test period for all six prototypes to generate individual time-dependent release curves or profiles. These curves are depicted graphically as dashed lines in FIGS. 7-18.

Example 8

Corn Leaf Uptake of Crop Protection Agents HGW and E2Y Released from Bead and Tablet Prototypes as Determined by Controlled Environment Studies This example demonstrates that crop protection agents HGW and E2Y delivered by the bead or tablet prototypes listed in Table 1 were taken up by corn plants over an extended period of time in a controlled environment (CE) setting.

Pots used for the growth of corn plants were 10 inches in diameter and 7.5 inches deep. The pots were filled with Farfard soil-free potting mix. A 500 ml bottle was placed in the middle of each pot to create an internal cavity that excluded the potting mix. Bottle placement was the same for all pots tested. The potting mix was pressed down gently in order to remove air spaces and additional potting mix was added to bring the level to the brim of the pot. The potting mix in each pot was saturated with water and excess water was allowed to drain out. After this process, the potting mix settled to a level that was one inch below the brim of the pot. For planting, a one-inch deep by ½ inch diameter hole in the potting mix was made. The holes were ¼ inch from the bottle so that the center of the hole was two inches from the center of the bottle. Three holes evenly spaced around the 500 ml bottle were made in each pot in this way. Corn seeds (Hybrid 1) were planted, one per hole, and each seed was pressed into the bottom of the hole. Dry potting mix was used to fill in the planting hole and the pots were lightly watered.

The corn plants were grown at 29° C. during the day and 25° C. at night. The photoperiod was 16 hours with an irradiance of ~400 µmol/m2/s photosynthetically active radiation at the top of the pot. Plants began to emerge from the potting mix four days after sowing. At ten days after planting one of the seedlings (the least vigorous) was removed by cutting the stem at the soil surface leaving two experimental plants per pot. At this time, bead prototypes for testing were added to each pot. The 500 ml bottle, placed in the middle of each pot during pot preparation, was removed leaving a cavity in the potting mix. This was done carefully to ensure that no potting mix fell back into the hole and to avoid disturbing the young plants. Into each hole was poured 100 ml of a dry soil prepared by mixing equal parts sand and steam-sterilized, sifted Matapeake soil. Matapeake is a low organic carbon soil. Two beads of the same type were placed into the center of the sand/Matapeake mixture and the hole filled to within ¼ inch of the level of the potting mix with more of the sand/Matapeake mixture. Additional Farfard potting mix was used to completely fill the hole so that the surface was even with the rest of the pot. By using the above volumes of potting mix and sand/Matapeake mix, the finished pot contained a seed that was two inches below the surface and two inches to the side of the bead or tablet. The beads or tablets were contained inside the sand/Matapeake soil mix, two inches below the seed level and there was one inch of sand/Matapeake soil mix below the seed and 2.5 inches of potting mix between the sand/Matapeake soil mix and the bottom of the pot. On day 11, the growing plants were thinned to one plant per pot.

The prototypes tested are described in Table 1 and in Examples 1-4. Three replicate pots were used for each prototype examined. Plants were grown for 49 days after sowing (45 days after dosing with the beads or tablets). At ten days after planting one of the seedlings (the least vigorous) was removed by cutting the stem at the soil surface leaving two experimental plants per pot. At this time, bead prototypes for testing were added to each pot.

Corn leaf uptake results for bead or tablet prototypes #1-#4 evaluated under controlled environment (CE) conditions are plotted graphically in FIGS. 7-10. These results demonstrate that crop protection agents HGW and E2Y delivered by the bead or tablet prototypes listed in Table 1 were taken up by corn plants over an extended period of time. Moreover, for each prototype, the plant uptake results were correlated to soil release profiles measured separately for HGW and E2Y.

Example 9

Soy Leaf Uptake of Crop Protection Agents HGW and E2Y Released from Bead and Tablet Prototypes as Determined by Controlled Environment Studies This example demonstrates that crop protection agents HGW and E2Y delivered by the bead or tablet prototypes listed in Table 1 were taken up by soybean plants over an extended period of time in a controlled environment (CE) setting using standard soybean growing conditions. Two beads of the same type were placed into the center of the sand/Matapeake mixture and the hole filled to within ¼ inch of the level of the potting mix with more of the sand/Matapeake mixture. Additional Farfard potting mix was used to completely fill the hole so that the surface was even with the rest of the pot. By using the above volumes of potting mix and sand/Matapeake mix, the finished pot contained a seed that was two inches below the surface and two inches to the side of the bead. The beads were contained inside the sand/Matapeake soil mix, two inches below the seed level and there was one inch of sand/Matapeake soil mix below the seed and 2.5 inches of potting mix between the sand/Matapeake soil mix and the bottom of the pot. On day 11, the growing plants were thinned to one plant per pot.

The bead or tablet prototypes tested are described in Table 1 and in Examples 1-4. Three replicate pots were used for each prototype examined. Plants were grown for 49 days after sowing (45 days after dosing with the beads or tablets). Periodically during the growth of the plants, as noted in the results, leaf samples were collected from the youngest, fully expanded leaf. On day 42, samples from each of the 12 youngest leaves (some of which were still fully enclosed in the inner whorl) were collected. At this stage, there were generally about 15-17 leaves per plant so the oldest 3-5 leaves were not sampled. Leaf samples were collected by taking five, ~¼ inch diameter leaf punches from the leaf lamina midway between the leaf tip and base, being careful to avoid the mid-vein. For the youngest 1-2 leaves collected at day 49, the leaves were too small to collect leaf punches and instead a ½ inch wide transverse section of the leaf was collected. The fresh weight of leaf samples was recorded and then samples were frozen at −80° C. until processing. Active ingredient concentration in the leaves were measured using standard protocols.

Leaf uptake results for bead or tablet prototypes #1-#4 evaluated under controlled environment (CE) conditions are plotted graphically in FIGS. 7-10. These results demonstrate that crop protection agents HGW and E2Y delivered by the bead or tablet prototypes listed in Table 1 were taken up by soybean plants over an extended period of time. Moreover, for each prototype, the plant uptake results were correlated to soil release profiles measured separately for HGW and E2Y.

Example 10

Corn Leaf Uptake of Crop Protection Agents HGW and E2Y Released from Bead and Tablet Prototypes as Determined by a Field Trial in Location 1

This example based on a Year 2 Location 1 field trial demonstrates that the crop protection agents HGW and E2Y delivered by the bead or tablet prototypes listed in Table 1 were taken up by corn plants over an extended period of time.

This field trial utilized a randomized field map consisting of four replicates for each prototype evaluated. Each replicate consisted of four adjacent 15' rows of seeds. Seed spacing within a row was 6" for a total planting density of 35,000 plants per acre. Where used, 50 prototype beads or tablets were planted per 15' row for a total planting density of 70,000 beads or tablets per acre. The targeted HGW application rate by prototype beads or tablets was 120 g ai/ac. The targeted E2Y application rate by prototype beads or tablets was 60 g ai/ac. Prototype beads or tablets and corn seeds were planted in two passes of the tractor through the field so that the prototype was generally within 2" of the seed. Corn plant tissue samples were collected at the indicated timepoints from one of the center rows of each replicate following the same procedure detailed in Example 8. The uptake of HGW or E2Y into the plant was measured in the same manner as described in Example 8.

Corn leaf uptake results for bead or tablet prototypes #1-#6 evaluated in the Location 1 field trial are plotted graphically in FIGS. 7-12. These results demonstrate that crop protection agents HGW and E2Y delivered by the bead or tablet prototypes listed in Table 1 were taken up by corn plants over an extended period of time. Moreover, for each prototype, the plant uptake results were correlated to soil release profiles measured separately for HGW and E2Y. For prototypes #1-#4, a good correlation between field uptake and controlled environment uptake of the two crop protective agents was also generally observed.

Example 11

Soybean Leaf Uptake of Crop Protection Agents HGW and E2Y Released from Bead and Tablet Prototypes as Determined by a Field Trial in Location 1

This example based on a Year 2 Location 1 field trial demonstrates that the crop protection agents HGW and E2Y delivered by the bead or tablet prototypes listed in Table 1 were taken up by soybean plants over an extended period of time.

This field trial utilized a randomized field map consisting of four replicates for each prototype. Each replicate consisted of four adjacent 10' rows of seeds. Seed spacing within a row was 1". Where used, 25 prototype beads were planted per 10' row for a total planting density of 72,000 beads per acre. The targeted HGW application rate by the prototype beads or tablets was 70 g ai/ac. The targeted E2Y application rate by prototype beads or tablets was 70 g ai/ac. Prototype beads or tablets and soybean seeds were planted in two passes of the tractor through the field so that the prototype was within 2" of the seed. Plant tissue samples were collected at the indicated timepoints from one of the center rows of each replicate following the same procedure as detailed in Example 9. The uptake of HGW or E2Y was measured in the same manner as described in Example 9.

Soy leaf uptake results for bead or tablet prototypes #1-#6 evaluated in the Location 1 field trial are plotted graphically in FIGS. 7-12. These results demonstrate that crop protection agents HGW and E2Y delivered by the bead or tablet prototypes listed in Table 1 were taken up by soybean plants over an extended period of time. Moreover, for each prototype, the plant uptake results were correlated to soil release profiles measured separately for HGW and E2Y. For prototypes #1-#4, a good correlation between field uptake and controlled environment uptake of the two crop protective agents was also generally observed.

Examples 12 and 13 demonstrate that various levels of pest protection were provided to corn and soybean plants growing in the field by the bead and tablet prototypes #1-#6 listed in Table 1.

Example 12

Corn Plant Protection from Bead and Tablet Prototypes Containing HGW and E2Y as Determined by a Location 1 Field Trial This example based on a Year 2 Location 1 field trial for corn demonstrates that the bead and tablet prototypes listed in Table 1 provided a level of protection from Fall Army Worm that was consistent with the plant uptake of the crop protection agents HGW and E2Y.

The Location 1 corn field trial was carried out as detailed in Example 10. Pest pressure was due to natural infestation. Prototype efficacy was assessed by leaf damage scoring due to Fall Army Worm feeding on a scale of 1 (high damage) to 9 (no damage) by trained professionals. Leaf damage scoring was done for each replicate by averaging the damage of 10 plants in the middle of one of the center rows of the replicate. A negative control with no applied insecticide was also utilized for comparison. Results are posted in Table 4 for the six bead or tablet prototypes tested in this manner.

TABLE 4

Uptake of crop protective agent and leaf damage scores for corn determined in Location 1 field trials for each bead or tablet prototype.

| Prototype # | Description | Crop Protection Agent | Corn Leaf Concentration of Crop Protective Agent (ppb) | Fall Army Worm Damage Score 30 Days After Planting (*) |
|---|---|---|---|---|
| Control | No treatment applied | None | 0 | 4.8 |
| 1 | Extruded bead with 49.4 wt % PBSA/10 wt % calcium phosphate/ 40 wt % starch | HGW | 56.85 | 5.0 |
| 2 | Extruded bead with 49.7 wt % PBSA/10 wt % calcium phosphate/ 40 wt % starch | E2Y | 17.07 | 4.4 |
| 3 | PLA coated urea tablet with HGW crop active coated on the outside | HGW | 27.41 | 5.6 |
| 4 | PLA coated urea tablet with E2Y crop active coated on the outside | E2Y | 3.03 | 4.3 |
| 5 | Tablet formed from crystal green, maltrin and HGW mixture | HGW | 96.32 | 5.9 |
| 6 | Tablet formed from crystal green, maltrin and E2Y mixture | E2Y | 23.25 | 5.7 |

(*) numerical rating between 1 (highest possible damage) and 9 (lowest possible damage)

Example 13

Soybean Plant Protection from Bead and Tablet Prototypes Containing HGW and E2Y as Determined by a Location 1 Field Trial This example based on a Year 2 Location 1 field trial for soybean plants demonstrates that the bead and tablet prototypes listed in Table 1 provided a level of protection that was consistent with the plant uptake of the crop protection agents HGW and E2Y.

The Location 1 field trial was carried out as detailed in Example 11. Pest pressure was due to natural infestation. Prototype efficacy was assessed by evaluating the extent of leaf defoliation due to pest feeding as determined by trained professionals. Plant defoliation scoring was done for each replicate by averaging the damage of 10 plants in the middle of one of the center rows of the replicate. A negative control with no applied insecticide was also utilized for comparison. Results are posted in Table 5 for the six bead or tablet prototypes tested in this manner.

TABLE 5

Uptake of crop protective agent and the percent of leaf defoliation for soybean determined in Location 1 field trials for each bead or tablet prototype.

| Prototype # | Description | Crop Protection Agent | Soybean Leaf Concentration of Crop Protective Agent (ppb) | Leaf Defoliation 30 Days After Planting (%) |
|---|---|---|---|---|
| Control | No treatment applied | None | 0 | 72.2 |
| 1 | Extruded bead with 49.4 wt % PBSA/10 wt % calcium phosphate/40 wt % starch | HGW | 28.63 | 67.4 |
| 2 | Extruded bead with 49.7 wt % PBSA/10 wt % calcium phosphate/40 wt % starch | E2Y | 32.37 | 64.6 |
| 3 | PLA coated urea tablet with HGW crop active coated on the outside | HGW | 7.73 | 62.9 |
| 4 | PLA coated urea tablet with E2Y crop active coated on the outside | E2Y | 11.25 | 64.9 |
| 5 | Tablet formed from crystal green, maltrin and HGW mixture | HGW | 17.75 | 67.7 |
| 6 | Tablet formed from crystal green, maltrin and E2Y mixture | E2Y | 41.82 | 67.5 |

Example 14

Preparation of Beads for Root Proliferant Based Crop Protection Agent Uptake in Plants Osmocote™ fertilizer is available from the Scotts Miracle-Gro Company, Marysville, Ohio. Preparation of Coating Composition #1

A coating composition was prepared by mixing 39.45 parts of deionized water, 3 parts of a polymeric surfactant, 2 parts of a nonionic surfactant, 0.3 parts of an antifoam agent, 0.05 parts of a biocide, 1.5 parts of propylene glycol, 0.5 parts of mineral particles, 0.2 parts of xanthan gum and 3 parts of glycerine in a suitable mixing vessel. A 1:1 (wt:wt) mixture of the coating composition and technical cyantraniliprole (98.8%) was mixed in a suitable mixing vessel. A red seed coating dye was then added to this mixture and the composition was stirred to ensure a homogeneous mixture.

Preparation of Bead #1

OC 14-14-14 particles were placed in a mixer making use of an 8 ounce (236 milliliter) capacity cup with a screw top lid. The particles were coated with a single coating intended to provide about 100 micrograms (μg) of cyantraniliprole per bead. The beads were first weighed into the mixer cup. Coating Composition #1 was measured and transferred into the cup using a pipette and dripping the formulation onto the beads. Cotton swabs were used to remove any excess material. The jars were immediately capped and placed in the "Max 100 Heavy" cup holder and these were placed into the mixer. The beads were spun at 1,000 rpm for 20 seconds and the jar was removed from the machine so the beads could be visually inspected. This was repeated until the beads appeared dry, requiring a total spin time of 30 to 40 seconds. The coated beads were left uncovered in a laboratory fume hood overnight in order to dry.

Preparation of Bead #2

The procedure used for Bead #1 was repeated. Analysis of the amount of cyantraniliprole for Bead #2 was determined to be 58.3 µg of cyantraniliprole per bead. Using this test, Bead #1 showed an average of 84.3 µg of cyantraniliprole per bead.

Preparation of Comparative Bead A

Coating composition #1 was coated onto 4 mm diameter glass beads (available from LabGlass, Inc.) using the procedure given above. Analysis of the dried glass bead showed an average of 75.6 µg of cyantraniliprole per bead.

Preparation of Comparative Bead B

Coating Composition #1 was coated onto 4 mm diameter glass beads (available from LabGlass, Inc.), using the procedure given above. Analysis of the dried glass bead showed an average of 17 µg of cyantraniliprole per bead.

Preparation of Soybean Pots and Soybean Plants

When the plants had grown to approximately the V3 stage of development, that is, when 3 sets of trifoliate leaves had emerged and unfurled, one of the plants was culled (by snipping it at the media surface), leaving two plants per pot. The experimental beads (above) were then added using a funnel with an extended neck, which facilitated the placement of the beads in a cluster, approximately 2 cm in diameter, directly onto the center of the Matapeake:sand plug. To pots containing Bead #1, 31 beads of Bead #1 were added to each of 4 pots, providing 2.6 milligrams of cyantraniliprole per pot, or 1.3 milligrams per plant. For Comparative Bead A, 34 beads of Comparative Bead A were added to each of 4 pots, providing 2.6 milligrams of cyantraniliprole per pot, or 1.3 milligrams per plant. As a control, no beads were added to the Matapeake:sand columns in 8 pots. Four of the control pots (Control Example) received no further treatment, whereas 4 other pots (Liquid Injection (Comparative Example B)) received an injection of cyantraniliprole into the Matapeake:sand plug (as described below).

Two pots from each bead treatment and the controls were fitted with MicroRhizon samplers (available from Rhizosphere Research Products, Wageningen, The Netherlands), during preparation. The samplers were placed with the porous tip of the sampler at the bottom of the Matapeake:sand column and the sampling tube extending up from that point, at about a 45 degree angle until reaching the side of the void and from there, extending vertically to the surface of the pot; the Matapeake:sand column held the MicroRhizons in position. Water was collected from the MicroRhizon sampler every 24 hours after dosing for the first 7 days and weekly after that for the duration of the experiment, in order to determine how much active ingredient moved through the soil. A volume of about 0.25 milliliters was withdrawn during each sampling. Samples were stored in a freezer prior to analysis.

Preparation of Bead #3

The procedure for Bead #1 was followed with the exception that the OC 14-14-14 was substituted by a different fertilizer bead, AGRIUM-ESN™, (available from Agrium, Denver, Colo.). Analysis of the amount of cyantraniliprole for Bead #3 identified 17 µg of cyantraniliprole per bead.

Preparation of Bead #4

The procedure for Bead #1 was followed with the exception that the OC 14-14-14 was substituted by a different fertilizer bead, AGRIUM-ESN®, (available from Agrium, Denver, Colo.). After coating, the beads were analyzed and found to have an average of 38 µg cyantraniliprole per bead.

Preparation of Bead #5

The procedure for Bead #1 was followed. Based on an analysis of the amount of cyantraniliprole for Bead #5, the beads were found to have an average of 40 µg of cyantraniliprole per bead.

Preparation of Bead #6

The procedure used for Bead #1 was repeated. Analysis of the amount of cyantraniliprole for Bead #6 was determined to be 0.205 µg per milligram of bead. Preparation of Bead #7

The procedure used for Bead #1 was repeated. Analysis of the amount of cyantraniliprole for Bead #7 was determined to be 0.492 µg cyantraniliprole per milligram of bead.

Preparation of Bead #8

The procedure for Bead #1 was used to coat AGRIUM® ESN particles to give coated beads having 1.037 µg cyantraniliprole per milligram of bead.

Preparation of Bead #9

The procedure used for Bead #1 was repeated, however, the particles used were OC fertilizer and the pesticide used was cyantraniliprole. Analysis of the amount of cyantraniliprole for Bead #9 was determined to be 0.362 µg cyantraniliprole per milligram of bead.

Preparation of Bead #10

The procedure used for Bead #9 was repeated, using Crystal Green® fertilizer in place of OC fertilizer. Analysis of the amount of cyantraniliprole for Bead #10 was determined to be 0.868 µg cyantraniliprole per milligram of bead.

Preparation of Bead #11

The procedure used for Bead #1 was repeated, using OC fertilizer and the pesticide used was 50% chlorantraniliprole insecticide formulation. Analysis of the amount of chlorantraniliprole for Bead #11 was determined to be 1.43 µg chlorantraniliprole per milligram of bead.

Preparation of Bead #12

The procedure used for Bead #1 was used, using OC fertilizer and the pesticide used was cyantraniliprole. Analysis of the amount of cyantraniliprole for Bead #12 was determined to be 1.53 µg chlorantraniliprole per milligram of bead.

Sampling and Analysis

Three leaflets from trifoliate leaves were harvested from each plant one and four weeks after the beads had been added to the pots. One leaflet was harvested from as close to the bottom node of the plant as possible, one leaflet from a node near the middle of the plant and one leaflet from a newly fully expanded trifoliate leaflet close to the terminal growing point. The leaflets were placed into pre-weighed plastic scintillation vials, which were capped, re-weighed and frozen (at −80° C.) until the end of the experiment. The vials containing the leaflets were then removed from the freezer and analyzed. Care was taken to ensure that the leaf tissue was not allowed to thaw at any point between collection and the addition of the extraction solvent. Established tissue preparation and HPLC-MS-MS protocols were used for quantification of the active ingredient in the leaf tissue. For insect testing, fresh leaves were used.

After the completion of the experiment, the soil cores were collected from the pots. These cores were extracted and analyzed using HPLC-MS-MS techniques for quantification of the active ingredient in the soil.

For each of the examples of table 1, each trial consisted of 4 pots per treatment.

Uptake Example Bead #1

31 beads of bead #1 were added to each of the 4 pots, providing 2.6 milligrams of cyantraniliprole per pot (1.3 milligrams per plant).

Control Example

The Control Example followed the above procedure, except that no beads were added to each of the 4 pots at the time the Matapeake:sand column was added to each pot.

Comparative Example A 34 bead of Comparative Bead A were added to each of the 4 pots, providing 2.6 milligrams of cyantraniliprole per pot (1.3 milligrams per plant).

Liquid Injection (Comparative Example B)

A 50% formulation of cyantraniliprole was diluted with water to provide a mixture comprising 5.2 milligrams of cyantraniliprole per 100 milliliters. Soybean pots and plants were prepared using the procedure given above, with the exception that no beads were added to the Matapeake:sand column. At the time that the treatments containing the beads were prepared the injected controls were prepared by injecting 50 milliliters of the control cyantraniliprole mixture into the center of the Matapeake:sand columns in each of four replicate pots. The injection was performed using a 10 cm long, 12 gauge hypodermic needle fitted to a 50 ml syringe at a depth approximating the placement of the beads.

Preparation of Comparative Bead C

Glass particles were coated in the same manner as comparative bead A to give coated beads having 0.367 μg cyantraniliprole per milligram of bead.

Preparation of Comparative Bead D

Silicate particles, were coated with a solution of cyantraniliprole in dichloromethane according to the procedure of Bead #1. Analysis of the amount of cyantraniliprole for Comparative Bead D was determined to be 1.937 μg cyantraniliprole per milligram of bead.

Preparation of Control D Aqueous Solution

A suspension of 50% cyantraniliprole in water was diluted with deionized water to give a mixture having 254.6 μg cyantraniliprole per milliliter.

Preparation of Control E Solution

Cyantraniliprole (98%, technical grade), was dissolved in acetonitrile to provide a solution containing 1988 μg cyantraniliprole per milliliter.

Preparation of Comparative Bead E

The procedure used for Bead #1 was repeated, using 4 mm diameter glass beads (available from LabGlass, Inc.) using 50% chlorantraniliprole insecticide formulation. Analysis of the amount of chlorantraniliprole for Comparative Bead E was determined to be 0.733 μg chlorantraniliprole per milligram of bead.

Preparation of Comparative Bead F

The procedure used for Bead #1 was repeated, using NPK 14-14-14 commercial fertilizer and the pesticide used was picoxystrobin fungicide treatment. Analysis of the amount of picoxystrobin for Comparative Bead F was determined to be 1.45 picoxystrobin per milligram of bead. Picoxystrobin fungicide is known to have a Log Kow of 3.6 and a water solubility of 3.25 milligrams/liter, which places it outside the range of the claimed log Kow.

Preparation of Comparative Bead G

The procedure used for Bead #1 was repeated, using 4 mm diameter glass beads (available from LabGlass, Inc.) using picoxystrobin fungicide treatment. Analysis of the amount of picoxystrobin for Comparative Bead E was determined to be 0.266 μg picoxystrobin per milligram of bead Example 15

Uptake of Diamide Insecticide in Soybean Plants

In this example, a sufficient amount of beads was added to provide 2.6 milligrams of cyantraniliprole per pot. In order to accomplish the desired loading, 31 beads of Bead #1 were added and 34 beads of Comparative bead A were added to each pot. Leaves were collected from the soybean plants one week after the liquid injection and bead addition and at 4 weeks after the liquid injection and bead addition.

TABLE 6

| | Avg cyantraniliprole concentration (μg/g leaf tissue) | | Efficiency | |
|---|---|---|---|---|
| Bead | week 1 | week 4 | week 1 | week 4 |
| Bead #1 | 0.005511 | 0.193396 | 0.086% | 3.03% |
| Control Example | 0.002493 | 0.001999 | 0.042% | 0.034% |
| Comparative Example A | 0.004791 | 0.090894 | 0.080% | 1.52% |
| Liquid Injection (Comparative Example B) | 0.049041 | 0.04524 | 0.729% | 0.673% |

Uptake efficiency was calculated based on the formula (leaf weight*average uptake for each plant)/dose, with the dose being 1.3 milligrams. The results show that, by week 4, Bead #1 provided an increased efficiency in the uptake of cyantraniliprole when compared to comparative example A and the liquid injection (comparative example B). Visual analysis of the Matapeake:sand column showed significant root penetration for each of the examples. The control example showed very low amounts of cyantraniliprole which was believed to arise from a cross contamination issue with these samples, based on the very low amounts of the active material.

Soybean Uptake—Embodiment A

In a field test, a mechanized planter was used to plant two, 4 range by 18 row, test blocks. Each row was 10 feet (3.05 m) long with a 1.5 ft (45.7 cm) gap between each range. The inter-row spacing was 30" (76.2 cm). Approximately 90 commercial soybean seeds (Pioneer Hi-Bred variety) were planted in each row at a depth of about 1.5 inches (3.8 cm). In order to distribute the beads evenly along the length of the trench, a PVC pipe, about 5 cm (2 inches) in diameter and 3.75 m long that had been cut in half lengthwise, was placed next to the trench. The beads were distributed evenly along the length of the pipe that corresponded to the planted portion of the row. The pipe was then tipped into the trench to evenly distribute the beads in the trench bottom. The trench was then carefully backfilled with soil. Each row was supplied with enough beads to provide an application rate of 0.5 milligrams of cyantraniliprole active ingredient per plant, based on the assumption of 80 plants per row.

For control application C (Comparative C), a trench was dug similarly to that of above, but the trench was backfilled with sand (approximately 23 kilograms of sand per 3.05 meter row). A liquid control application was sprayed directly onto the sand surface, and the sand was immediately covered with a layer of soil in order to minimize the exposure of the crop active to light.

The application of the beads and the liquid application of Comparative C was done directly after seed planting (i.e., the same day). As a second liquid control (Comparative D), a sand filled trench was created at the time of planting, but the liquid application of the active ingredient was made seven days before the second insect infestation (38 days after planting; see below). Following liquid application, the sand filled trench was covered with soil. Each liquid application was calculated to deliver 40 milligrams of the cyantraniliprole active ingredient per 80 plants (i.e., 0.5 mg/plant).

Because the seed had been buried prior to digging the trenches and delivering the test materials, it was difficult to align the particles in precise registry with the seeds. This became apparent only after the seed had emerged and the first in-field insect infestation had been performed (22 days after planting). At this stage it was apparent that some of the plants on the ends of the rows were not protected. Harvesting processes were therefore modified at subsequent sampling dates so as to avoid sampling plants in the first and last 30 cm of each row.

Table 6A describes the schedule for each sampling, infestation and assessment performed during the test. As reported, the days after planting refers to the number of days after the planting of the soybean seeds and delivery vehicles.

TABLE 6A

| Days after Planting | Event |
| --- | --- |
| 0 | Planting of soybeans, beads and application of liquid control; Comparative C |
| 22 | Tissue sampling |
| 22 | Velvet Bean Caterpillar infestation in field |
| 35 | Leaf damage assessment |
| 38 | Soil application of liquid control; Comparative D |
| 45 | Tissue sampling |
| 45 and 53 | Corn ear worm infestations in field |
| 66 | Leaf damage assessment |
| 80 | Fall army worm (lab based in-vitro assays) |
| 80 | Tissue sampling |

Velvet Bean Caterpillar (*Anticarsia gemmatalis*) Results

Twenty-two days after planting the soybean plants (which were at the V3 stage of development) were infested with velvet bean caterpillars by stapling egg laden filter paper sections (approximately 100 eggs per sheet) to the abaxial surface of the unifoliate leaf of every 4$^{th}$ plant within a treatment row; approximately 2000 eggs per row. 13 days after infestation (when the plants were at the V5 stage of development), an assessment was made to determine the percent defoliation of the soybean plants. The results are shown on TABLE

TABLE 8

| Treatment | Percent defoliation | Avg cyantraniliprole concentration (µg/g leaf tissue) |
| --- | --- | --- |
| Bead #3 | 5 | 0.032 +/− 0.012 |
| Bead #4 | 26.7 | 0.008 +/− 0.002 |
| Bead #5 | <1 | 0.329 +/− 0.192 |
| Untreated Control | 28.8 | 0.00 |
| Liquid injection (Comparative C) | 5.3 | 0.039 +/− 0.019 |

The results show that both bead #3 and bead #5 can provide results better or equivalent to a liquid application at the time of planting (Comparative C). Additionally, bead #5 provides increased protection when compared to liquid injection at the time of planting (Comparative C). The degree of protection was closely related to the amount of cyantraniliprole that was measured in the leaves harvested from the plants at the time of infestation (i.e., 22 days after planting).

Corn Ear Worm (*Helicoverpa zea*) Results

The soybean plants were infested with corn ear worm egg sheets at 45 days after planting, when the plants were at the R1 stage of development. The method of application was as described above for the Velvet Bean Caterpillar except that the egg sheets were stapled to the abaxial surface of a trifoliate leaflet about ⅓$^{rd}$ of the way down the canopy, counting from the top of the plant. A second infestation with corn earworm neonates (2000 per treatment row) was also performed 53 days after planting. The leaf damage assessment was made 21 days after infestation with the egg sheets. The defoliation results are shown in Table 9. The cyantraniliprole concentrations in the first fully expanded leaves of the soybeans are also given. The leaves used for the analysis were harvested from the plants immediately before the Corn Ear Worm egg sheets were applied (i.e., 45 days after planting).

TABLE 9

| Treatment | Percent defoliation | Cyantraniliprole concentration (µg/g leaf) |
| --- | --- | --- |
| Bead #3 | 2.0 | 0.087 +/− 0.03 |
| Bead #4 | 3.3 | 0.051 +/− 0.47 |
| Bead #5 | 1.0 | 0.418 +/− 0.166 |
| Untreated Control | 3.8 | 0.00 |
| Liquid application (Comparative C) | 4.3 | 0.012 +/− 0.002 |
| Liquid application (Comparative D) | 1.7 | 0.060 +/− 0.045 |

The results show that application of the beads provides better protection from leaf damage than a liquid injection applied at the time of planting (Liquid application (Comparative C)). The amount of cyantraniliprole per gram of leaf is also higher in plants treated with the beads as compared to the amount in plants treated at the time of planting. The highest levels of cyantraniliprole were found in leaves treated with bead #5. Plants treated with bead #5 had the lowest degree of leaf damage.

Fall Army Worm (*Spodoptera frugiperda*) Results

At 80 days after planting, first fully expanded leaves were harvested from plants representing each of the treatments. A punch (creating 12 mm diameter disks) was used to sample the leaves and the disks were placed into 24 well culture plates; previously charged with 1 ml of water agar/well, to maintain the humidity. One disc was placed abaxial side down, into each well and 8 leaves were punched for each treatment row. Once all of the disks had been arrayed in the plates, two neonate Fall Army Worm larvae were placed into each well and a lid was placed onto each plate. The plates were then incubated in the dark for 7 days, at 28° C., prior to scoring. Scoring used a visual rating scale of 1-9 in which a score of 1 indicates complete destruction of the disk (i.e., no protection) and a 9 represents no visible damage (i.e., complete protection). Results of the test are shown in TABLE 10.

TABLE 10

| Treatment | Visual Rating | Cyantraniliprole concentration (μg/g leaf) |
| --- | --- | --- |
| Bead #3 | 7.17 +/− 1.38 | 0.064 +/− 0.016 |
| Bead #4 | 7.83 +/− 0.19 | 0.134 +/− 0.036 |
| Bead #5 | 7.92 +/− 1.35 | 0.178 +/− 0.061 |
| Untreated Control | 1.06 +/− 0.13 | 0.003 +/− 0.00 |
| Liquid Injection (Comparative C) | 1.13 +/− 0.22 | 0.013 +/− 0.027 |
| Liquid Injection (Comparative D) | 1.46 +/− 0.59 | 0.017 +/− 0.004 |

The data show that plants treated with beads 3, 4 and 5 had a high level of protection from insect damage, when compared to that provided by the liquid applications, either at planting (Comparative C) or 38 days (Comparative D) after planting or the untreated controls. The degree of protection was closely related to the concentrations of cyantraniliprole measured in sub-samples taken from the leaves used for the in-vitro insect assay.

Soybean Uptake—Embodiment B

Rhizotron growth chambers were constructed consisting of a plant growth medium column. The washed soil was placed evenly in the rhizotron chambers. For rhizotron chamber #1, the chamber was filled with the soil, then placed in a horizontal position where the front panel was removed. Four round soil plugs with a diameter of about 6 cm were removed. The soil plugs were a 2×2 array with the top row at about 15 cm from the top of the soil column and a horizontal spacing of 21 cm. The spacing between the top and bottom row was 23 cm. Once the soil plugs were removed, 0.305 grams of Bead #6 was placed in each void for a total of 1.22 g of beads and 0.25 milligrams (mg) of cyantraniliprole, an example of clustered beads. After placement of the beads, the void was filled with a 1:1 mixture of Matapeake soil and sand. A layer of sand 2 to 3 mm thick was applied to the entire front face of the soil column, the front panel was replaced and the chamber was placed in an upright position.

For rhizotron #2, the chamber was filled with the soil, then placed in a horizontal position where the front panel was removed. Eight soil plugs were removed. Three soil plugs were removed from the top row, 15 cm from the top of the soil with spacing of 11 cm between each void. The second row removed 2 soil plugs wherein each plug was removed about 11 cm below the outer plugs of the top row. The bottom row was about 11 cm below the second row and had spacings that approximated those of the top row. 0.305 g of OC 14-14-14 fertilizer particles were added to each of four of the voids of the rhizotron #2. In the top row, 0.305 g was added to the left most void and also to the right most void. No fertilizer particles were added to the second row. For the bottom row, 0.305 g of the fertilizer particles was added to the left-most and the right-most voids. The voids with the beads were then filled with a 1:1 mixture of Matapeake soil and sand. In this way, the fertilizer placement of rhizotron #2 mimicked the placement in rhizotron #1. The remaining four voids were filled with a 1:1 mixture of Matapeake soil and sand and each plug was injected 615 microliters of a cyantraniliprole stock solution (6.1 mg of a formulation containing cyantraniliprole suspension in 30 ml of deionized water). After injection, a layer of sand 2 to 3 mm thick was added to cover the front face of the soil column, the front panel was replaced and the chamber was placed in an upright position. In this way, rhizotron #2 contained a total of 1.22 grams of fertilizer particles and 0.25 mg of cyantraniliprole.

Both rhizotron #1 and #2 were tilted slightly forward, toward the front transparent plate and the front plate was covered with aluminum foil. Two soybean seeds (Pioneer Hi-Bred commercial variety) were planted near the center of the chamber at a depth of about 2.5 cm. One seedling from each chamber was removed 4 days after planting.

Both rhizotron chambers were maintained in a growth chamber with controlled temperature and light; 14-hour day/10-hour night diurnal cycle. Over the course of the experiment, the day/night temperatures averaged 27° C. and 19° C., respectively, and photosynthetically active radiation averaged 373 μmol/meter$^2$/second. The plants inside the rhizotron chambers were watered daily (100-440 milliliters (ml) per plant) and 1000-fold diluted. Peter's 20-20-20 nutrient solution or modified Hoagland's solution (1 mM $KNO_3$ instead of 3 mM) was fertigated periodically. Over the course of experiment, 4.6 liters of water, 2.7 liters of modified Hoagland's and 0.9 liter of 1000-fold diluted Peter's nutrient solution were applied to the plants in each rhizotron chamber.

At 25 days after planting (corresponding to the R1 growth stage of the soybean plants), leaves were sampled and processed for quantification of the cyantraniliprole concentrations in the soybean leaves. One leaflet from the $1^{st}$ and $3^{rd}$ trifoliate leaves, respectively, was collected and processed. 11 to 13 leaf disks were cut from each leaflet using a #5 cork borer (8.2 mm in diameter) from each leaflet to obtain 102-136 mg fresh tissue. The leaf tissue was transferred to a 2 ml polypropylene microcentrifuge tube already having a ¼ inch (about 0.64 cm) pre-cleaned steel ball. Another steel ball was added to the top of the leaf disks inside the tube, followed by adding 1.2 ml extraction solution containing 75% acetonitrile (v/v, acetonitrile:water=75:25) and acetic acid (final concentration 0.01%). The tube was capped and the leaf disks inside were homogenized for 25-45 seconds in a bead beater. The homogenate was visually inspected to assure the disks of leaf tissue were pulverized. Afterward, all the tubes were centrifuged for approximately 4 minutes at 10000 rpm and the supernatant was filtered through 0.2-μm pore PTFE filters for quantifying cyantraniliprole by LC-MS-MS method using electrospray positive ionization mode. The cyantraniliprole concentrations in leaf samples are summarized in Table 7.

TABLE 7

| | Cyantraniliprole (mg/kg fresh leaf weight) | |
| --- | --- | --- |
| Rhizotron Chamber | $1^{st}$ trifoliate leaf | $3^{rd}$ trifoliate leaf |
| #1 | 0.776 | 0.388 |
| #2 | 0.105 | 0.0339 |

The results show that cyantraniliprole concentrations in leaf samples from the soybean plant of rhizotron #1 were higher than that of the soybean plant of rhizotron #2.

At 55 days after planting (corresponding to the R6 growth stage of the soybean plants), the front plates of the two rhizotron chambers were removed and the four soil plugs centered around Bead #5 (rhizotron #1) and the fertilizer particles (rhizotron #2) were collected for further analysis. Also, three soil plugs were removed from the soil column in each rhizotron chamber. Finally, four soil plugs were removed from rhizotron #2 from the area centered around the area of the cyantraniliprole application sites. The diameters of the soil plugs collected for root harvesting ranged from 4.2 to 6.3 cm. The roots from the plugs were air-dried initially and then incubated inside an oven at approximately 80° C. for 2 hours. Excess soil associated with the harvested roots was removed and root weight was measured with an analytical balance. Root density data can be found in Table 15, indicating root proliferation in the vicinity of those beads comprising root proliferants.

TABLE 15

| Rhizotron | Average Root Density (mg dry weight/cm$^3$) |
|---|---|
| #1-Soil plug surrounding bead #6 (n = 4) | 2.92 |
| #1-Soil plug from soil column (n = 3) | 1.65 |
| #2-Soil plug surrounding fertilizer particle (n = 4) | 5.37 |
| #2-Soil plug from soil column (n = 3) | 1.53 |
| #2-Soil plug surrounding cyantraniliprole application (n = 4) | 2.09 |

Soybean Uptake Example #4

The system included pots filled with potting medium and a soil plug in the center of the pot. The pot has diameters of 23.5 cm and 20 cm, respectively, at the top and bottom, and a height of 23.5 cm.

For each pot, potting medium was added to the 2-gallon pot to a depth of about 5.1 centimeters. One 0.5-liter polyethylene bottle was put at the center of the pot. More potting medium was added to the bottle shoulder. The pot was saturated with tap water. The maximum water holding capacity of potting medium is about 400%. Each pot was placed inside a bucket and set on top of a plastic ring about 12 centimeters in diameter and height to capture effluent. Three soybean seeds (commercial variety) were planted evenly around the potting medium surface. One seedling was removed from each pot provided that all 3 seeds were fully emerged. Extra seedlings were transplanted to those pots where only one seed germinated. The plants were maintained in a growth chamber with controlled temperature and light with a 14-hour day/10-hour night diurnal cycle. Over the course of the experiment, the day/night temperatures averaged 27° C. and 19° C., respectively, and photosynthetically active radiation averaged 373 µmol//m$^2$ s$^{-1}$. The plants inside the pots were watered daily (73-800 milliliters per pot) and 1000-fold diluted Peter's nutrient solution (0.2% N, 0.2% P205, and 0.2% K$_2$O) was fertigated periodically. Over the course of the experiment, 15.9 liters water and 2.4 liters of the diluted Peter's nutrient solution were applied to the plants in each pot. Only minimal or no effluent was coming out of each pot over the course of the experiment and thus no attempt was made to collect and analyze the effluent.

On the 11$^{th}$ day after the planting (V1 growth stage), the bottles were removed from each pot. With a funnel as a guide, Matapeake soil/sand (1:1) mixture was added to the bottom of the void space to approximately 2.5 centimeters depth. Beads 11, 12, Comparative Beads E, F, G and OC fertilizer beads (as a control) were then applied through the funnel to the individual pots. As a further control, 5 pots contained no beads. 5 repetitions of each type of bead and control were produced. With the funnel in place, more Matapeake soil/sand mixture was added to the void space until reaching to the potting medium surface. The funnel was gently removed from the pot to leave a soil plug for each pot. Additional potting medium was added to the soil plug surface. For the control applications, Matapeake soil/sand mixture was added to the void space up to the potting medium surface. Then 50 milliliters chlorantraniliprole insecticide treatment or picoxystrobin aqueous solution was slowly injected to the soil plug at a depth of approximately 10 centimeters. Additional potting medium was added to the soil plug surface after the injection.

Plant leaves were harvested 3 times at 14 days (V5 growth stage), 28 days (R2), and 45 days (R5.5) after planting and pods were harvested at 45 days after planting for quantifying active ingredient concentrations. The 1$^{st}$ & 3$^{rd}$ and 6$^{th}$ & 8$^{th}$ trifoliate leaflets were harvested from two plants in each pot, respectively, into two vials. Seeds from 6 pods of each plant were pooled into one vial. The harvested leaf and seed samples were immediately frozen on dry ice and were stored at −80° C. before sample processing. One part of the leaflets or seeds was mixed with 10 parts of extraction solution [80% acetonitrile plus acetic acid (0.01% final concentration) or aqueous ammonium hydroxide (~10 ppm final concentration for Picoxystrobin)], six ¼-inch steel balls, and were extracted (homogenized) by a high throughput shaker for 4-10 minutes. Leaf or seed extract was filtrated through 0.2-µm pore PTFE filter for CPC quantitation. Leaf or seed extract from Check (Applied with OC 14-14-14 particles only) was used to construct standard calibration curves (matrix match method). Each CPC was quantified by the LC-MSMS method using electro-spray positive ionization mode.

After harvesting the above-ground canopy including leaves, stems, and pods, soil plugs were carefully removed from the pots by separating the plugs from the potting medium in each pot with a knife and a small hand saw. The soil plugs were cut by half and the lower half of the plugs (~198 milliliters on average) containing the beads or treated with aqueous solutions were used to collect roots. The various particles were collected from the lower-half soil plugs for quantitation of the active ingredient. The collected particles were immediately stored at −80° C. before being extracted with 200 milliliters of the same extraction solution used for leaflet and seed samples inside an orbital shaker with 200 rpm shaking horizontally overnight at room temperature (~20° C.). The extract was filtered through a 0.2-µm pore PTFE filter for quantitation of the pesticide by LC-MSMS. After collecting the particles from the lower-half soil plugs, soil and nodules were removed and the remaining roots from each plug were transferred to aluminum dishes for drying. Any remaining soil associated with the dried roots was removed and the root dry weight was measured with an analytical balance. The root density was then calculated by using the dry weight divided by the average volume of the lower-half soil plugs at 198 milliliters. The root density for Bead #11 was determined to be 3.03±0.58 g dry roots/liter of soil; for Comparative E, 1.78±0.79 g dry roots/liter of soil; for Comparative F, 3.07±0.34 g root/liter of soil; for Comparative G, 1.30±0.14 g dry roots/liter of soil; for Bead #12, 2.93±0.71 g dry roots/liter of soil; for the check (uncoated OSMOCOTE™ 14-14-14 particles, 3.41±0.93 g dry roots/liter of soil. The root density was calculated as the average of 5 replications for each trial.

The results are shown in Table 16 as the average of 5 replications for each trial.

TABLE 16

| Treatment | CPC concentration (μg/g fresh weight) | | |
|---|---|---|---|
| | day 14 | day 28 | day 45 |
| Bead #11-1$^{st}$ & 3$^{rd}$ trifoliate leaflets | 0.085 ± 0.044 | 0.256 ± 0.178 | 0.020 ± 0.014 |
| Bead #11-6th & 8th trifoliate leaflets | Leaflets were not emerged | 0.207 ± 0.071 | 0.019 ± 0.006 |
| Comparative E-1st & 3rd trifoliate leaflets | 0.112 ± 0.047 | 0.301 ± 0.155 | 0.017 ± 0.006 |
| Comparative E-6th & 8th trifoliate leaflets | Leaflets were not emerged | 0.102 ± 0.031 | 0.015 ± 0.007 |
| Comparative F-1st & 3rd trifoliate leaflets | 0.012 ± 0.014 | 0.018 ± 0.013 | 0.000 |
| Comparative F-6th & 8th trifoliate leaflets | Leaflets were not emerged | 0.020 ± 0.0182 | 0.002 ± 0.002 |
| Comparative G-1st & 3rd trifoliate leaflets | 0.009 ± 0.006 | 0.017 ± 0.017 | 0.001 ± 0.000 |
| Comparative G-6th & 8th trifoliate leaflets | Leaflets were not emerged | 0.007 ± 0.005 | 0.001 ± 0.001 |
| Bead #12-1st & 3rd trifoliate leaflets | 0.678 ± 0.365 | 0.903 ± 0.187 | 0.042 ± 0.021 |
| Bead #12-6th & 8th trifoliate leaflets | Leaflets were not emerged | 0.898 ± 0.203 | 0.057 ± 0.009 |

The results in Table 16 show that beads of the present disclosure are able to provide a much greater uptake of the pesticide, i.e., chlorantraniliprole and cyantraniliprole, whereas pesticides having water solubility and log Kow values outside the disclosed range do not provide the same levels of uptake into the plants.

Soybean Uptake Example #5

Preparation of Bead #13

The procedure used for Bead #1 was repeated, using OC fertilizer and the pesticide used was cyantraniliprole insecticide treatment. Analysis of the amount of cyantraniliprole for Bead #13 was determined to be 1.52 μg cyantraniliprole per milligram of bead.

Preparation of Bead #14

The procedure used for Bead #1 was repeated, using CRYSTAL GREEN® fertilizer and the pesticide used was 50% chlorantraniliprole insecticide treatment. Analysis of the amount of chlorantraniliprole for Bead #14 was determined to be 2.15 μg chlorantraniliprole per milligram of bead. Individual rhizotron growth chambers were used as the test apparatus as described before. Beads #13 and 14, or the control solutions were applied to the center area of the soil plug at about 4 mm depth. All the rhizotron chambers were then transferred to the growth room and fit to black utility boxes with precut 4-inch-depth notches located on the left and right rim of the boxes, allowing the chambers to set at about 90 degree upright position. One soybean seed (Pioneer Hi-Bred commercial variety) was then planted at one-inch below the potting medium surface and at the center of each chamber, approximately 18 cm from the left and right spacers.

The rhizotrons were maintained in a growth chamber with controlled temperature and light with a 14-hour day/10-hour night diurnal cycle. Over the course of the experiment, the day/night temperatures averaged 27.7±1.2° C. and 19±1.4° C., respectively, and photosynthetically active radiation averaged 424±61 μmol/m$^2$ s$^{-1}$. The chamber was watered by means of a DOSATRON® water powered fertilizer injector (available from Dosatron International, Bordeaux, France) with the drip head placed near the seeding area. Nutrient (1000-fold diluted Peter's, 0.2% N, 0.2% P205, and 0.2% K$_2$O) for fertigation were carried out regularly by means of the dositron. The amount of water or nutrient used was recorded. Plant growth stages were also recorded and photographed periodically. Over the course of experiment, 10.4 liter water and 0.73 liter of the diluted Peter's nutrient solution were applied to the plants in each rhizotron chamber Plant leaflets were harvested 3 times at 24 days (R1 growth stage), 38 days (R4), and 49 days (R5.5) after planting for quantifying the pesticide concentrations. The 1st & 3rd (lower canopy) and 5th & 7th trifoliate leaflets (upper canopy) were harvested from the plant in each pot, respectively, into two vials. The harvested leaf samples were immediately frozen on dry ice and were stored at −80° C. before sample processing and analysis. Each CPC was quantified by LC-MSMS method using electro-spray positive ionization mode. After removing associated nodules, the roots (≤2.5 mm in diameter) were air-dried initially and then incubated inside an oven at approximately 80° C. for 4-6 hours. Remaining soil associated with the dried roots was removed and root weight was measured using an analytical balance.

Table 12 shows the concentrations of cyantraniliprole and chlorantraniliprole in the leaf samples. Cyantraniliprole concentration averaged 0.388 μg/g fresh leaves from 24 to 49 days after it was delivered via OC particles in the soil plugs, compared with 0.053 μg/g fresh leaves when it was injected to the soil plugs as liquid solution. Chlorantraniliprole concentrations in leaf samples averaged 0.097 μg/gram fresh leaves from 24 to 49 days when it was delivered via the CRYSTAL GREEN® particles.

TABLE 12

| Treatment | CPC concentration (μg/g fresh weight) | | |
|---|---|---|---|
| | day 24 | day 38 | day 49 |
| Cyantraniliprole (50% A.I.) liquid injection-1$^{st}$ & 3$^{rd}$ trifoliate leaflets | 0.106 ± 0.093 | 0.0795 ± 0.0340 | 0.0317 ± 0.0132 |
| Cyantraniliprole (50% A.I.) liquid injection-5$^{th}$ & 7$^{th}$ trifoliate leaflets | Leaflets were not emerged or fully expanded | 0.0165 ± 0.0088 | 0.0299 ± 0.0007 |
| Bead #13-1$^{st}$ & 3$^{rd}$ trifoliate leaflets | 0.308 ± 0.318 | 0.381 ± 0.162 | 0.280 ± 0.0596 |
| Bead #13-5$^{th}$ & 7$^{th}$ trifoliate leaflets | Leaflets were not emerged or fully expanded | 0.357 ± 0.214 | 0.614 ± 0.240 |
| Bead #14-1$^{st}$ & 3$^{rd}$ leaflets | 0.0662 ± 0.0830 | 0.0957 ± 0.0918 | 0.105 ± 0.0626 |
| Bead #14-5$^{th}$ & 7$^{th}$ trifoliate leaflets | Leaflets were not emerged or fully expanded | 0.0545 ± 0.0466 | 0.164 ± 0.0774 |

Soybean Uptake—Embodiment C

Preparation of Bead #15

The procedure used for Bead #1 was repeated, using CRYSTAL GREEN® fertilizer and the pesticide used was 50% chlorantraniliprole insecticide treatment. Analysis of the amount of chlorantraniliprole for Bead #15 was determined to be 13.0 μg chlorantraniliprole per bead.

Preparation of Bead #16

The procedure used for Bead #1 was repeated, using OC fertilizer and the pesticide used was cyantraniliprole insecticide treatment. Analysis of the amount of cyantraniliprole for Bead #16 was determined to be 36.3 μg cyantraniliprole per bead.

In a field trial, a randomized block design was used in which each treatment was replicated three times. The experimental block consisted of 26, 3.05 meter rows arranged in 13 ranges. The row spacing distance was 76.2 centimeters.

Each range was separated by a 45.7 centimeter unplanted gap. Treatments were not applied to the two end ranges and the two outer rows on either side of the plot. Also each treated row was separated by an untreated row. One hundred soybean seeds were planted per row. During the planting of the seeds, Bead #15 was applied using a procedure similar to Soybean uptake example #2. Immediately after planting the seeds and the beads, control liquid injections were applied according to the procedure of soybean uptake example #2, to deliver both cyantraniliprole (0.5 milligrams of the pesticide/plant) and chlorantraniliprole (0.36 milligrams of the pesticide/plant). For the liquid control applications, the trenches were backfilled with sand, approximately 23 kilograms per row. The liquid control was delivered directly to the top of the sand layer and then covered with soil to minimize the exposure of the pesticide to light. Rows were thinned to 80 seedlings per row once emergence and seedling establishment had occurred (about 15 days after planting). The thinning was performed in such a way as to leave a relatively even distribution of seedlings per row.

At 15 and 25 days after planting, leaf samples were removed by punching through the leaves with a 6.4 millimeter hole punch, taking care to avoid the major veins in the leaf 25 plants from each row were sampled. During the sampling, the disks were injected directly into ThermoScientific Nunc 1.0 milliliter cryobank vials (Catalogue #374110) which were held in a push fit receptacle within the anvil of the punch (Tinker Tooling, Altoona, Iowa). For sampling at 15 days, the leaf samples were taken from the unifoliate leaves. At 25 days, samples were taken from a lateral leaflet of the first fully expanded tri-foliate leaves of the plant. In order to ensure representative sampling of the plant material from each row, five tubes each containing 5 disks were collected. The five individual disks sampled in each tube were taken from plants distributed across the entire length of the row, avoiding the plants in the first 30 centimeters of each row. Once the tubes were filled, they were capped and placed into an insulated container containing dry ice. The tubes were later transferred to a −80° C. freezer prior to analysis. Chemical analysis was performed using LC-MS-MS techniques. Concentrations were normalized on a wet tissue basis, by using the weights of the leaf disks taken from plants in the guard rows at each sampling point. At least 20 unifoliate or tri-foliate leaflets were removed from plants that had previously been punched for chemical analysis. The leaves were removed and placed into labeled paper bags. Once all of the leaves from a row had been collected, the leaves were transferred to individual cells of a 16 cell H.I.S tray (item #Tray B-2160-T, available from Clear Pack, Franklin Park, Ill.). Each tray contained about 2 milliliters of agar (Item #7060, available from Bioserv, Frenchtown, N.J.).

A $2^{nd}$ instar of *Spodptera frugiperda* (Fall Army Worm) was placed in each cell and the trays were sealed with transparent-on plastic lids (item #9073R3, available from Brisar Delvco Packaging Services, Patterson, N.J.). The trays were held in a growth chamber with a 16-hour day, 8 hours night cycle at 23-25° C. and 70% relative humidity. The cells were inspected for mortality and feeding at 96 hours after infestation. An insect was considered to be dead or moribund if unable to flip over after 3-4 seconds. Results of the testing can be found in Table 13.

TABLE 13

| Treatment | Mortality (%) | Concentration (nanograms/gram leaf tissue) |
| --- | --- | --- |
| Bead #15 | 94 ± 5 | 64.3 ± 41.3 |
| Bead #16 | 83 ± 3 | 102.6 ± 51.5 |
| Cyantraniliprole Control | 2.0 ± 6.5 | n/a |
| Chlorantraniliprole Control | 56.3 ± 15.6 | 12.8 ± 6.9 |
| Untreated Check | 0.0 | n/a |

Leaves harvested from plants treated with Beads #15 and #16 showed high insect mortality rates, when compared to those observed with leaves harvested from plants treated with liquid applications (cyantraniliprole Control and chlorantraniliprole Control). In all cases high mortality scores were associated with high levels of actives in the leaf tissue Example 16

Uptake of Diamide Insecticide in Corn

The rhizotron growth chambers each consisted of a soil column (topsoil, 38 cm wide×71 cm tall×0.95 cm thick) confined between two rigid plates with 0.95 cm clear acrylic square spacer rods on the sides. The front plates of the chambers were made from clear acrylic plastic, allowing the root growth within the soil column to be observed and quantified. Prior to planting a single corn seed into each rhizotron chamber, Bead #2 and Comparative Bead B were deposited at specific position(s) within the soil columns. To place the Beads in the chambers, the clear front plates were removed from each chamber and the beads were deposited at specific positions using a plastic template with pre-cut holes as a guide. After applying the coated composition, the front plates were reattached and secured. 20 rhizotron growth chambers were prepared: Rhizotron #1 (control)—2 chambers with topsoil only; Rhizotron #2 (control)—3 chambers with OC 14-14-14 fertilizer deposited in a grid conformation; Rhizotron #3 (control)—3 chambers with OC 14-14-14 fertilizer deposited in cluster conformation; Rhizotron #4-3 chambers with Bead #2 deposited in a grid conformation; Rhizotron #5-3 chambers with Bead #2 deposited in a cluster conformation Rhizotron #6-3 chambers with Comparative Bead B deposited in a grid conformation Rhizotron #7-3 chambers with Comparative Bead B deposited in a cluster conformation.

For applications in the grid conformations, beads were deposited at each position in a grid pattern. For Bead #2, 25 beads were placed in a 5×5 array with the top row being positioned about 23 cm (9 inches) below the seed. The vertical and horizontal spacing between the beads was about 7.6 cm (3 inches). For Comparative Bead B, 15 beads were placed in a 5×3 (column×row) array where the bottom row of beads positioned about 23 cm (9 inches) below the seed. The vertical spacing between the beads was about 9.5 cm (3.75 inches) and the horizontal spacing was about 12.7 cm (5 inches).

For applications in a cluster formation, all 25 particles of Bead #2 were placed in a region having a diameter of about 3.8 cm. For Comparative bead B, arrangement in a cluster formation involved placing 15 beads within a region having a diameter of about 3.8 cm. The center of each cluster region was offset about 17.8 cm below and about 5.1 cm to the side of the seed.

During the experiments, the rhizotrons were placed inside support boxes to keep the chambers evenly spaced and upright while also minimizing extended light exposure of the soil columns and roots. To maintain a soil-water content near field capacity, each chamber was watered from the top with 100-200 ml of deionized water between 2 and 6 times per week depending on plant size and water usage. At two and three weeks after planting, the chambers were individually imaged with a custom macro imaging platform. The captured images were then preprocessed and analyzed for root growth and proliferation in local regions of the soil columns. After 30 days of growth, both leaf and root samples were collected and analyzed for the uptake of crop actives. For the leaves, approximately 0.5 g fresh weight of both old and mature leaf tissue were collected per plant and placed into separate pre-weighed scintillation vials, then weighed and immediately frozen. During leaf collection, mature leaves were classified as the first, not-fully expanded whorl leaf above the most recently expanded leaf with a visible collar and old leaves as the first fully expanded leaf below the most recently expanded leaf with a visible collar. For the roots, approximately 0.5 grams fresh weight of washed root tissue was collected per plant into pre-weighed scintillation vials, weighed and immediately frozen. The root tissue was sampled from a portion of the root systems that was growing within a non-treated region of the soil column that was more than about 7.6 cm (3 inches) above the nearest bead.

The leaf tissue was analyzed by LC-MS-MS for concentration of cyantraniliprole. The findings are listed below in Table 11 and show substantial uptake of cyantraniliprole from Bead #2 and less uptake from comparative Bead B. Additionally, the plants have better uptake of the pesticide when the coated particles are clustered together than when they are dispersed in a grid. Examination of the root zone at the time of leaf tissue harvest showed substantial root density in the vicinity of Bead #2. The term "old" refers to the lowest leaves on the corn plant that are still green and visibly healthy. The term "mature" refers to leaves from the middle of the corn plant, and these have their full leaf area. Therefore, the "mature" leaves are younger than the "old" leaves.

TABLE 11

| | Untreated | Bead #2 | | Comparative Bead B | |
|---|---|---|---|---|---|
| | Check | Cluster | Grid | Cluster | Grid |
| Mature leaf (µg/g of leaf; average) | 0.00 | 0.248 | 0.107 | 0.079 | 0.064 |
| Old leaf (µg/g of leaf; average) | 0.00 | 0.635 | 0.188 | 0.192 | 0.139 |

Example 17

Soil Degradation Experiments

Aerobic soil degradation of cyantraniliprole in the various beads was determined versus a stock aqueous solution by following the changes in cyantraniliprole concentration over time.

Tama soil (clay-loam soil) was collected and stored in a refrigerator prior to use. The soil consisted of 8% sand, 55% silt, 37% clay with 2% organic matter, had a pH of 5.8 and an initial gravimetric moisture content of about 27% on a dry weight basis. Soil (10.0 to 68.3 grams) was weighted into glass jars or polypropylene vials and the moisture content was adjusted to 32.4% (Field capacity for this soil) by adding deionized water to the containers. The containers were covered with tape and pre-incubated inside a temperature controlled incubator at 25° C. for 4 days. After pre-incubation, and removal of the tape from the containers, Beads 7, 8 and Comparative Bead C were added to each container in separate locations so that each container contained four beads. Additionally, as a control, 10 microliters of a cyantraniliprole stock solution (0.443 mg cyantraniliprole/ml acetonitrile) was added to a container. The containers were covered with tape again and incubated at 25° C. The incubator temperature was monitored by a digital thermometer, and soil water loss was monitored by weighing each sample container during the experiment. The temperature variations were within +/−2° C. during the experiment. Soil moisture content was brought back to field capacity once every two weeks by adding de-ionized water equivalent to the amount of moisture that was lost.

At sampling intervals of 0, 3, 7, 14, 21, 28, 35, 56, 100 and 120 days, three containers from each treatment were removed from the incubator, and the four cyantraniliprole-containing particles or pellets in each container were collected and transferred to 100 mL polypropylene bottles for extraction. The extraction solution was a solvent mixture containing 9 parts of acetone and one part of 1M formic acid in water. The four particles or pellets in each bottle were extracted with 40 mL of the extraction solution at room temperature (approximately 20° C.) overnight inside a horizontal orbital shaker with 200 to 250 rpm shaking to recover the cyantraniliprole. The remaining soil in each container was transferred to 0.2-1.0 liter polypropylene bottles, and each container was rinsed with the extraction solution. Additional extraction solution was added to each bottle to give a soil:extraction solution ratio of about 1:6 (weight/volume). For example, for 10 g soil, a total of 60 mL extraction solution was added to the bottle. The bottles were tightly capped and kept at room temperature (approximately 20° C.) overnight inside a horizontal orbital shaker with 200 to 250 rpm shaking to recover the cyantraniliprole from the soil. After the overnight extraction, the extracts were allowed to settle and the supernatant was filtered through 0.4 µm pore size polypropylene filters and stored in a −20° C. freezer before quantifying cyantraniliprole. Cyantraniliprole was separated by HPLC and quantified by UV detection at 210 nm using an external calibration curve of an analytical standard. Quality control standard solution with known cyantraniliprole concentration was also quantified along with samples in each analysis to ensure instrumental reproducibility over time. The concentration variations of the quality control solution during the experiment were within ±10%.

The experiments show that cyantraniliprole is degraded more slowly by soil microbes in beads of the present disclosure when compared with liquid application of the stock cyantraniliprole solution. When cyantraniliprole was delivered to the soil via stock solution, it was readily biodegraded by soil microbes with a half-life of approximately 43 days and nearly 76% was biodegraded by day 100. In contrast, cyantraniliprole was degraded much more slowly when delivered via the disclosed beads compared with the stock solution delivery. By day 56, only 16% of cyantraniliprole was degraded via OC 14-14-14 particles, 24% via AGRIUM-ESN® particles, 22% via glass particles. By day 100, 28% of cyantraniliprole was degraded via OC 14-14-14 beads, 26% via AGRIUM-ESN™ beads, and 31% via glass beads. These results suggest that OC 14-14-14, AGRIUM®-ESN, and glass beads provided significant protection of cyantraniliprole from soil microbial biodegradation under aerobic conditions. Cyantraniliprole release from OC14-14-14, AGRIUM-ESN™, and glass beads was relatively slow, with 47%, 40%, and 50% of initially applied compound, respectively, still remaining in the particles by day 100.

Soil Degradation

Loam soil had 29% sand, 50% silt, and 21% clay with 2.9% organic matter and a pH of 5.7. The soil was sifted through a 2-mm metal mesh before being used and the sifted soil had an initial gravimetric moisture content of approximately 21% on a dry weight basis. Soil (20.0 to 50 g) was weighed into individual glass containers and moisture was adjusted to field moisture capacity at approximately 27% by weight by adding de-ionized water to the containers. Afterward, the containers were covered with breathable tape and pre-incubated inside a temperature-controlled incubator at 25° C. for 6 days. The tape allowed free oxygen exchange between the container headspace and ambient air while minimizing soil water loss due to evaporation. After the pre-incubation and removal of the tape from the containers, 5 cyantraniliprole-containing particles of Beads #9, #10 and Comparative Bead D), 0.1 mL Control E solution, or 0.5 mL of Control D aqueous solution were applied to 5 separate spots (locations) of the soil so that each spot contained one particle, 0.020 mL Control E solution, or 0.1 mL Control D aqueous solution. The containers were covered with tape again and incubated at 25° C. The incubator temperature was monitored by a digital thermometer and Hobo data logger, and soil water loss was monitored by weighing each sample container during the experiment. The temperature variations were within ±2° C. during the experiment. Soil moisture content was brought back to field capacity once every 1-2 weeks by adding de-ionized water equivalent to the amount of moisture that was lost, monitored by weighing each container every week.

At sampling intervals of 0, 3, 7, 14, 28, 56 and 90 days, three containers from each treatment were removed from the incubator, and the 5 cyantraniliprole-containing particles were collected and transferred to 100 mL polypropylene bottles for extraction. The extraction solution was a solvent mixture containing 9 parts of acetone and one part of 1M formic acid in water. The 5 particles in each bottle were extracted with 50 mL extraction solution at room temperature (approximately 20° C.) overnight inside a horizontal orbital shaker with 200 to 250 rpm shaking to recover the cyantraniliprole. The remaining soil in each container was transferred to 0.2-1.0 liter polypropylene bottles, and each container was rinsed with extraction solution. Additional extraction solution was added to each bottle to give a soil:extraction solution ratio of 1:6 (weight/volume). For example, for 20 g soil, a total of 120 mL extraction solution was added to the bottle. The bottles were tightly capped and kept at room temperature (approximately 20° C.) overnight inside a horizontal orbital shaker with 200 to 250 rpm shaking to recover the cyantraniliprole from the soil. After the overnight extraction, the extracts were allowed to settle and the supernatant was filtered through 0.4 μm pore size polypropylene filters and stored in a −20° C. freezer before quantifying cyantraniliprole. One milliliter of the filtered particle or soil extract was added to each HPLC glass vial and was air-dried inside a chemical hood overnight. Then 1.0 mL solution containing final concentrations of 90% acetonitrile, 0.1% acetic acid, and 9.9% HPLC grade water was added to each vial to redissolve the dried cyantraniliprole for quantification by HPLC-UV method. Cyantraniliprole was separated by HPLC and quantified by UV detection at 220 nm using an external calibration curve of an analytical standard.

It was found that when cyantraniliprole was delivered to the soil via Control solutions D and E, it was readily biodegraded by soil microbes with a half-life of approximately 10-13 days and nearly 79% was biodegraded by day 90. In contrast, cyantraniliprole was degraded more slowly when delivered via Beads #9 and #10 compared with the solution delivery. By day 56, only 18% of cyantraniliprole was degraded from Bead #9, 31% from Bead #10, and 61% from Comparative Bead D. By day 90, 26% of cyantraniliprole was degraded from Bead #9, 59% from Bead #10, and 71% from Comparative Bead D. These results suggest that Beads #9 and #10 offered the most protection from soil microbial biodegradation under aerobic conditions. Cyantraniliprole release from Bead #9 was slower, with 34% of initially applied compound still remaining in the particles by day 90. In contrast, only 7% of initially applied compound still remained in Bead #10 and 12% remained in Comparative Bead D by day 90.

Example 18

Root Proliferant and Crop Active Combinations and Variations to Increase Crop Active Uptake Efficiency Examples 1-6 exemplified various root proliferant: crop active configurations to increase uptake efficiency. Based on the finding that targeted root proliferation helps increase crop active ingredients, including those with lower overall water solubility and guidance provided in the instant disclosure, various combinations and ratios of root proliferant: crop active agents are readily envisioned. For example, Examples 1-6 exemplified the physical ranges that are captured in Table 14. Wide ranges of root bait-crop active ratios are possible depending on the following factors: nature of the crop active (e.g., solubility profile); type of root proliferant and its solubility; crop species involved and other secondary parameters such as soil type, temperature, and soil moisture.

TABLE 14

Exemplified root proliferant:crop active combinations.

| Bead Type | Average mass (g) | Root Proliferant (wt %) | Crop Active (wt %) | Root Proliferant:Crop Active Ratios |
|---|---|---|---|---|
| Extruded Bead (prototypes 1/2) | 0.262 | 10-50 | 0.15-0.61 | ~16:1 to 330:1 |
| Tablet (prototypes 3/4) | 0.571 | 10-50 | 0.08-0.35 | ~28:1 to 625:1 |
| Crystal Green Tablet (prototypes 5/6) | 0.225 | 65-90 | 0.16-0.64 | ~102:1 to 563:1 |

In addition to the exemplified ratios in Table 14, root proliferant: crop active ratio ranges can range from about 5000:1; 2500:1; 2000:1; 1500:1; 1000:1; 500:1; 400:1; 300:1; 200:1; 100:1; 90:1; 80:1; 70:1; 60:1; 50:1; 40:1; 30:1; 20:1; 15:1; 10:1; 5:1; 1:1; 1:5; 1:10; 1:15; 1:20; 1:30; 1:40; 1:50; 1:60; 1:70; 1:80; 1:90; 1:100; 1:200; 1:300; 1:500; and 1:1000.

For example, a stronger root proliferant may be present at a lower compared to a less vigorous root proliferant. Similarly, a less soluble crop active may be present at a higher ratio in comparison to a stronger root proliferant. Further, a moderate to low soluble root proliferant when it is desirable to have a sustained release of root proliferants to cover the late stages of a crop's growth cycle, the ratio of the amount of the root proliferant present in the composition may be increased for example, to about 1000:1 or higher such as 2000:1. For example, soil degradation products of urea, if used as root proliferants, the ratio of root proliferant: crop active may range from about 500:1 to about 2000:1. However, if root proliferant is delivered via granules coated with crop actives, the ratio of root proliferant: crop active may fall in the lower range, e.g., about 2:1 to about 5:1. Therefore, based on the guidance provided herein, agriculturally effective ratio of root proliferant: crop active combinations are produced and used for the particular type of crops, crop actives and soil types.

Example 19

Mid/Late Season Delivery of Crop Protection Agents to Soybean Plants

A soybean field trial was conducted to determine efficacy of mid-late season delivery of an insecticide against pests such as velvet bean caterpillar, corn earworm and fall armyworm. Seven experimental delivery systems were used in the evaluation, each delivering cyantraniliprole at the rate of about 0.5 mg cyantraniliprole/plant (70 g/acre), which corresponds, for example to about 80% of the labeled rate for foliar applications. The planting density was 80 plants/10 feet row, corresponding to 140,000 plants per acre, typical of soybean planting practices. The soybean variety was commercially available. The pests used in this trial were velvet bean caterpillar, corn ear worm, and fall army worm, all lepitopteran pests known to be sensitive to cyantraniliprole. These pests were infested into the field at various time points in the trial (described below). In-vivo assays were used for bioefficacy evaluation when the infestation was successful. Otherwise leaf tissue was harvested from the plants and in-vitro assays were used for bio-efficacy evaluations in these cases. Cyantraniliprole concentrations in leaf tissue were determined by HPLC-MS-MS.

The experiment included untreated negative controls and positive controls of two types. One positive control was liquid cyantraniliprole formulated like commercial seed treatment formulations without binder which were injected into the soil at the time of planting. The other positive control was the same liquid formulation but injected into the soil seven days prior to harvest of the leaf tissue. First control is to evaluate bioefficacy of the liquid formulation when it is rapidly released into the soil, without a root proliferant and without a timed release. Second control, the one injected seven days prior to tissue harvest, is to account for the retention time of cyantraniliprole under certain soil conditions depending on soil conditions. Actual placement of the delivery systems and controls into the soil was as follows: The soybean seeds were planted into the soil by means of a mechanized planter ~1.5 inches deep into the soil. A 4 inch deep trench was dug two inches over from the row of seeds, consistent with banding. The delivery systems (indicated as treatment numbers 'Trt. No.' in the tables) were then placed into the trench. The trench was then back filled with soil. However, for the controls, the trench was back-filled with sand, and the liquid controls were injected into the sand. This was completed at the time of seed planting, with the exception of the positive control of the second type, for which liquid injection was seven days prior to each leaf harvest as stated above.

Tissue sampling and bioefficacy evaluations took place 22, 45, and 80 days after planting, as indicated. The in-vitro bioefficacy data from the infestation with velvet bean caterpillar is summarized in Table 17. This is from the infestation 22 days after planting and corresponds to about V4/V5 in the lifecycle of these soybean plants. Negative controls show no bioefficacy, controls in which the formulation is injected at the time of planting shows a significant degree of bioefficacy. Cyantraniliprole-coated Osmocote 14-14-14 has bioefficacy that surpasses the positive control while the two Agrium-ESN® based materials coated with two different amounts of cyantraniliprole have bioefficacy comparable to the control (liquid injection).

TABLE 17

Protection against Velvet Bean Caterpillar

| Trt. No. | Composition | Cyantraniliprole per delivery unit* | Percent defoliation for Velvet Bean Caterpillar infestation at V5** |
|---|---|---|---|
| 1 | Control-no treatment | 0 | 28.0 ± 18.0 |
| 2 | Control-Liquid application of active | 40 mg per 378 ml of water | 5.0 ± 4.0 |
| 3 | Active on Osmocote 14-14-14 | 0.040 mg/granule | None detectable |
| 4 | Active on Agrium-ESN ® | 0.038 mg/granule | 5.0 ± 0.5 |
| 5 | Active on Agrium-ESN ® | 0.017 mg/granule | 26.0 ± 8.0 |
| 6 | Control-Liquid application of active 1 week prior to insect infestation at R2 plant development phase | 40 mg per 378 ml of water | 35.0 ± 14.0 |

*Application rate of the cyantraniliprole active was 0.50 mg/plant, with a planting density of 80 plants per 10 feet row.
**Uncertainties are standard deviations The corresponding leaf tissue concentration data for cyantraniliprole is given in Table 18, as determined by HPLC-MS-MS. The concentrations for treatment 3 (cyantraniliprole-coated Osmocote 14-14-14) is highest, while the other two coated treatment numbers 4-5 have leaf tissue concentrations similar to Trt. No. 2.

TABLE 18

Cyantraniliprole leaf tissue concentration at V5 and R2

| Trt. No. | Composition | Cyantraniliprole leaf concentration (ppm) at V5* | Cyantraniliprole leaf concentration (ppm) at R2* |
|---|---|---|---|
| 1 | Control-no treatment | None detectable | None detectable |
| 2 | Control-Liquid application of active | 0.3 ± 0.1 | 0.2 ± 0.05 |
| 3 | Active on Osmocote 14-14-14 | 0.32 ± 0.14 | 0.31 ± 0.11 |
| 4 | Active on Agrium-ESN ® | 0.032 ± 0.01 | 0.020 ± 0.05 |
| 5 | Active on Agrium-ESN ® | 0.010 ± 0.005 | 0.032 ± 0.012 |
| 6 | Control-Liquid application of active 1 week prior to insect infestation at R2 plant development phase | No data | No data |

*Uncertainties are 95% confidence intervals for the mean.

Table 19 shows the bioefficacy at mid-season against corn earworm in an in-vivo assay. Because, the percent defoliation scores were low in general, an in-vivo assay was used at this stage to further validate the significance of the findings. In-vitro data for Corn Ear Worm at Day 45 are in Table 19. In this in-vitro assay, high scores represent better bio-efficacy.

TABLE 19

Protection against Corn Earworm

| Trt. No. | Composition | In-field defoliation score for corn earworm infested plants at R4* | In-vitro corn earworm damage scores for leaves harvested at R2*¥ |
|---|---|---|---|
| 1 | Control-no treatment | 3.8 ± 1.4 | 1.0 ± 0.1 |
| 2 | Control-Liquid application of active | 4.2 ± 1.3 | 1.3 ± 1.0 |
| 3 | Active on Osmocote 14-14-14 | 1.0 ± 0.01 | 5.8 ± 2.7 |
| 4 | Active on Agrium-ESN ® | 2.0 ± 0.01 | 4.3 ± 2.9 |
| 5 | Active on Agrium-ESN ® | 3.2 ± 1.6 | 2.2 ± 2.8 |
| 6 | Control-Liquid application of active 1 week prior to insect infestation at R2 plant development phase | 5.0 ± 0.01 | 2.0 ± 1.8 |

*Uncertainties are 95% confidence intervals for the mean.
¥Damage scores: 1 = complete destruction; 9 = no damage The corresponding cyantraniliprole leaf tissue concentration data is given in Table 20. The cyantraniliprole on Osmocote shows the highest leaf tissue concentrations, and all the experimental materials show better uptake than controls. The 80 day bioefficacy evaluation was an in-vitro assay against fall army worm, at R5. The bioefficacy results and the leaf tissue cyantraniliprole data are summarized in Table 20.

TABLE 20

Cyantraniliprole concentration at 80 days after planting (DAP)

| Trt. No. | Composition | Cyantraniliprole concentration at 80 days after planting (ppm)* | Fall Armyworm bioefficacy studies 80 days after planting*¥ |
|---|---|---|---|
| 1 | Control-no treatment | Below limits of detection | 1.0 ± 0.1 |
| 2 | Control-Liquid application of active | 0.015 ± 0.016 | 1.0 ± 0.1 |
| 3 | Active on Osmocote 14-14-14 | 0.18 ± 0.06 | 7.7 ± 1.1 |
| 4 | Active on Agrium-ESN ® | 0.13 ± 0.03 | 7.1 ± 0.9 |
| 5 | Active on Agrium-ESN ® | 0.07 ± 0.02 | 6.6 ± 1.1 |
| 6 | Control-Liquid application of active 1 week prior to insect infestation at R2 plant development phase | 0.02 ± 0.01 | 1.5 ± 0.5 |

*Uncertainties are 95% confidence intervals for the mean.
¥Damage scores: 1 = complete destruction; 9 = sample untouched The bioefficacy data and the leaf tissue concentration data is correlated to generate a dose-response curve for these from-soil delivery systems. This analysis demonstrates that delivery systems can be optimized to provide efficacious control against mid-late season pests in any field crop.

Example 20

Preparation of Vegetable Oil-Based Polyurethane (PU) Coated Urea Tablet and Round Cores Urea tablets were prepared the same way as described in Example 3. The coating process was done in a drum coater, which was equipped with a heat gun and a rotating drum controlled by an air-driven motor. The drum was loaded with 1000 g pre-dried urea tablets and the tablets were heated to a surface temperature of 70-80 C°. In a separate container, 1.4 g polymeric methylene diphenyl diisocyanate (PAPI 27), 3.5 g castor oil, 0.01 g triethanolamine and 50 mg blue dye were mixed. After mixing, the coating materials were added through a pipet onto the tumbling tablets and agitated under heat for 15 min. This gave approximately 0.5 wt % coating on the tablets and repeated until desired ratio was achieved. The tablets were tumbled under heat for 30 min to allow complete curing. The final polyurethane coating ratio was determined by the weight increase from the initial loading of urea tablets. Urea round cores were prepared through a spray granulation process. The diameter of the round cores is typically 8-10 mm. The coating process was as described herein.

Example 21

Preparation of Vegetable Oil-Based Polyurethane (PU) Coated Urea Round Cores Containing the Crop Protection Agent Clothianidin Prototype #7 and #8

Urea round cores containing no crop protection agent were prepared through a spray granulation process and were coated with vegetable oil-based polyurethane as described in Example 20.

Prior to beginning the crop active treatment process, a mixture was prepared at a 1:1 ratio containing the commercial crop active clothianidin (600 g/L) and a commercial grade polymer, which increases the binding of the formulation to the surface of the beads. The round cores were treated in 500 gram batches using a small scale, low speed bowl treater. The round cores were added to the bowl and the stirrer motor was set to the lowest speed, causing the beads to tumble in the bowl. The crop active/binder mixture was added to the center of the tumbling beads by a syringe. The application rate for the mixture was 3.575 g per 500 g of tablets. The round cores were tumbled for 45 seconds after the addition of the formulation/binder mixture. The treated round cores were poured into a tray large enough to allow them to be spread into a single or double layer and then placed in a convection oven set to 45° C. to dry. The round cores were dried for 8 minutes to give Prototype #7. In another embodiment, urea round cores containing Clothianidin were prepared through a spray granulation process to produce Prototype #8.

Example 22

Preparation of Vegetable Oil-Based Polyurethane (PU) Coated Urea Tablet Containing the Crop Protection Agent Flutriafol Prototype #9 and #10

Urea tablets containing no crop protection agent were prepared through a tableting process. The urea tablets were coated with vegetable oil-based polyurethane as described in Example 20. Prototype #9 was made in a similar way to Prototype #7, except using the crop active commercial flutriafol with the application rate for the mixture of 13.75 g per 500 g of tablets and 20 minutes drying time. In another embodiment, the PU coating process was identical to that used in Example 21.

Example 23

Preparation of Vegetable Oil-Based Polyurethane (PU) Coated Urea Round Cores Containing the Crop Protection Agents Clothianidin and Flutriafol Prototype #11 and Prototype #12

Urea round cores containing one half of the full loading of Clothianidin and Flutriafol were prepared. The PU coating process was as described herein. The PU-coated urea round cores containing one half of the full loading of Clothianidin and Flutriafol were treated with the other half of Clothianidin and Flutriafol as described below. Prior to beginning the treatment process, two mixtures were prepared at a 1:1 ratio containing the crop active formulation and a commercial seed finisher polymer. The two crop active formulations used were the commercial flutriafol fungicide and clothianidin insecticide. The insecticide mixture was applied first, as described in Example 21. The round cores were dried in the oven for the specified time and then the fungicide formulation/binder mixture was applied, as described in Example 22, and the beads were dried a second time in the oven. In another aspect, the PU-coated urea tablets containing the full loading of Clothianidin was treated with Flutriafol as described in Example 22.

Example 24

Figure 19:
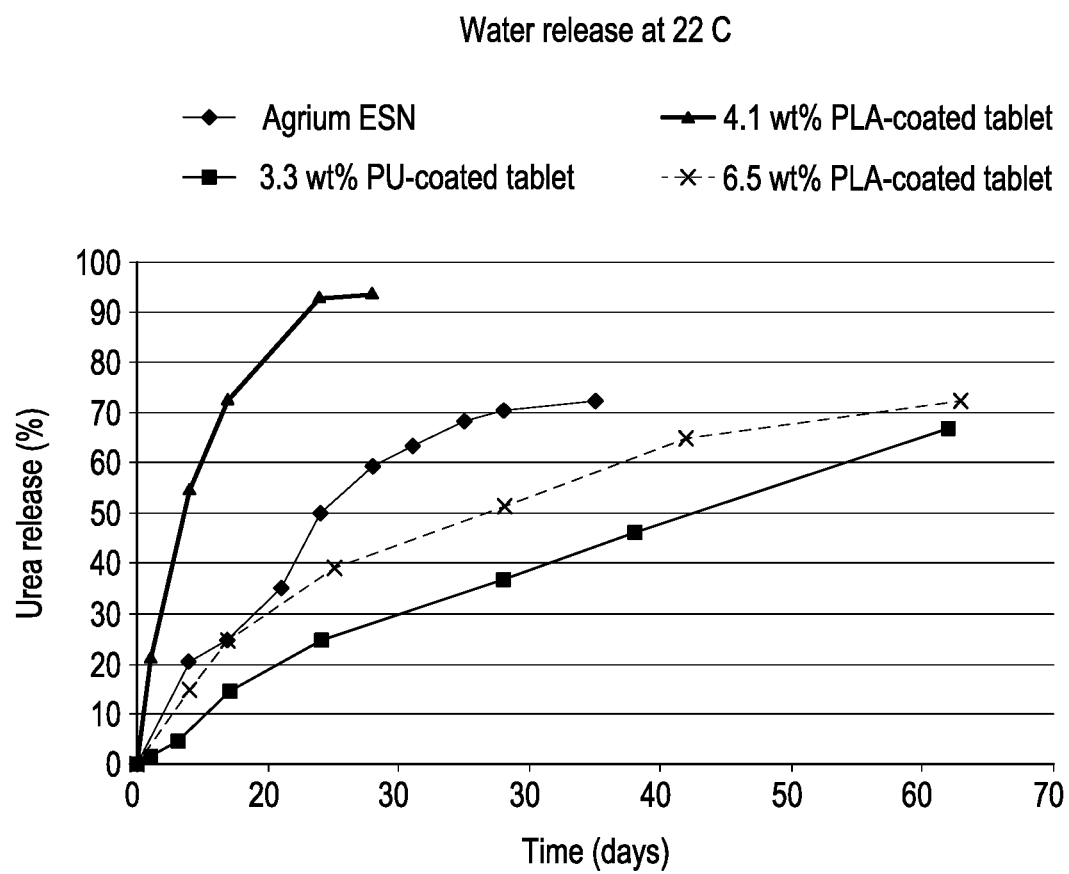
FIG. 19 shows water release of vegetable oil-based Polyurethane (PU) coated urea tablets.

Water Release of Vegetable Oil-Based Polyurethane (PU) Coated Urea Tablets and Round Cores Five urea tablets coated with 3.3 wt % PU were immersed in 200 mL DI water at room temp (ca. 22° C.) in a capped glass jar. The urea concentration in the water was measured at pre-determined times. The experiment was conducted in triplicates. As comparison, three samples, namely 4.1 wt % PLA-coated 535 mg urea tablets, 6.5 wt % PLA-coated 535 mg urea tablets and Agrium ESN® granules, were tested under the same conditions. The release profiles of theses samples were illustrated in FIG. 19. The 3.3 wt % PU-coated urea tablets showed controlled release behavior with release rate lower than the 6.5 wt % PLA-coated 535 mg urea tablets.

Figure 20:
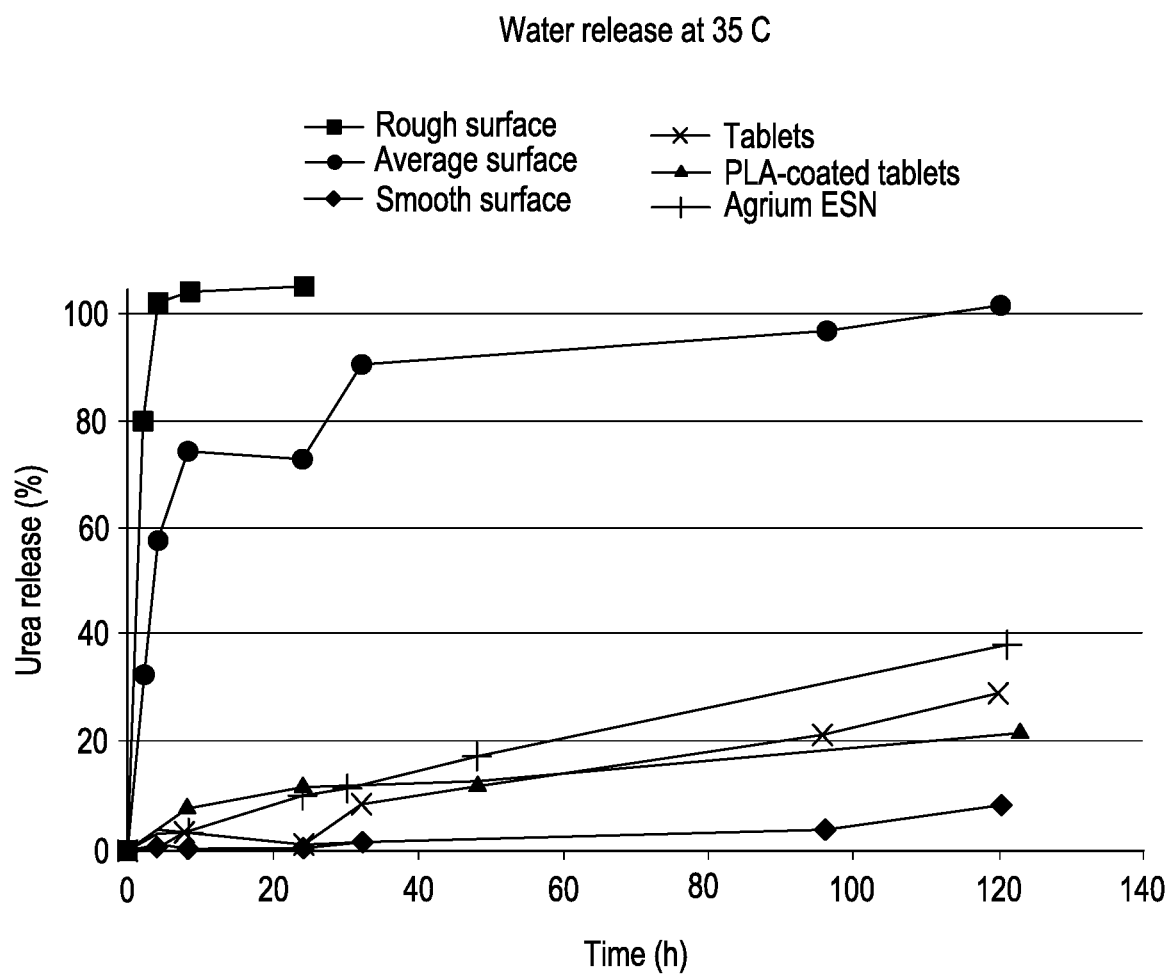
FIG. 20 shows water release of vegetable oil-based Polyurethane (PU) coated urea round cores.

Three samples of PU-coated urea round cores of different surface roughness (rough, average and smooth) were tested in water at 35 C°. The three samples had the same targeted coating ratio (3.4 wt %); however, due to the effect of the surface roughness on the coating efficiency, the actual coating ratio of the three samples were 3.2, 2.0 and 2.3 wt % for the rough, average and smooth cores, respectively. Ten coated round cores of each sample were immersed in 300 mL DI water in a capped glass jar that was placed in an incubator set at 35 C°. The urea concentration in the water was measured at pre-determined times. As comparison, three samples, namely 3.4 wt % PU-coated 535 mg urea tablets, 6.5 wt % PLA-coated 535 mg urea tablets and Agrium ESN® granules, were tested under the same conditions. The release profiles of theses samples were illustrated in FIG. 20. The PU-coated round cores with average and rough surface released much faster than the PU-coated round cores with smooth surface.

What is claimed is:

1. A method of increasing yield of a crop in a field, the method comprising providing an agricultural composition during planting of the crop seed in the field, wherein the agricultural composition comprises
   a. a root proliferant component, wherein the root proliferant releases about 70-90 cumulative % of phosphate between about 30-90 days into soil after planting the crop seed and comprises about 0.002 to about 2.0 grams of phosphate; and
   b. a crop protection agent, wherein the crop protection agent is released into soil such that about 70-90 cumulative % of the crop protection agent is available to the crop during about 20-100 days after planting the crop seed and the uptake of the crop protection agent by the crop is increased due to the presence of the root proliferant;
wherein the agricultural composition comprises a biodegradable polymer layer having a water permeability of about 1 to about 2000 $g/m^2$/day at 25 degrees Celsius and thereby increasing the yield of the crop.

2. The method of claim 1, wherein the crop is selected from the group consisting of maize, soybean, wheat, rice, cotton, sorghum, millet and barley.

3. The method of claim 1, wherein the root proliferant is selected from the group consisting of dicalcium phosphate dehydrate, ammonium phosphate, magnesium ammonium phosphate, and a combination thereof.

4. The method of claim 1, wherein the agricultural composition is provided at planting of the crop seed or prior to planting the crop seed.

5. The method of claim 1, wherein the soil is classified as a soil type that has a lower water holding capacity.

6. The method of claim 1 wherein the crop protection agent is selected from the group consisting of an insecticide, a fungicide, a nematicide, a herbicide, a biological component and a combination thereof.

7. The method of claim 1, wherein the crop protection agent is selected from the group consisting of an anthranilic diamide insecticide, a neonicotinoid insecticide and a combination thereof.

8. The method of claim 7, wherein the neonicotinoid insecticide is released into the soil such that an effective amount of the insecticide is present in the soil when the target pest is present in the field during later developmental stages of the crop.

9. The method of claim 7, wherein the anthranilic diamide insecticide is released into the soil such that an effective amount of about 5-60 g/hectare is present in the soil after about 20-100 days from providing the agricultural composition in the field.

10. The method of claim 1, wherein the field is characterized by the presence of one or more late season pests that target maize, soybeans, rice, wheat, sorghum, barley, millet, canola or cotton.

11. The method of claim 10, wherein the mid to late season pest is corn root worm, corn ear worm, fall army worm or a combination thereof.

12. The method of claim 1, wherein the crop protection composition is selected from the group consisting of, thiamethoxam, clothianidin, imidacloprid, thiodicarb, carbaryl, chlorantraniliprole, cyantraniliprole, methiocarb, thiram, azoxystrobin, paclobutrazol, acibenzolar-S-methyl, chlorothalonil, mandipropamid, thiabendazole, chlorothalonil, triadimenol, cyprodinil, penconazole, boscalid, bixafen, fluopyram, fluazaindolizine, oxathiapiprolin, penthiopyrad, fenpropidin, fluxapyroxad, penflufen, fluoxastrobin, kresoxim-methyl, benthiavalicarb, benthiavalicarb-isopropyl, dimethomorph, flusulfamide, methyl thiophanate, ipconazole, prothiaconazole, sulfoxaflor, triticonazole, flutriafol, thiram, carboxin, carbendazim and a combination thereof.

13. The method of claim 1, wherein the crop is maize and the yield increase in the field is about 10% to about 50% compared to a control field wherein a control fertilizer component comprising a normal release profile of nitrogen is applied, wherein both the fertilizer component and the control fertilizer component comprise substantially the same total nitrogen amount at planting.

14. The method of claim 1, wherein the crop is maize and the crop seed is planted at a planting density of about 15,000 to about 70,000 plants per acre at a row spacing of about 15 inches to about 40 inches.

* * * * *